United States Patent
Asauchi

(10) Patent No.: US 8,289,788 B2
(45) Date of Patent: Oct. 16, 2012

(54) SYSTEM HAVING A PLURALITY OF MEMORY DEVICES AND DATA TRANSFER METHOD FOR THE SAME

(75) Inventor: Noboru Asauchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 261 days.

(21) Appl. No.: 12/751,410

(22) Filed: Mar. 31, 2010

(65) Prior Publication Data

US 2010/0254202 A1    Oct. 7, 2010

(30) Foreign Application Priority Data

Apr. 1, 2009   (JP) ................................. 2009-088591
Nov. 27, 2009  (JP) ................................. 2009-269529

(51) Int. Cl.
    *G11C 7/10*    (2006.01)
(52) U.S. Cl. .................................................. 365/189.17
(58) Field of Classification Search ............... 365/189.17
    See application file for complete search history.

(56) References Cited

U.S. PATENT DOCUMENTS

| | | | |
|---|---|---|---|
| 5,929,885 A | 7/1999 | Nakajima et al. | |
| 6,749,281 B2 | 6/2004 | Asauchi | |
| 6,984,012 B2 | 1/2006 | Asauchi et al. | |
| 7,321,436 B2 | 1/2008 | Asauchi | |
| 7,590,026 B2 | 9/2009 | Asauchi | |
| 7,660,008 B2 | 2/2010 | Asauchi | |
| 7,697,372 B2 | 4/2010 | Asauchi | |
| 7,925,843 B2 | 4/2011 | Ueno et al. | |
| 2002/0024559 A1 | 2/2002 | Murray et al. | |

(Continued)

FOREIGN PATENT DOCUMENTS

CN    1332412 A    1/2002

(Continued)

OTHER PUBLICATIONS

European Search Report dated Jul. 29, 2010 issued in EP 10 15 8627.

(Continued)

*Primary Examiner* — Hoai V Ho
*Assistant Examiner* — Pablo Huerta
(74) *Attorney, Agent, or Firm* — Stroock & Stroock & Lavan LLP

(57) ABSTRACT

The control section performs a write operation, in synchronism with a clock signal, for transferring write data to one of the plurality of memory devices, utilizing: (i) an identification information transmission period during which the control section sends the identification information of a single memory device to all of the plurality of memory devices through the data line to select the single memory device; (ii) a write data transmission period during which the control section sends a single set of write data having a prescribed size to the selected single memory device; and (iii) a response period during which the selected single memory device responds to the control section with a response signal indicating presence or absence of communication error in relation to the received set of write data. Communications between the control section and the selected memory device during the write data transmission period and the response period are repeatedly performed for each transmission of one of plural sets of write data having the prescribed size. The control section sets a frequency of the clock signal during the response period to a lower value than that of the clock signal during the write data transmission period.

5 Claims, 25 Drawing Sheets

U.S. PATENT DOCUMENTS

| | | |
|---|---|---|
| 2002/0057319 A1 | 5/2002 | Saruta et al. |
| 2002/0173825 A1* | 11/2002 | Thompson .................. 607/9 |
| 2005/0071725 A1 | 3/2005 | Gibart |
| 2006/0069851 A1 | 3/2006 | Chung et al. |
| 2007/0043898 A1 | 2/2007 | Ozeki et al. |
| 2007/0104327 A1 | 5/2007 | Macri et al. |
| 2007/0250659 A1 | 10/2007 | Booth et al. |
| 2008/0106757 A1 | 5/2008 | Asauchi |
| 2008/0201538 A1 | 8/2008 | Furuichi et al. |
| 2008/0310070 A1 | 12/2008 | Wegman |
| 2009/0073762 A1 | 3/2009 | Lee et al. |
| 2009/0265602 A1 | 10/2009 | Nakano |
| 2009/0276688 A1 | 11/2009 | Yoshida |
| 2009/0287891 A1 | 11/2009 | Nakano |
| 2010/0257305 A1 | 10/2010 | Asauchi |
| 2010/0257327 A1 | 10/2010 | Kosugi |

FOREIGN PATENT DOCUMENTS

| | | |
|---|---|---|
| EP | 1316428 A1 | 6/2003 |
| EP | 1389528 A1 | 2/2004 |
| EP | 1767369 A2 | 3/2007 |
| JP | 02-068642 A | 3/1990 |
| JP | 06-226989 | 8/1994 |
| JP | 06-303222 | 10/1994 |
| JP | 10-247899 A | 9/1998 |
| JP | 2001-146030 | 5/2001 |
| JP | 2002-370383 | 12/2002 |
| JP | 2003-112431 | 4/2003 |
| JP | 2004-074464 | 3/2004 |
| JP | 2004-299405 | 10/2004 |
| JP | 2009-259225 A | 11/2009 |
| WO | 00/60476 A1 | 10/2000 |
| WO | 20051094455 A2 | 10/2005 |
| WO | 20091018054 A2 | 2/2009 |

OTHER PUBLICATIONS

The I$^2$C Bus Specification version 2.1 dated Jan. 2000.

Search Report issued on Jul. 26, 2010 in European Patent Application No. 10158354.0.

Search Report issued on Sep. 19, 2011 in European Patent Application No. 11167416.4.

* cited by examiner

Insertion direction R

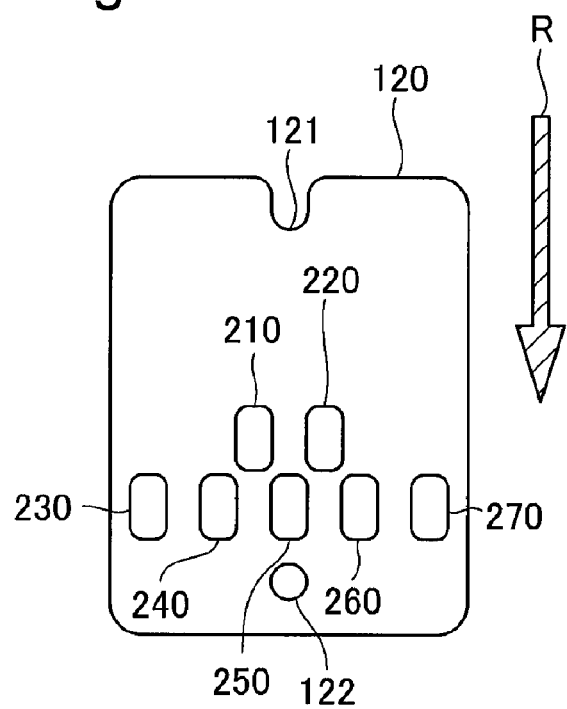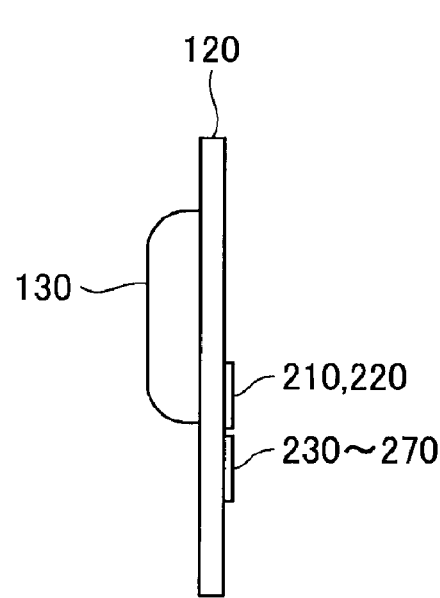

SYSTEM HAVING A PLURALITY OF MEMORY DEVICES AND DATA TRANSFER METHOD FOR THE SAME

CROSS-REFERENCE TO RELATED APPLICATIONS

The present application claims the priority based on Japanese Patent Applications No. 2009-088591 filed on Apr. 1, 2009, and No. 2009-269529 filed on Nov. 27, 2009, the disclosures of which are hereby incorporated by reference in their entireties.

BACKGROUND OF THE INVENTION

1. Field of the Invention

The present invention relates to a system furnished with a plurality of memory devices, and particularly to a data transfer technique for the same.

2. Description of the Related Art

An inkjet printer, which is one example of liquid ejecting apparatus, typically has one or more installed ink receptacles provided as detachable liquid receptacles. Some ink receptacles are furnished with memory devices. The memory device stores information of various kinds, for example, the remaining ink level or the color of the ink in the ink receptacle (see JP 2002-370383 A, JP 2004-299405 A). A control unit provided to the printer communicates with the memory devices of the ink receptacles.

However, in conventional techniques, insufficient consideration is given to the issue of dependability of communication between the control unit provided to the printer and the memory devices provided to the ink receptacles. For example, there is a risk that, for reasons such as faulty contact between the electrical contact portions of the printer and an ink receptacle, communication faults may occur between the control unit provided to the printer and the memory device of the ink receptacle. If operation of the print control unit is continued on with the communication fault unresolved, there is a risk of problems such as errors arising in the memory contents of the memory device.

In general, it is preferable for data transfer speeds to be as fast as possible. For example, it is possible to boost data transfer speeds by increasing the clock frequency for data transfers. However, if the clock frequency is too high, the problem of excessively high flow of consumption current through data lines may arise. In the past however, sufficient attention is not paid to the issue of the consumption current needed for communication or data transfer between a control unit and memory devices. If the consumption current needed for data transfer between a control unit and memory devices is reduced, the current capacity of the data transfer circuitry may be reduced as well, thereby affording the advantages of simpler circuit design, as well as lower likelihood of heat emission or noise problems. However, conventional techniques did not demonstrate much innovation in this regard.

Moreover, this issue is not limited to printers, but is rather an issue common to all manner systems having a plurality of memory devices.

SUMMARY OF THE INVENTION

An object of the present invention is to achieve dependable high-speed data transfers in a system having a plurality of memory devices. Another object of the invention is to reduce consumption current during data transfers.

The present invention is addressed to attaining the above objects at least in part according to the following aspects of the invention.

A first aspect of the present invention is directed to a system comprising a control section; and a plurality of memory devices that are bus connected to the control section with a clock signal line and a data signal line, each of the plurality of memory devices prestoring identification information for distinguishing the memory device from the other memory devices. The control section performs a write operation, in synchronism with a clock signal, for transferring write data to one of the plurality of memory devices, utilizing: (i) an identification information transmission period during which the control section sends the identification information of a single memory device to all of the plurality of memory devices through the data line to select the single memory device; (ii) a write data transmission period during which the control section sends a single set of write data having a prescribed size to the selected single memory device; and (iii) a response period during which the selected single memory device responds to the control section with a response signal indicating presence or absence of communication error in relation to the received set of write data. Communications between the control section and the selected memory device during the write data transmission period and the response period are repeatedly performed for each transmission of one of plural sets of write data having the prescribed size. The control section sets a frequency of the clock signal during the response period to a lower value than that of the clock signal during the write data transmission period. According to this system, during the response period the clock signal is set to a frequency lower than the frequency of the clock signal during the write data transmission, thereby reducing the likelihood of a bus collision occurring during switching of the data transmission direction between transmission of write data and return of a response signal. As a result, data transfer can take place in a more dependable manner. Moreover, because a clock signal of higher frequency is used during the write data transmission period, it is possible to achieve faster data transfer.

In a second aspect of the present invention, during the response period, the selected single memory device completes a process of storing in the selected single memory device the single set of write data that is received immediately prior to the response period. With this arrangement, storing of write data can be completed simultaneously with return of the response signal, thus making it possible for write operations to take place faster.

A third aspect of the present invention is directed to a data transfer method between a control section and a plurality of memory devices that are bus connected to the control section with a clock signal line and a data signal line, each of the plurality of memory devices prestoring identification information for distinguishing the memory device from the other memory devices. The method comprises: a write operation, performed by the control section in synchronism with a clock signal for transferring write data to one of the plurality of memory devices, wherein the write operation includes the steps of: (i) sending, performed by the control section, the identification information of a single memory device to all of the plurality of memory devices through the data line to select the single memory device; (ii) sending, performed by the control section, a single set of write data having a prescribed size to the selected single memory device; and (iii) responding, performed by the selected single memory device, to the control section with a response signal indicating presence or absence of communication error in relation to the received set of write data. The step of sending a single set of write data and the step of responding to the control section are repeatedly performed for each transmission of one of plural sets of write data having the prescribed size. A frequency of the clock signal during the response period is set to a lower value than that of the clock signal during the write data transmission period. According to this method, the clock signal during the response step is set to a frequency lower than the frequency of the clock signal during the write data transmission step, thereby reducing the likelihood of a bus collision occurring during switching of the data transmission direction between transmission of write data and return of a response signal. As a result, data transfer can take place in a more dependable manner. Moreover, because a clock signal of higher frequency is used during the write data transmission step, it is possible to achieve faster data transfer.

It is possible for this invention to be embodied in various modes, for example, a board connectable to a liquid ejecting apparatus; a liquid receptacle installable in a liquid ejecting apparatus; a method of accepting from a host circuit data for writing into a data memory section; a system that includes a host circuit and a memory device detachably attachable to the host circuit; a liquid ejecting system; a computer program for accomplishing the functions of such methods or devices; or a recording medium having such a computer program recorded thereon. Herein, "recording medium" refers to a tangible recording medium such as a DVD or hard disk.

BRIEF DESCRIPTION OF THE DRAWINGS

FIGS. 4A and 4B show a configuration of a board according to the embodiment.

DESCRIPTION OF THE PREFERRED EMBODIMENT

The embodiments of the invention will be described below in the following order.
A. Configuration of Printing System (FIGS. 1 to 5):
B. Embodiment 1 (FIGS. 6 to 11):
C. Embodiment 2 (FIGS. 12 to 25):
D. Modified Embodiments:

A. Configuration of Printing System

Figure 1:
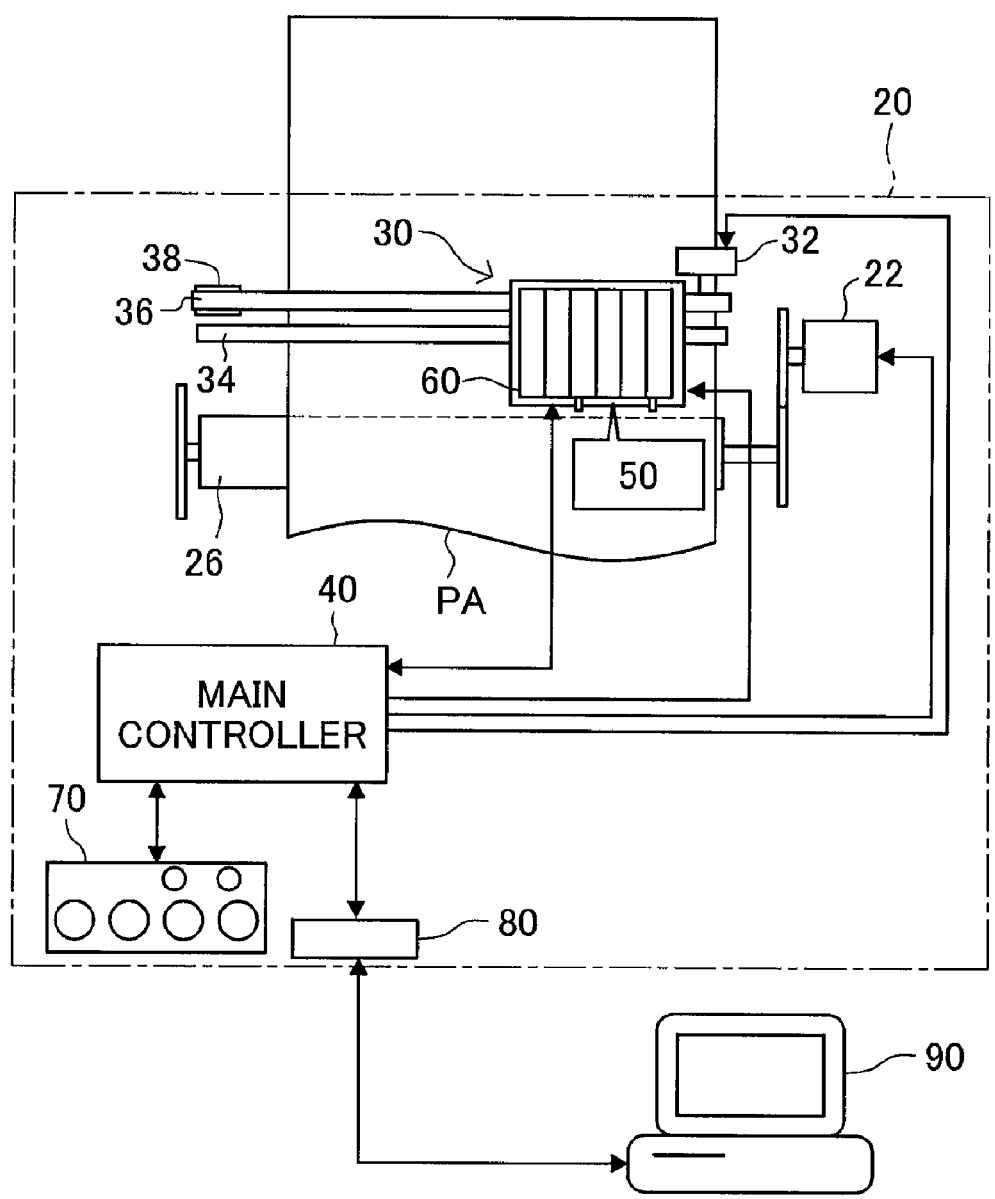
FIG. 1 illustrates a simplified configuration of a printing system.

FIG. 1 is an illustration depicting a simplified configuration of a printing system. The printing system includes a printer 20 provided as the printing device, and a computer 90. The printer 20 is connected to the computer 90 via a connector 80.

The printer 20 is furnished with a sub-scanning feed mechanism, a main scanning feed mechanism, a head driving mechanism, and a main controller 40. The sub-scanning feed mechanism has a paper feed motor 22 and a platen 26, and conveys paper PA in the sub-scanning direction by transmitting rotation of the paper feed motor to the platen. The main scanning feed mechanism includes a carriage motor 32, a pulley 38, a drive belt 36 stretched between the carriage motor and the pulley, and a slide rail 34 disposed parallel to the axis of the platen 26. The slide rail 34 slidably retains a carriage 30 that is affixed to the drive belt 36. Rotation of the carriage motor 32 is transmitted to the carriage 30 via the drive belt 36, whereupon the carriage 30 undergoes reciprocating movement along the slide rail 34 in the axial direction of the platen 26 (the main scanning direction). The head driving mechanism includes a print head unit 60 installed on the carriage 30, and is designed to drive a print head and eject ink onto the paper PA. The main controller 40 controls the above mechanisms and carries out printing operations. The main controller 40 for example receives a print job from a user via the computer 90, and based on the content of the received print job controls the above mechanisms to carry out printing. The print head unit 60 also has a sub-controller 50 for carrying out control of various kinds in coordination with the main controller 40. As is discussed later, a plurality of ink cartridges are detachably installable in the print head unit 60. Specifically, ink cartridges for supplying ink to the print head are installed into the print head unit 60 in such a way as to be attachable and detachable through user operation. The printer 20 also has a console unit 70 allowing the use to perform various printer settings, check printer status, and so on.

Figure 2A:
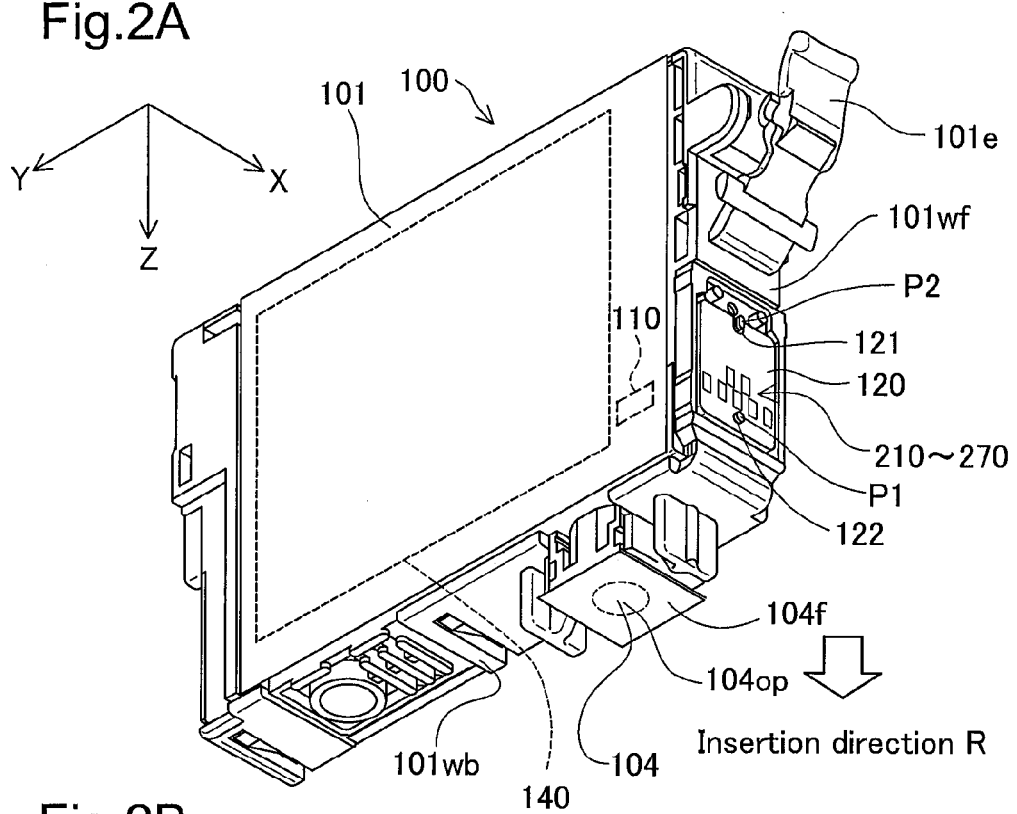
FIGS. 2A and 2B are perspective views depicting a configuration of an ink cartridge according to the embodiment.
Figure 2B:
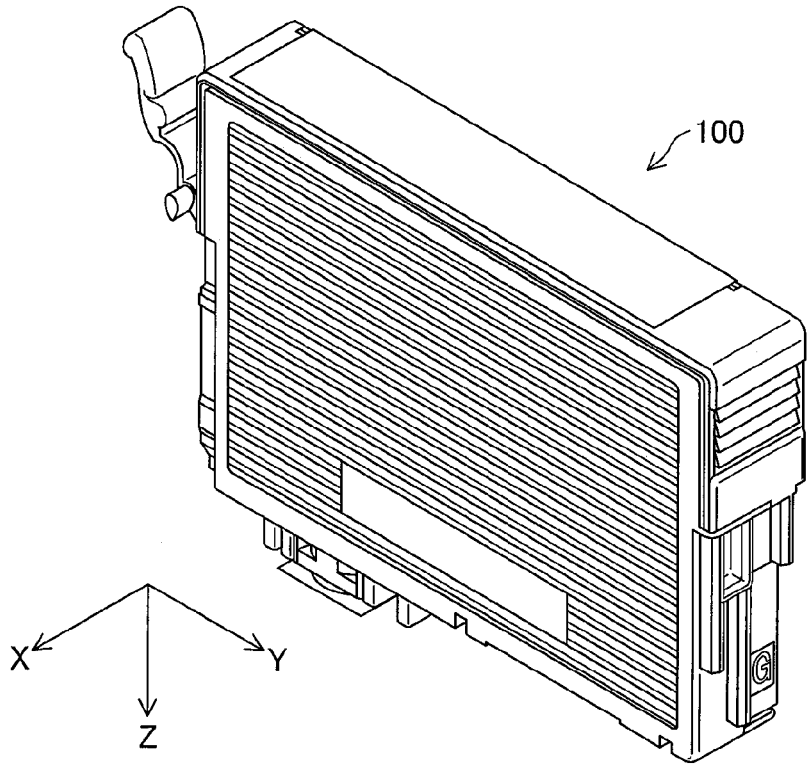

FIGS. 2A and 2B are perspective views depicting a configuration of an ink cartridge according to the present embodiment. The X direction in FIGS. 2A and 2B represents the thickness direction of the ink cartridge 100, the Y direction represents its length direction (longitudinal direction), and the Z direction represents its height direction (vertical direction). The main body 101 of the ink cartridge 100 includes a front wall 101wf and a base wall 101wb. The front wall 101wf intersects the base wall 101wb. In the present embodiment, these walls 101wf, 101wb intersect one another at a right angle. A printed circuit board (herein also called simply "circuit board" or "board") 120 and a catch projection 101e are disposed on the front wall 101wf of the main body 101. Several terminals 210 to 270 are disposed on the outside surface of the circuit board 120. An ink chamber 140 for containing the ink is formed in the interior the main body 101. A sensor 110 used for detecting remaining ink level is also provided in the interior of the main body 101. As the sensor 110 it is possible to employ, for example, a sensor adapted to detect remaining ink level using a piezoelectric element as an oscillator element, and an oscillation detecting element. An ink delivery port 104 that communicates with the ink chamber 140 is provided in the base face of the main body 101. The opening 104op of the ink delivery port 104 is sealed by a film 104f.

In the example of FIGS. 2A and 2B, a single ink tank constitutes a single ink cartridge, but instead a plurality of ink tanks may constitute a single ink cartridge.

Figure 3:
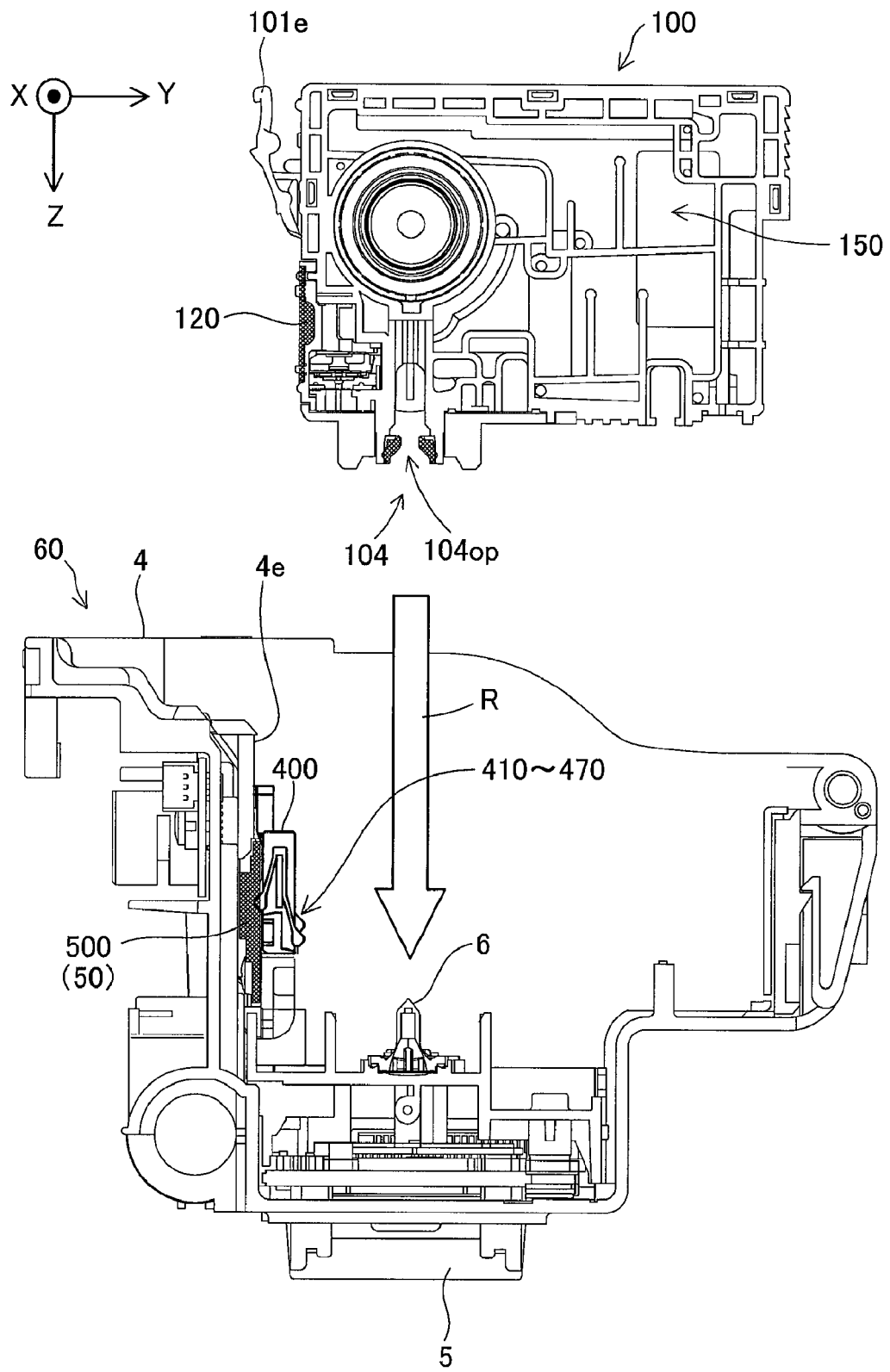
FIG. 3 illustrates a configuration of a print head unit.

FIG. 3 is an illustration depicting installation of an ink cartridge 100 in the print head unit 60. The print head unit 60 includes a holder 4, a connection mechanism 400, a print head 5, and a sub-control board 500. On the sub-control board 500 there are mounted a connection mechanism 400 for electrical connection to the terminals 210 to 270 of the circuit board 120 of the ink cartridge 100; and a sub-controller 50 (also called a "carriage circuit 50"). The holder 4 is designed to accommodate installation of several ink cartridges 100, and is situated on top of the print head 5. The connection mechanism 400 has electrically conductive connection terminals 410 to 470 adapted to provide electrical connection to the several terminals 210 to 270 of the circuit board 120 of the ink cartridge 100, and to the sub-control board 500. Ink delivery needles 6 for delivering ink from the ink cartridges 100 to the print head 5 are situated on the print head 5.

The ink cartridge 100 is installed in the holder 4 through insertion in the +Z direction (insertion direction R). Through installation in this manner, the catch projection 101e of the ink cartridge 100 engages a catch opening 4e of the holder 4, thereby preventing the ink cartridge 100 from accidentally detaching from the holder 4. The ink cartridge 100 can be removed from the holder 4 by pushing the catch projection 101e with the finger while pulling the ink cartridge 100 upward (−R direction). The circuit board 120 which is attached to the ink cartridge 100 is installed in or uninstalled from the printer 20 in association with installation or uninstallation of the ink cartridge 100 by the user. When the ink cartridge 100 is installed in the printer 20, the circuit board 120 electrically connects with the printer 20.

During installation of the ink cartridge 100 in the print head unit 60, the ink delivery needle 6 punctures the film 104f (FIG. 2A) and inserts into the ink delivery port 104. As a result, it is possible for the ink contained in the ink chamber 140 (FIG. 2A) to be delivered to the print head 5 of the printer 20 through the ink delivery needle 6. The print head 5 includes several nozzles and several piezoelectric elements, and is adapted to eject droplets of ink from the nozzles in response to voltage applied to the piezoelectric elements, to produce dots on the paper PA.

FIGS. 4A and 4B show the configuration of the circuit board 120. A hole 122 and a notch 121 for use when securing the circuit board 120 to the main body 101 of the cartridge are formed in the circuit board 120. Meanwhile, two projections P1, P2 are formed on the front wall 101wf (FIG. 2A) of the main body 101 of the cartridge. With the circuit board 120 mounted onto the front wall 101wf, the projections P1, P2 insert respectively into the hole 122 and the notch 121. During manufacture of the ink cartridge 100, after the circuit board 120 is mounted onto the front wall 101wf, the tips of these projections P1, P2 are collapsed, thereby securing the circuit board 120 to the front wall 101wf.

The arrow R in FIG. 4A indicates the direction of insertion of the ink cartridge 100. As depicted in FIG. 4B, the circuit board 120 is provided with a memory device 130 on its back face, i.e. the face lying to the back side from the face that connects to the printer 20; and is provided with a terminal group composed of seven terminals 210 to 270 on its front face, i.e. the face that connects to the printer 20. In the present embodiment, the memory device 130 is a semiconductor memory device that includes a ferroelectric memory cell array. This memory cell array stores data of various kinds relating to the ink or to the ink cartridge 100, such as ink consumption data, ink color, and so on. The ink consumption data is data indicating, for the ink contained in the ink cartridge in question, the cumulative total amount of ink consumed in the course of printing and in cleaning of the head. The ink consumption data may be data representing the amount of ink consumption per se, or data representing ink consumption as a proportion of an initial ink amount initially contained in the ink cartridge.

The terminals on the front face side of the circuit board 120 have each been formed with generally rectangular shape and are arranged so as to form two rows approximately orthogonal to the insertion direction R. Of these two rows, the row situated towards the insertion direction R (the distal edge side in the insertion direction), i.e. to the lower side in FIG. 4A, will be termed the "lower terminal row" or "lower row"; and the terminal row situated to the opposite side from the insertion direction R, i.e. to the upper side in FIG. 4A, will be termed the "upper terminal row" or "upper row". Here, the terms upper and lower are used for convenience for the purpose of description in terms of FIGS. 4A and 4B. The terminals 210 and 220 that form the upper terminal row and the terminals 230 to 270 that form the lower terminal row are arranged with mutually different placement such that their terminal centers do not line up with one another in the insertion direction R. In particular, the terminals 240, 210, 250, 220, 260 apart from the terminals 230, 270 located at the ends are arranged in a staggered pattern.

The upper terminal row is composed of a ground terminal 210 and a power terminal 220. The lower terminal row is composed of a first sensor drive terminal 230, a reset terminal 240, a clock terminal 250, a data terminal 260, and a second sensor drive terminal 270. The five terminals at the center in the sideways direction (i.e. the ground terminal 210, the power terminal 220, the reset terminal 240, the clock terminal 250, and the data terminal 260) are respectively connected to the memory device 130 via wiring pattern layers (not shown) provided on the front and back faces of the circuit board 120, and through-holes situated in the circuit board 120. The two terminals situated at the ends of the lower terminal row (i.e. the first and second sensor drive terminals 230, 270) are connected to the sensor 110 (FIG. 2A) which is provided to the main body 101 of the ink cartridge.

In the circuit board 120, the five terminals 210, 220, 240-260 that are connected to the memory device 130 and the two terminals 230, 270 that are connected to the sensor 110 are situated in proximity to one another. Thus, in the connection mechanism 400 (FIG. 3) on the printer 20 side as well, the connection terminals 410, 420 and 440-460 that correspond to the five terminals 210, 220, 240-260 connected to the memory device 130, and the connection terminals 430, 470 that correspond to the two terminals 230, 270 connected to the sensor 110, are likewise situated in proximity to one another. With the ink cartridge 100 secured in the holder 4, the terminals of the circuit board 120 are electrically connected through contact with the connection terminals 410 to 470 of the connection mechanism 400 provided to the holder 4. Additionally, the connection terminals 410 to 470 of the connection mechanism 400 are electrically connected through contact with the terminal group on the sub-control board 500 and are thereby electrically connected to the sub-controller 50. That is, when the ink cartridge 100 is secured in the holder 4, the terminals 210 to 270 of the circuit board are electrically connected to the sub-controller 50.

Figure 5:
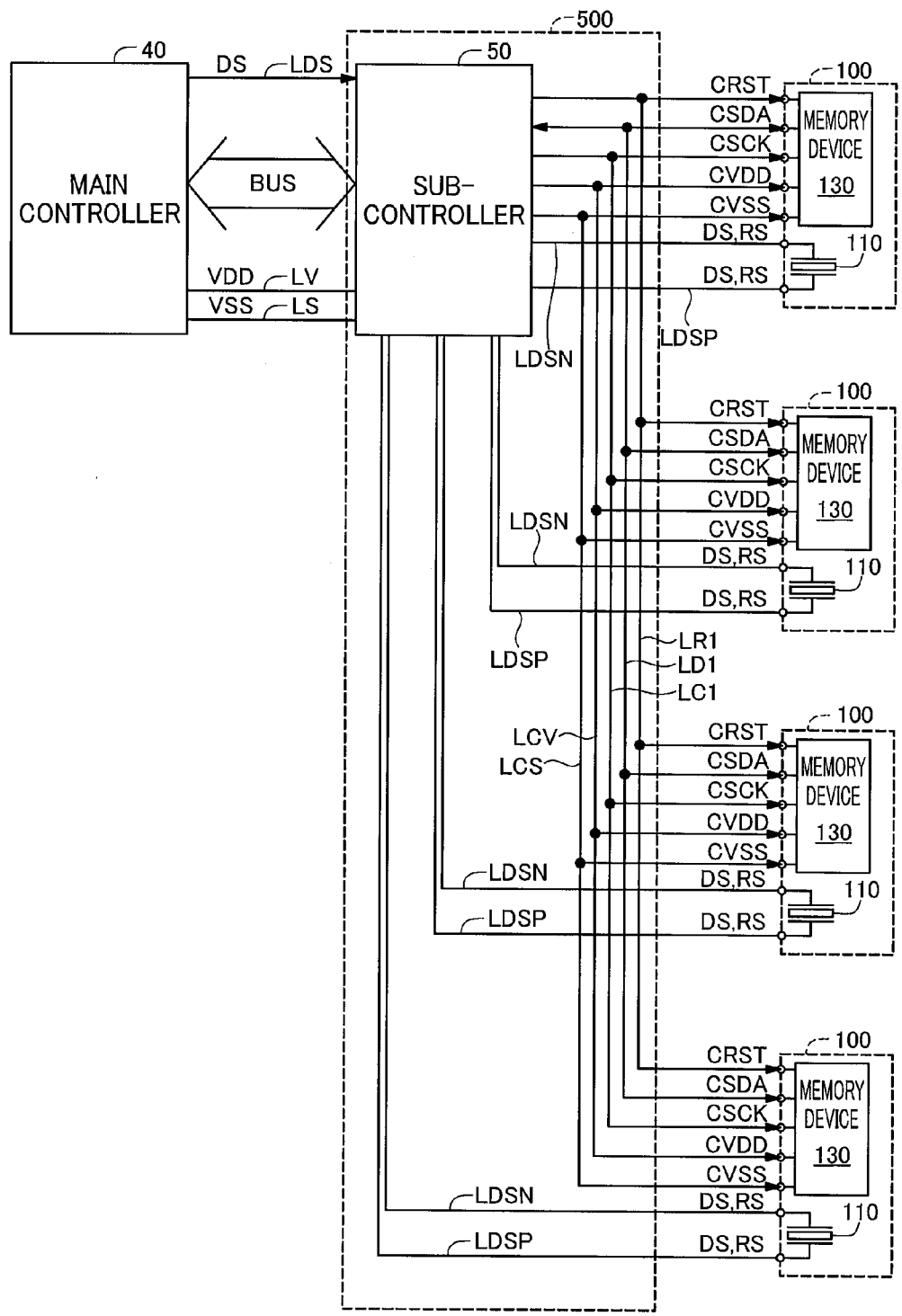
FIG. 5 is a first illustration depicting an electrical configuration of a printer.

FIG. 5 is a block diagram depicting the main controller 40, the sub-controller 50, and the circuit configuration of the ink cartridges 100. In the present embodiment, the main controller 40 and the sub-controller 50 correspond to the control section of the invention recited in the claims. Alternatively, it is possible to refer to the main controller 40 and the sub-controller 50 as a "host circuit". The control section and the memory devices provided to the individual ink cartridges 100 correspond to a "system having a plurality of memory devices and a control section".

The main controller 40 and the sub-controller 50 are electrically connected through several lines. These lines include a bus BS, a second power line LV, a second ground line LS, and a third sensor drive signal line LDS. The bus BS is used for data communications between the main controller 40 and the sub-controller 50. The second power line LV and the second ground line LS are conductive lines for delivering power supply voltage VDD and ground potential VSS, respectively, from the main controller 40 to the sub-controller 50. The power supply voltage VDD uses potential of about the same level as the power supply voltage CVDD supplied to the memory devices 130, for example, about 3.3 V versus ground potential VSS and CVSS of 0 V. Of course, depending on factors such as the generation of processor of the logic IC section of the sub-controller 50, the potential level of the power supply voltage VDD may be a different potential, such as 1.5 or 2.0 V for example. The third sensor drive signal line LDS is a conductive line for providing a sensor drive signal DS for application to the sensor 110, from the main controller 40 to the sub-controller 50.

In the present embodiment, the sub-controller 50 supplies power to the memory devices 130 which are provided as the data memory sections, and also sends commands indicating particular types of access to a memory device 130 in order to write data into the memory device 130 or read data from the memory device 130.

The memory device 130 of each ink cartridge 100 is assigned an 8-bit ID number (identification information) different from all the others. The memory devices 130 of the plurality of ink cartridges 100 are parallel-connected (i.e. bus-connected) to lines from the sub-controller 50. In the event that the sub-controller 50 is to carry out a read or write operation on the memory device 130 of a particular ink cartridge 100, the sub-controller 50 sends an ID number to all of the ink cartridges 100, thereby identifying the particular ink cartridge 100 (specifically, the memory device 130) that is targeted for access.

The lines that electrically connect the sub-controller 50 with each ink cartridge 100 include a reset signal line LR1, a clock signal line LC1, a data signal line LD1, a first ground line LCS, a first power line LCV, a first sensor drive signal line LDSN, and a second sensor drive signal line LDSP.

The reset signal line LR1 is a conductive line for sending a reset signal CRST from the sub-controller 50 to the memory device 130. When a low level reset signal is presented to a memory control circuit inside the memory device 130 by the sub-controller 50, the memory control circuit is reset so that the memory control circuit goes into an initialized state. For example, the address counter and clock counter, discussed later, are reset to an initial value, and a disable flag register 170, discussed later, is set to 0. The clock signal line LC1 is a conductive line for sending a clock signal CSCK from the sub-controller 50 to the memory device 130. The data signal line LD1 is a conductive line for sending data signals CSDA in both directions between the sub-controller 50 and the memory device 130. Data signals CSDA are sent and received synchronously with the clock signal CSCK. For example, the data signal CSDA may begin transmission in sync with the falling edge of the clock signal CSCK, and be received in sync with the rising edge of the clock signal CSCK. These three lines LR1, LC1, LD1 connect the sub-controller 50 with the plurality of ink cartridges 100. In other words, with respect to the three lines LR1, LC1, LD1, the plurality of memory devices 130 are bus-connected to the sub-controller 50. The reset signal CRST, the data signal CSDA, and the clock signal CSCK are all binary signals that have either a high level (e.g. CVDD potential of 3.3 V) or low level (e.g. CVSS potential of 0 V). However, depending on factors such as the generation of processor of the memory device 130, the potential level of the power supply voltage CVDD may be a different potential, such as 1.5 or 2.0 V for example. Herein, a high level signal is also represented by the value "1", and a low level signal is also represented by the value "0".

The first ground line LCS is a conductive line for supplying ground potential CVSS to the memory device 130, and is electrically connected to the memory device 130 via the ground terminal 210 (FIG. 4A) of the circuit board 120. The ground potential CVSS is connected to ground potential VSS (=CVSS potential) supplied to the sub-controller 50 by the main controller 40 via a second ground line LS, and is set to low level of 0 V. The first power supply line LCV is a conductive line for supplying the memory device 130 with the power supply voltage CVDD, which represents the operating voltage of the memory device 130; and is connected to the memory device 130 via the power supply terminal 220 of the circuit board 120. The plurality of memory devices 130 are bus-connected to the sub-controller 50 with regard to these power supply lines LCS, LCV as well.

The first and second sensor drive signal lines LDSN, LDSP are conductive lines adapted to apply a driving voltage to the piezoelectric element of the sensor 110, and after ceasing to apply the driving voltage, transmitting to the sub-controller 50 the voltage generated by the piezoelectric effect of the piezoelectric element. Independent line pairs of first and second sensor drive signal lines LDSN, LDSP are provided for each ink cartridge 100. The first sensor drive signal line LDSN is electrically connected via the first sensor drive terminal 230 (FIG. 4A) to one of the electrodes of the piezoelectric element of the sensor 110. The second sensor drive signal line LDSP is electrically connected via the second sensor drive terminal 270 to the other electrode of the piezoelectric element of the sensor 110.

B. Embodiment 1

Figure 6:
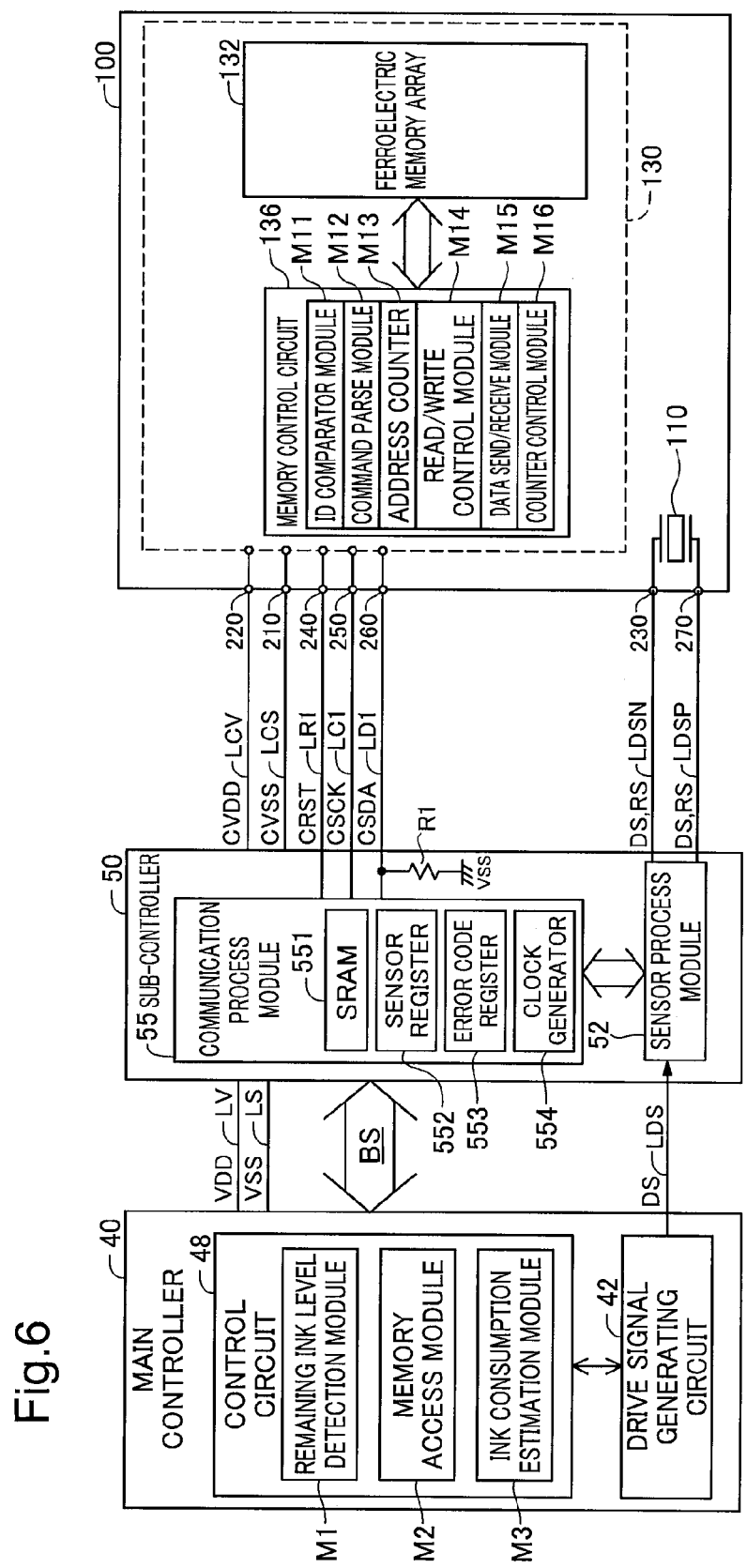
FIG. 6 is a second illustration depicting an electrical configuration of a printer.

FIG. 6 is a block diagram depicting functional configuration of the main control circuit 40 and functional configuration of the sub-controller 50 and an ink cartridge 100 in Embodiment 1. The main controller 40 is provided with a control circuit 48, a drive signal generating circuit 42, and ROM, RAM, EEPROM or the like. Various programs for controlling the printer 20 are stored in the ROM. The control circuit 48 has a CPU (central processing unit), and performs control of the printer 20 as a whole in cooperation with the ROM, RAM, EEPROM or other memory. The control circuit 48 is provided as function blocks with a remaining ink level detection module M1, a memory access module M2, and a ink consumption estimation module M3. It should be noted that "modules" and "sections" are used as synonyms in the specification.

The remaining ink level detection module M1 controls the sub-controller 50 and the drive signal generating circuit 42, drives the sensor 110 of the ink cartridge 100, and decides whether the ink inside the ink cartridge 100 is equal to a prescribed value or greater. Through the sub-controller 50, the memory access module M2 accesses the memory device 130 of the ink cartridge 100 and either reads out information stored in the memory device 130, or updates information stored in the memory device 130. The ink consumption estimation module M3 is designed to count the ink dots that are jetted onto the printer paper in association with execution of printing by the printer 20; and to estimate the amount of ink consumed in printing operations from this ink dot count value and the amount of ink consumed by each dot. The amount of ink consumed in head cleaning operations is estimated as well. On the basis of these ink amounts, a count is kept of the cumulative estimated value for ink consumption consumed by the ink cartridge since the ink cartridge 100 is initially installed in the printer 20.

The EEPROM of the main controller 40 stores data representing a sensor drive signal DS for driving the sensor. In accordance with an instruction from the remaining ink level detection module M1 of the control circuit 48, the drive signal generating circuit 42 reads out from the EEPROM the data that represents a waveform for the sensor drive signal DS, and generates a sensor drive signal DS having the desired waveform. The sensor drive signal DS includes a potential that is higher than the power supply voltage CVDD (in the present embodiment, 3.3 V); in the present embodiment for example, it includes a maximum potential of about 36 V. Specifically, the sensor drive signal DS is a trapezoidal pulse signal having maximum voltage of 36 V.

In the present embodiment, the drive signal generating circuit 42 has an additional function of generating a head drive signal for presentation to the print head 5. Specifically, during determination of the remaining ink amount, the control circuit 48 prompts the drive signal generating circuit 42 to generate a sensor drive signal; and during printing operations it prompts the drive signal generating circuit 42 to generate a head drive signal.

The sub-controller 50 is composed of an ASIC (Application Specific IC), and has a communication process module 55 and a sensor process module 52.

The communication process module 55 carries out communication processes with the main controller 40 via the bus BS. The communication process module 55 also carries out communication processes with the memory devices 130 of the ink cartridges 100 via the reset signal line LR1, the data signal line LD1, and the clock signal line LC1. In the sub-controller 50, the data signal line LD1 is connected to ground potential CVSS potential of 0 V via a pull-down resistor R1. As a result, potential on the data signal line LD1 is held at low level when data signals are not being sent and received between the sub-controller 50 and the memory device 130. By detecting potentials on prescribed terminals in the terminal group of the circuit board 120, the communication process module 55 is able to determine whether the circuit board 120 of an ink cartridge 100 is electrically connected to the printer 20, that is, whether the ink cartridge 100 is installed in the printer 20. The communication process module 55 then notifies the main controller 40 that installation of the ink cartridge 100 is detected. Through this process, the main controller 40 is able to determine whether each of the ink cartridges 100 is mounted in the cartridge mounting section. Once the main controller 40 determined that the circuit boards 120 are electrically connected to the printer 20 and that the ink cartridges 100 are installed in the printer 20, the memory devices 130 of the ink cartridges 100 may be accessed at prescribed timing via the communication process module 55. This access process will be discussed later.

The communication process module 55 is a circuit that is driven at power supply voltage VDD (in the present embodiment, 3.3 V). The ASIC that constitutes the communication process module 55 includes a memory area block configured as SRAM 551 and a logic area, where the logic area is provided with a sensor register 552, an error code register 553, and a clock generator 554. The SRAM 551 is a memory used to temporarily save data during processing by the communication process module 55, for example, to temporarily save data received from the main controller 40, or data received from the sensors 110 or the memory devices 130, for example. Data that is read from the memory devices 130 of the ink cartridges 100 is stored in the SRAM 551. The data stored in the SRAM 551 is updated as necessary in association with execution of printing operations.

The sensor register 552 is a register used by the sensor process module 52 to store results of determination of remaining ink level in each ink cartridge. The error code register 553 is a register for storing communication errors and memory cell errors, discussed later, encountered in relation to the rows or the rewriteable area (discussed later) within each memory device 130. The clock generator 554 generates a clock signal CSCK for use in data transfers between the sub-controller 50 and the memory devices 130. The clock generator 554 has the function of changing the frequency of the clock signal CSCK to different values.

The sensor process module 52 executes a remaining ink level determination process or sensor process using the sensor 110. The sensor process module 52 may include a changeover switch. The changeover switch is used to present a sensor drive signal DS to the sensor 110 of a single ink cartridge 100 that is targeted for the sensor process, doing so via either the first or second sensor drive signal line LDSP.

The sensor 110, which is not depicted in detail in the drawings, is furnished with a cavity (resonance portion) that defines part of the ink flow channel in proximity to the ink delivery section; an oscillator plate forming part of the wall of the cavity; and a piezoelectric element arranged on the oscillator plate. The cavity and the oscillator plate together constitute a sensor chamber. The sensor process module 52 applies a sensor drive signal DS to the piezoelectric element via the sensor drive terminals 230, 270 to induce oscillation of the oscillator plate through the agency of the piezoelectric element. Then, by receiving from the piezoelectric element a response signal RS having the frequency of the residual vibration of the oscillator plate, the sensor process module 52 detects if ink is present or absent in the cavity. Specifically, if the ink contained in the main body 101 is consumed so that the cavity interior changes from a condition of being filled with ink to a condition of being filled with air, the frequency of the residual vibration of the oscillator plate changes. This change in frequency is reflected in a change in frequency of the response signal RS. By measuring the frequency of the response signal RS, the sensor process module 52 is able to detect if ink is present or absent in the cavity. Detecting that ink is "absent" in the cavity means that the remaining ink level contained in the main body 101 is equal to or less than the first threshold value Vref1. This first threshold value Vref1 is a value that corresponds to the volume of the flow channel to the downstream end from the cavity of the sensor chamber. Detecting that ink is "present" in the cavity means that the remaining ink level contained in the main body 101 is greater than the first threshold value Vref1.

Next, the electrical configuration of the ink cartridges 100 will be described. Each ink cartridge 100 has a memory device 130 and a sensor 110. The memory device 130 includes a ferroelectric memory array 132 provided as a data memory section, and a memory control circuit 136. As indicated by white circles on the broken lines that represent the memory device 130 in FIG. 6, the memory device 130 is provided with a ground terminal for electrical connection to the ground terminal 210 of the circuit board 120, a power supply terminal for electrical connection to the power supply terminal 220, a reset terminal for electrical connection to the reset terminal 240, a clock terminal for electrical connection to the clock terminal 250, and a data terminal for electrical connection to the data terminal 260. The memory device 130 is a type of memory that does not accept address data specifying an address for access from the outside. While the memory device 130 does not accept direct input of address data, an access control to memory cells is possible in response to an externally supplied clock signal CSCK and command data.

The ferroelectric memory cell array 132 is a nonvolatile semiconductor memory cell array that uses ferroelectric elements as the memory elements, and provides a memory area having a data-rewritable feature.

The memory control circuit 136 is designed to control read and write operations to the ferroelectric memory cell array 132 in response to the command data from the sub-controller 50. The memory control circuit 136 analyses identification data and command data sent from the sub-controller 50. Also, during the write cycle, on the basis of write data received from the sub-controller 50, the memory control circuit 136 executes writing of data to the ferroelectric memory cell array 132. During the read cycle, on the basis of read data from the ferroelectric memory cell array 132, the memory control circuit 136 executes sending of data to the sub-controller 50. The memory control circuit 136 is furnished with an ID comparator module M11, a command parse module M12, an address counter M13, a read/write control module M14, a data send/receive module M15, and a counter control module M16. The operations of these modules are discussed below.

(1) ID Comparator Module M11

The ID comparator module M11 is designed to compare an ID number supplied from the sub-controller 50 with an ID number that is assigned to its own memory device 130, and decide whether the memory device 130 is the target of access. The ID number that is assigned to the memory device 130 is stored in the memory cells that are connected to a word line selected on the basis of the output of the address counter M13 when access from the sub-controller 50 is initiated after the initialization of the memory device 130. Here, the ID number is used by the sub-controller 50 to identify a particular memory device 130 targeted for access, from among the several memory devices 130 bus-connected to the sub-controller 50. This ID number may be chosen according to the color of the ink contained in the ink cartridge 100, for example.

(2) Command Parse Module M12

The command parse module M12 is designed to parse Start of Frame data (SOF), End of Frame (EOF) data, and command data sent from the sub-controller 50, and to decide the start of access and end of access from the sub-controller 50, as well as the type of access (read, write, etc.).

(3) Address Counter M13

The address counter M13 is a counter that indicates row addresses of word lines targeted for access in the memory cell array 132. The count value of the address counter M13 resets to its initial value when a low level reset signal CRST is input to the memory device 130 to initialize the memory device 130. This initial address value is a value that indicates the row address of the memory cells storing the ID number. Then, based on control by the counter control module M16, the address value counts up appropriately in accordance with the clock signal CSCK input to the memory device 130. When the memory cell array 132 is accessed through control by the read/write control module M14, the counter value of the address counter M13 is output from the address counter M13 to an address decoder (row decoder), not shown.

(4) Read/Write Control Module M14

Depending on the access type specified by the command data parsed by the command parse module M12, the read/write control module M14 performs a batch write operation into a single row and a batch read operation from a single row on a single word line selected by the address counter M13. The read/write control module M14 is provided with a register and a buffer, not shown.

(5) Data Send/Receive Module M15

The data send/receive module M15 synchronously with the clock signal CSCK receives data signals CSDA sent from the sub-controller 50 via the data signal line LD1; and in sync with the clock signal CSCK sends data signals CSDA via the data signal line LD1. Specifically, the data send/receive module M15 sets the send/receive direction for data signals CSDA exchanged between the memory device 130 and the sub-controller 50.

(6) Counter Control Module M16

The counter control module M16 is provided with a clock counter for counting the number of pulses of the clock signal CSCK, and on the basis of this count value presents the address counter M13 with a control signal instructing it to count up or count down. Specifically, after access to a memory device 130 by the sub-controller 50 is initiated, the counter control module M16 counts the number of clock pulses of the clock signal CSCK input to the memory device 130, and each time that a prescribed number of pulses is counted outputs to the address counter M13 a control signal to cause the address counter M13 to either count up or count down the count value of the address counter M13, based on the result of command parsing by the command parse module M12.

Figure 7:
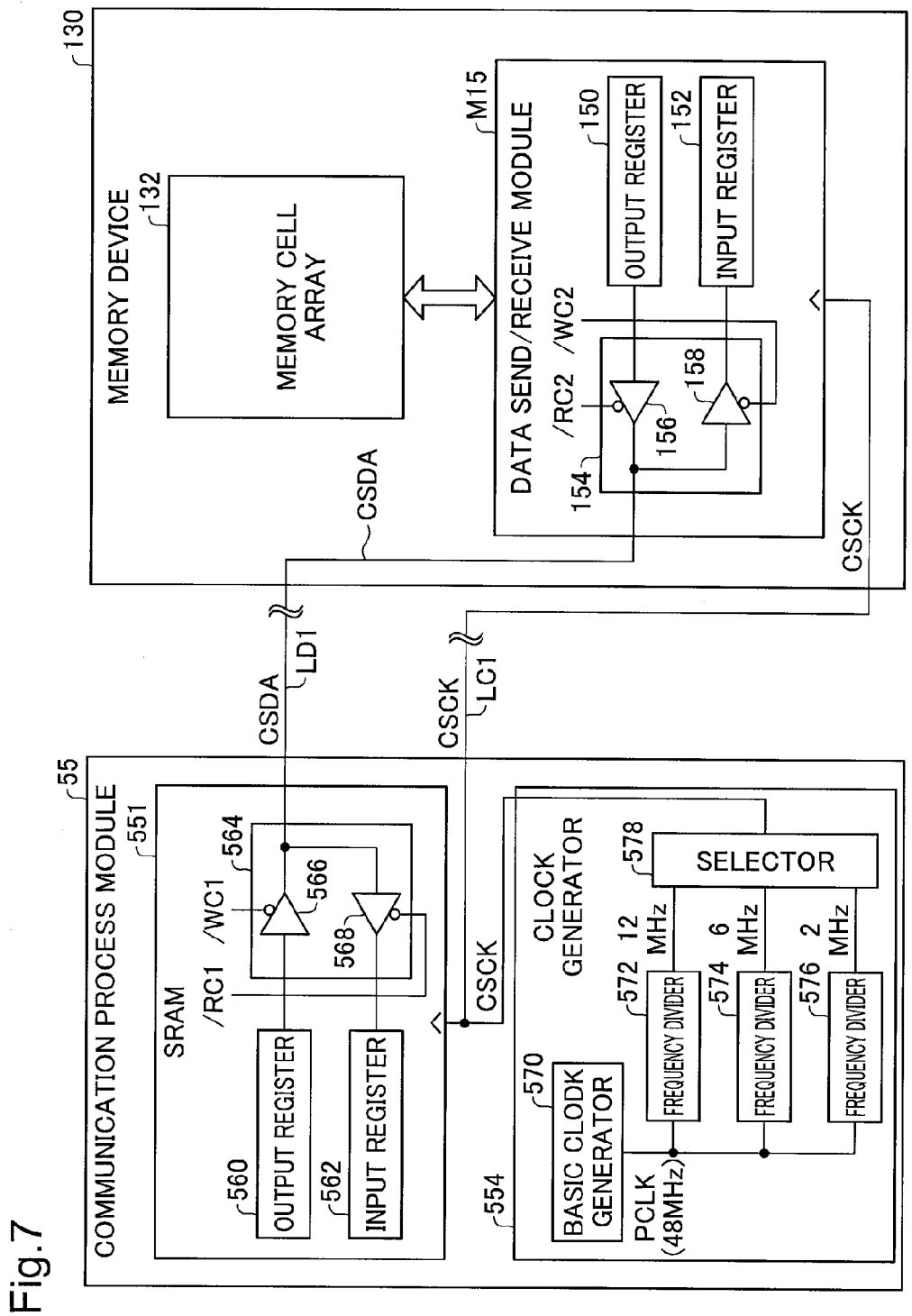
FIG. 7 is a block diagram depicting internal configuration of a SRAM input section, a clock transmission module, and a data send/receive module.

FIG. 7 is a block diagram depicting the internal configuration of the input/output section of the SRAM 551 and the clock generator 554 in the communication process module 55, and of the data send/receive module M15 in the memory device 130. The input/output section of the SRAM 551 has an output register 560, an input register 562, and a switching circuit 564 for switching the send/receive direction. The output register 560 is a memory section for temporary storage of data to be sent to memory devices 130; and the input register 562 is a memory section for temporary storage of data that is received from memory devices 130. The switching circuit 564 includes a first 3-state buffer circuit 566 that is connected to the output register 560, and a second 3-state buffer circuit 568 that is connected to the input register 562. In response to a write control signal /WC1 provided by the logic circuit in the communication process module 55, the first 3-state buffer circuit 566 is set to the conduction state during data transmission (data write cycle), and is set to the high impedance state (non-conduction state) during data reception (data read cycle). The second 3-state buffer circuit 568 operates in the opposite way from the first 3-state buffer circuit 566, and is set to the high impedance state (non-conduction state) during data transmission (data write cycle) while being set to the conduction state during data reception (data read cycle) in response to a read control signal /RC1. The second 3-state buffer circuit 568 for data input purposes may be replaced with an ordinary buffer circuit.

Herein, "data read" means the process of reading data from a memory device 130 to the sub-controller 50 (i.e. the printer), while "data write" means the process of writing data to a memory device 130 from the sub-controller 50 (i.e. the printer).

Like the SRAM 155, the data send/receive module M15 in the memory device 130 has an output register 150, an input register 152, and a switching circuit 154. The switching circuit 154 includes two 3-state buffer circuits 156, 158. In response to a read control signal /RC2 provided by the read/write control module M14 (FIG. 6) of the memory device 130, the first 3-state buffer circuit 156 for output purposes is set to the conduction state during data transmission (data read cycle), and is set to the high impedance state (non-conduction state) during data reception (data write cycle). The second 3-state buffer circuit 158 operates in the opposite way from the first 3-state buffer circuit 156, and is set to the high impedance state (non-conduction state) during data transmission (data read cycle), while being set to the conduction state during data reception (data write cycle) in response to a write control signal /WC2.

With the memory device 130 in the initialized state, the send/receive direction of the switching circuits 564, 154 are set to the direction of receiving by the memory device 130. Specifically, when the printer 20 is powered on, or when ink cartridge installation is detected during replacement of an ink cartridge 100, the memory device 130 is initialized; and subsequently, when access of the memory device 130 by the sub-controller 50 is initiated, the send/receive direction of the switching circuits 564, 154 is set to the direction of receiving by the memory device 130. When access of the memory device 130 is initiated, if an ID number (also called "identification data" or "identification information") provided by the communication process module 55 is found not to match the ID number that is stored in the memory device 130, the second 3-state buffer circuit 158 used for input purposes is set to the high impedance state. The result is a condition in which the other memory devices 130 apart from the memory device 130 targeted for access do not receive data, thereby reducing the current on the data signal line LD1 so that power savings is achieved.

The clock generator 554 has a basic clock generator 570, three frequency dividers 572, 574, 576, and a selector 578. The basic clock generator 570 generates a basic clocking signal RCLK which has the highest frequency f0. This basic clocking signal RCLK is used as the operating clock for the various circuits in the communication process module 55. The three frequency dividers 572, 574, 576 respectively divide this basic clocking signal RCLK by different frequency division ratios to generate clock signals f1, f2, f3 of three different frequencies. In the example of FIG. 7, f0=48 MHz, f1=12 MHz, f3=6 MHz, and f3=2 MHz. However, these frequency values may be set at various other values. With regard to the number of different clock signal frequencies, any number of frequencies equal to 2 or more may be selected. In response to a selection signal presented from logic circuitry, the selector 578 selects one of the three clock signals CSCK of different frequencies f1, f2, f3, and presents the selected clock signal to other circuits (the SRAM 551 and the memory device 130) as the clock signal CSCK for the purpose of data transfer with the memory device 130. It is sufficient for the clock generator 554 to have a function whereby it is able to change the frequency of the clock signal CSCK, so various configurations other than the configuration shown in FIG. 7 may be employed. For example, a circuit configuration that uses a PLL circuit enabling change to several different frequencies may be employed.

Figure 8:
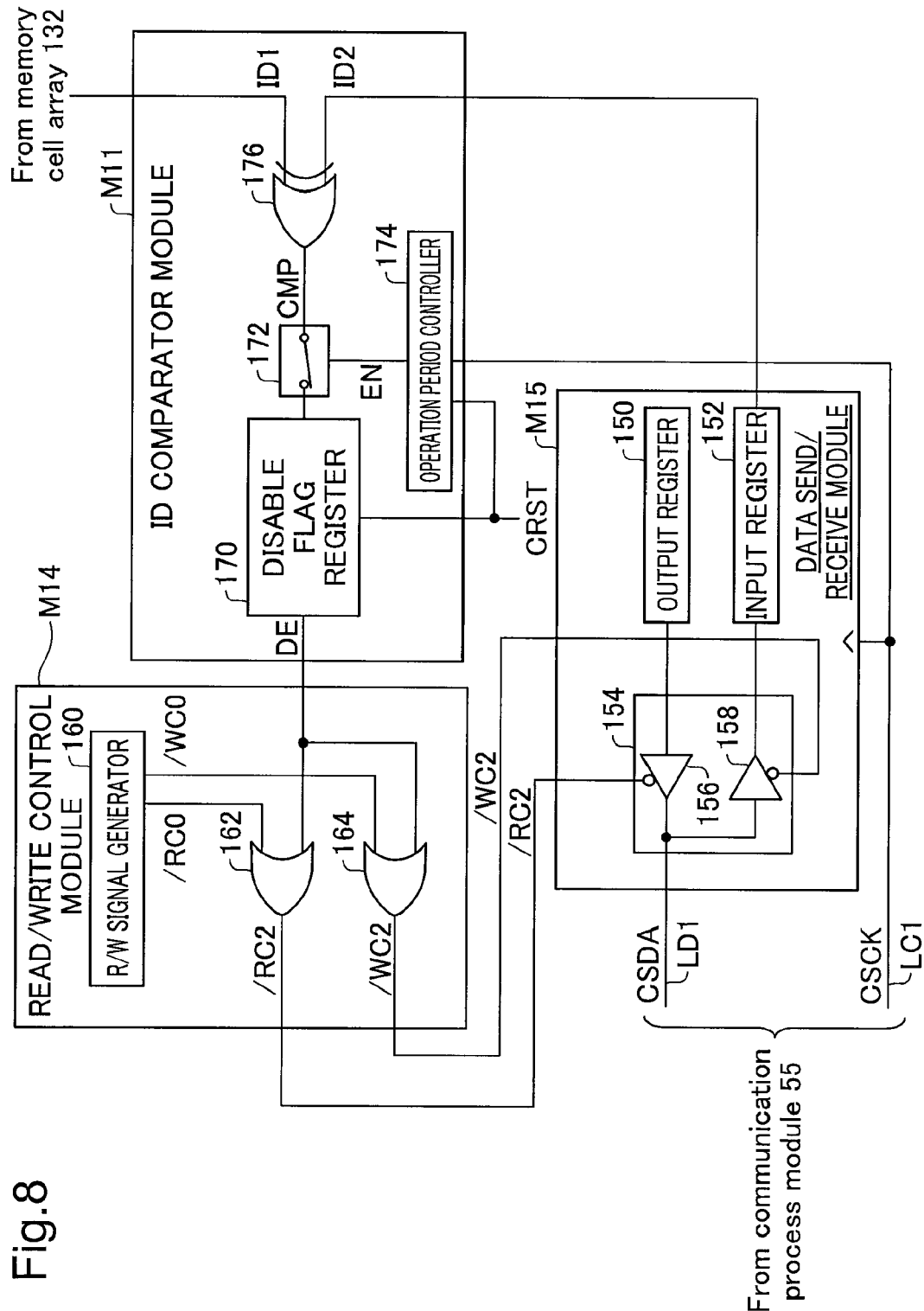
FIG. 8 is a block diagram depicting internal configuration of an ID comparator module, a read/write control module, and a data send/receive module in the memory device of Embodiment 1.

FIG. 8 is an illustration depicting the internal configuration of the ID comparator module M11, the read/write control module M14, and the data send/receive module M15 of a memory device 130. The configuration of the ID comparator module M1 is the same as that shown in FIG. 7. The read/write control module M14 has a R/W signal generator 160 for generating a read control signal /RC0 and a write control signal /WC0; and two OR circuits 163, 164. On the basis of the result of command parsing by the command parse module, the R/W signal generator generates either a read control signal /RC0 or a write control signal /WC0. The read control signal /RC0 is a signal that goes to 0 at times of data transmission to the printer, and goes to 1 at other times. The write control signal /WC0 on the other hand is a signal that goes to 0 at times of data reception from the printer, and goes to 1 at other times. In no instance will the read control signal /RC0 and the write control signal /WC0 both be 1 or both be 0. The read control signal /RC0 and the write control signal /WC0 are respectively input to one input terminal of each of the OR circuits 162, 164, while a disable flag DE generated by the ID comparator module M11 is input to the other input terminal. The disable flag DE will be discussed later.

The ID comparator module M11 has a disable flag register 170, a switch 172, an operation period controller 174, and an EX-OR circuit 176. The EX-OR circuit 176 is a match comparison circuit adapted to sequentially compare, in one bit increments, an identification data value ID2 that is supplied by the sub-controller 50 (FIG. 6) via the data send/receive module M15, with an identification data value ID1 that is read from the memory cell array 132, and to determine if the two match. When the two identification data values ID1, ID2 match, the EX-OR circuit 176 outputs a 0-level comparison signal CMP, and when they do not match it outputs a 1-level comparison signal CMP. This comparison signal CMP is presented to the disable flag register 170 via the switch 172. If the comparison signal CMP has a value of 1, the disable flag register 170 subsequently brings up the disable flag DE from 0 to 1, and maintains the disable flag DE at a value of 1 thereafter. The operation period controller 174 generates an operation period signal EN that has 1 level only for the duration of the period in which the identification data comparison process is to take place (referred to as the "ID comparison period", "ID determination period" or "identification information transmission period"), and presents the signal to the switch 172. In response to the operation period signal EN, the switch 172 holds the ON state for the duration of the ID comparison period. Consequently, even if the value of the comparison signal CMP goes to 1 prior to the ID comparison period, the disable flag DE is not set to a value of 1.

The disable flag DE which is set in the disable flag register 170 is input to the two OR circuits 162, 164 in the read/write control module M14. The first OR circuit 162 presents the control terminal of the first 3-state buffer 154 of the data send/receive module M15 with a signal /RC2 that takes the OR of the read control signal /RC0 and the disable flag DE. The second OR circuit 164 presents the control terminal of the second 3-state buffer 156 of the data send/receive module M15 with a signal /WC2 that takes the OR of the write control signal /WC0 and the disable flag DE. Consequently, even in instances in which either the read control signal /RC0 or the write control signal /WC0 is 0, if the disable flag DE is 1 (i.e. if the ID numbers do not match), the connection between the data send/receive module M15 and the data line is switched to the high impedance state, preventing subsequent data transfer. A specific example will be described later.

The circuit configurations and functional configurations illustrated in FIGS. 6 to 8 are merely exemplary and may be modified. For example, it is possible for the main controller 40 and the sub-controller 50 to be constituted as a single control section. Also, as the internal configuration of the ID comparator module M11 (FIG. 8) it is possible to employ any design adapted to compare identification data provided by the printer 20 with identification data previously stored in the memory device 130, and to generate a comparison result signal indicating the result of the comparison. As a specific example, a multiple-bit match comparison circuit adapted to compare all of the bits of two sets of identification data may be employed. However, a single-bit match comparison circuit like that depicted in FIG. 8 has the advantage of simpler circuit design. Another advantage of the configuration of FIG. 8 is that because identification data is targeted for match detection in one bit increments in the order they are received, the existence or lack of a match between the identification data is detected sooner, as compared to the case where the match detection process must wait until all bits of the identification data is received.

Figure 9:
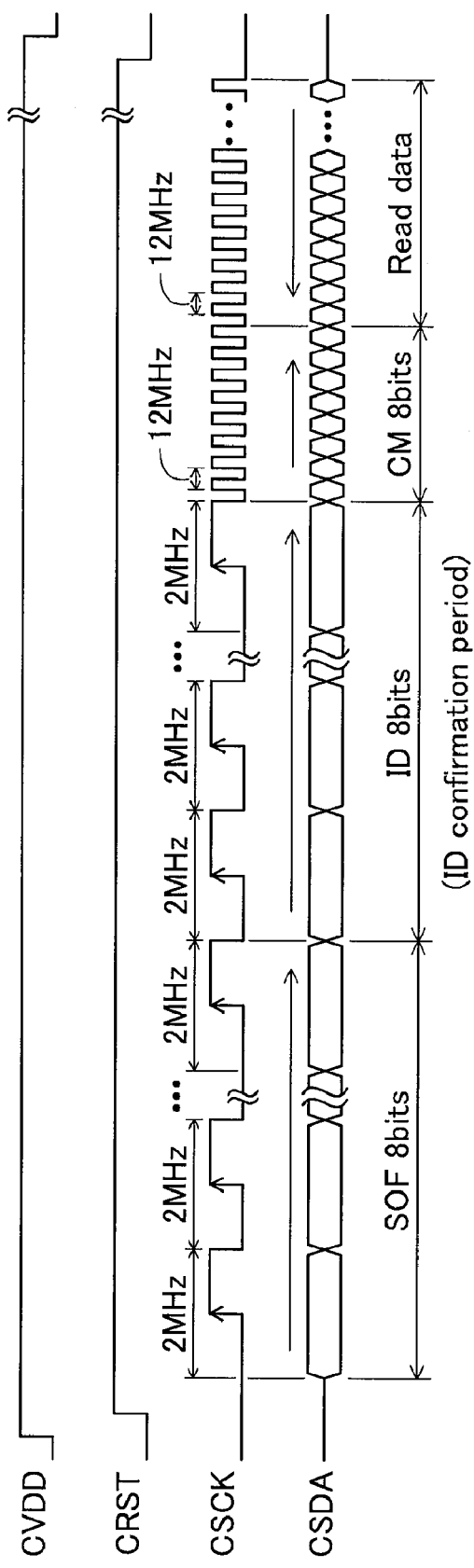
FIG. 9 is a timing chart schematically depicting sent and received signals during the read cycle from a memory device in Embodiment 1.

FIG. 9 is a timing chart schematically depicting signals sent and received between the communication process module 55 of the printer 20 and the memory control circuit 136 of a memory device 130 in Embodiment 1 during a single read operation cycle from the memory device 130. An example of a power supply voltage CVDD, a reset signal CRST, a clock signal CSCK, and a data signal CSDA is depicted here. The power supply voltage CVDD is a signal that appears on the first power supply line LCV connecting the sub-controller 50 and the memory device 130, and is supplied to the memory device 130 by the sub-controller 50. The reset signal CRST is a signal that appears on the reset signal line LR1 connecting the sub-controller 50 and the memory device 130, and is supplied to the memory device 130 by the sub-controller 50. The clock signal CSCK is a signal that appears on the clock signal line LC1 connecting the sub-controller 50 and the memory device 130, and is supplied to the memory device 130 by the sub-controller 50. The data signal CSDA is a signal that appears on the data signal line LD1 connecting the sub-controller 50 and the memory device 130. In FIG. 9, arrows indicating the data direction of the data signal CSDA are shown as well. The rightward pointing arrows represent the direction in which the sub-controller 50 is at the sending side and the memory device 130 is at the receiving side. The leftward pointing arrows represent the direction in which the sub-controller 50 is at the receiving side and the memory device 130 is at the sending side. In the present embodiment, the memory device 130 receives data synchronously with the rising edge of the clock signal CSCK supplied by the sub-controller 50. That is, at times of the rising edge of the clock signal CSCK, the level of the received data signal is that of a valid data value.

Via the bus BS, the main controller 40 of the printer 20 (FIG. 6) sends the sub-controller 50 a Read command instructing that the memory device 130 of the ink cartridge 100 be read. In response to the command, the communication process module 55 supplies power supply voltage CVDD to each of the ink cartridges 100. Specifically, the memory device 130 of each of the ink cartridges 100 is supplied with operating voltage, thereby placing the memory device 130 in the operational state. After supplying the power supply voltage CVDD, a low level reset signal CRST is supplied to initialize the memory devices 130. Because the reset signal CRST remains at low level since the time that the previous access ended, it is at low level even before the power supply voltage CVDD is supplied to the memory devices 130.

Upon receiving the Read command from the main controller 40, the communication process module 55 of the sub-controller 50 initiates the read operation. Once the read operation is initiated, the communication process module 55 brings the reset signal CRST from low level to high level, and transmits a clock signal CSCK of prescribed frequency (here, 2 MHz). Once the reset signal CRST goes from low level to high level, the memory devices 130 enters into a state in which they accept data signals CSDA from the communication process module 55. The communication process module 55 then sends SOF (Start of Frame) data, identification data indicating a single memory device 130 targeted for access, and command data. The one memory device 130 that is selected by the identification data reads out data from its own memory cell array 132, and send it as read data to the communication process module 55. Once one read operation cycle is completed in this way, the communication process module 55 brings the reset signal CRST and the power supply voltage CVDD to low level, thereby completing one read operation cycle. Transmission of SOF data may be omitted.

The SOF data is a signal providing notification of the start of communication of the sub-controller 50 with the memory devices 130. The identification data is information used to select a single memory device 130 targeted for access. The command data CM is an instruction indicating the content of an operation to take place between the communication process module 55 and the memory device 130. In the example of FIG. 9, a command indicating a read operation is sent as the command data CM. Because the identification data and the command data CM identify a single memory device 130 targeted for access and a specific type of data transfer operation, these two sets of data ID and CM may be collectively termed "operation code".

As depicted in FIG. 9, the frequency of the clock signal CSCK is set to low frequency (2 MHz) during the transmission period for the SOF data and identification data, and is set to high frequency (12 MHz) during the transmission period for the command data CM and the read data. The reason for switching the clock frequency in this way is as follows. It is well known that consumption current (power consumption) of digital circuits such as memory increases sharply with a rise in clock frequency. During transmission of identification data, identification data is transmitted to several memory devices 130 connected to the sub-controller 50, and a single memory device 130 targeted for access is selected. Thus, at least during the initial phase of the identification data transmission period (also called the "ID confirmation period"), it is necessary to transmit identification data to all of the memory devices 130. Because all of the memory devices 130 are operational at this time, increasing the clock frequency gives rise to the problem of large consumption current flowing on the data signal line LD1. Flow of high current at high-frequency on the data signal line LD1 may also cause circuits to overheat, and produce considerable noise. Also, because the data signal line LD1 has a large capacitance component (electrostatic capacitance) under conditions in which multiple memory devices 130 are connected to the data signal line LD1, if the clock frequency is too high, difficulty of correctly transferring the identification data may become a problem as well. For these reasons, during the period up to completion of transmission of the identification data, the clock frequency is set to a low value (2 MHz in the example of FIG. 9), thereby preventing such problems from arising. On the other hand, once a single memory device 130 is selected for access through transmission of identification data, the data send/receive modules M15 of the other memory devices 130 (FIG. 8) set their connections to the data signal line LD1 to the high impedance state. Consequently, in the period following completion of transmission of the identification data, even if the clock frequency is set to a high value (12 MHz in the example of FIG. 9), there is no concern of such problems arising. Also, by setting the clock frequency to a high value during the read data transmission period, it is possible to boost the transfer speed of the read data.

In the example of FIG. 9, because transfer of the read data takes place subsequent to transfer of the command data CM, the period following transfer of the command data CM is the "data transfer period" narrowly defined. However, it is possible to refer to an period which combines the command data CM transfer period and the read data transfer period as the "data transfer period" in the broad sense. Herein, unless indicated otherwise, the term "data transfer period" is used in this broad sense. The command data CM may be transferred prior to the identification data as well. In this case, it is preferable for the clock frequency during transmission of the command data CM to be lower (e.g. 2 MHz) than the frequency in the read data transfer period, for the reasons mentioned above. This applies to transfer of write data as well.

Figure 10:
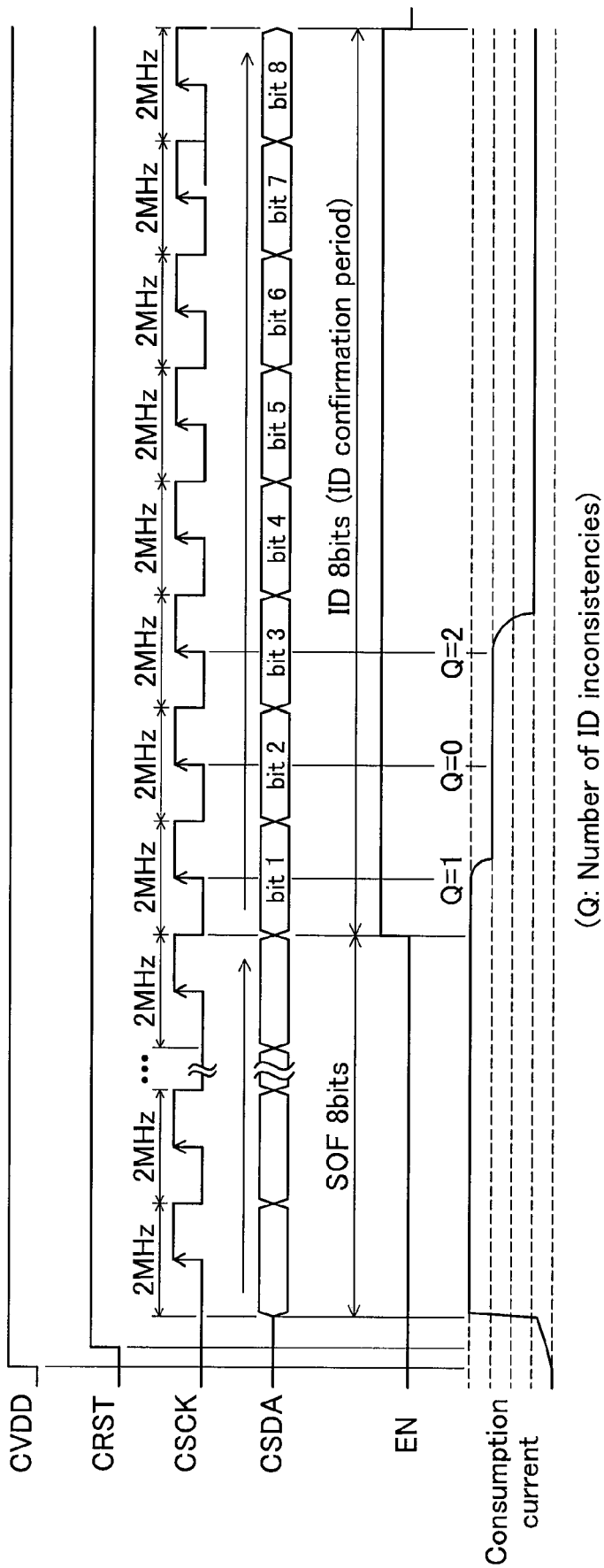
FIG. 10 shows change in consumption current during an ID confirmation period.

FIG. 10 is an illustration depicting changes in consumption current of the data signal line LD1 during the ID confirmation period. Here, in addition to the four signals CVDD, CRST, CSCK and CSDA shown in FIG. 9, there are shown the operation period signal EN which is generated by the operation period controller 174 (FIG. 8) of the ID comparator module M11, and the consumption current of the communication process module 55. The operation period signal EN goes to 1 only during the ID confirmation period, and is 0 at other times. During the period in which the operation period signal EN is 1, the ID comparator module M11 compares the identification data supplied by the communication process module 55 with the identification data read out from the memory cell array 132 to determine if they match, doing so one bit at a time in the order in which the data is received. If a bit value of the received identification data does not match the corresponding bit value of the identification data read from the memory cell array 132, the ID comparator module M11 brings up the disable flag DE from 0 to 1. As a result, the 3-state buffers 154, 156 in the switching circuit 154 of the data send/receive module M15 is in the high impedance state, severing the connection between the data signal line LD1 and the memory device 130.

In the example of FIG. 10, four memory devices 130 (i.e. four ink cartridges) are installed in the printer 20. Once transmission of SOF data begins, there is an appreciable increase in consumption current flowing on the data signal line LD1. This is due to the fact that the SOF data is sent to all four memory devices 130. In the ID confirmation period, with respect to the first bit of the identification data it is determined that the identification data is a non-match for one of the four memory devices 130; the number of ID inconsistencies Q at that time is equal to 1 as shown in FIG. 10. At this point, the connection between the data signal line LD1 and the memory device 130 is in the high impedance state, so consumption current falls by the equivalent of one device. For the second bit of the identification data, because there is no device for which the identification data is determined to be a non-match, consumption current is unchanged. For the third bit of the identification data, because there are two memory devices among the remaining three devices for which the identification data is determined to be a non-match, consumption current falls by the equivalent of two devices. At this point, only the single memory device that is selected in this way remains connected to the data signal line LD1 and is targeted for subsequent access. Even if the number of memory devices 130 exceeds four, the ID comparison process takes place in the same way in order to select only a single memory device for access.

In this way, according to the present embodiment, each time that identification data is sent one bit at a time to a memory device 130, the memory device 130 determines whether there is a match with the identification data stored therein, whereby non-matches of identification data is detected sooner. If corresponding bits in the two sets of identification data do not match, the memory device 130 immediately sets its connection to the data signal line LD1 to the high impedance state, thus making it possible to keep consumption current to a minimum. Because it suffices for the data transmission circuit in the communication process module 55 simply to have current capacity such that the maximum consumption current shown in FIG. 10 can pass through during the SOF data transmission period, it is possible to install a circuit with a low amperage rating. In this sense, it is preferable for the identification data to be assigned in such a way that one or more of the memory devices 130 may bring their connection to the data signal line LD1 to the high impedance state during comparison of the first bit of the identification data. For example, for N memory devices 130 installed in the printer, it is preferable to set the first bit of identification data for a first group of N/2 memory devices to a different value than that for a second group of the remaining N/2 memory devices.

Figure 11:
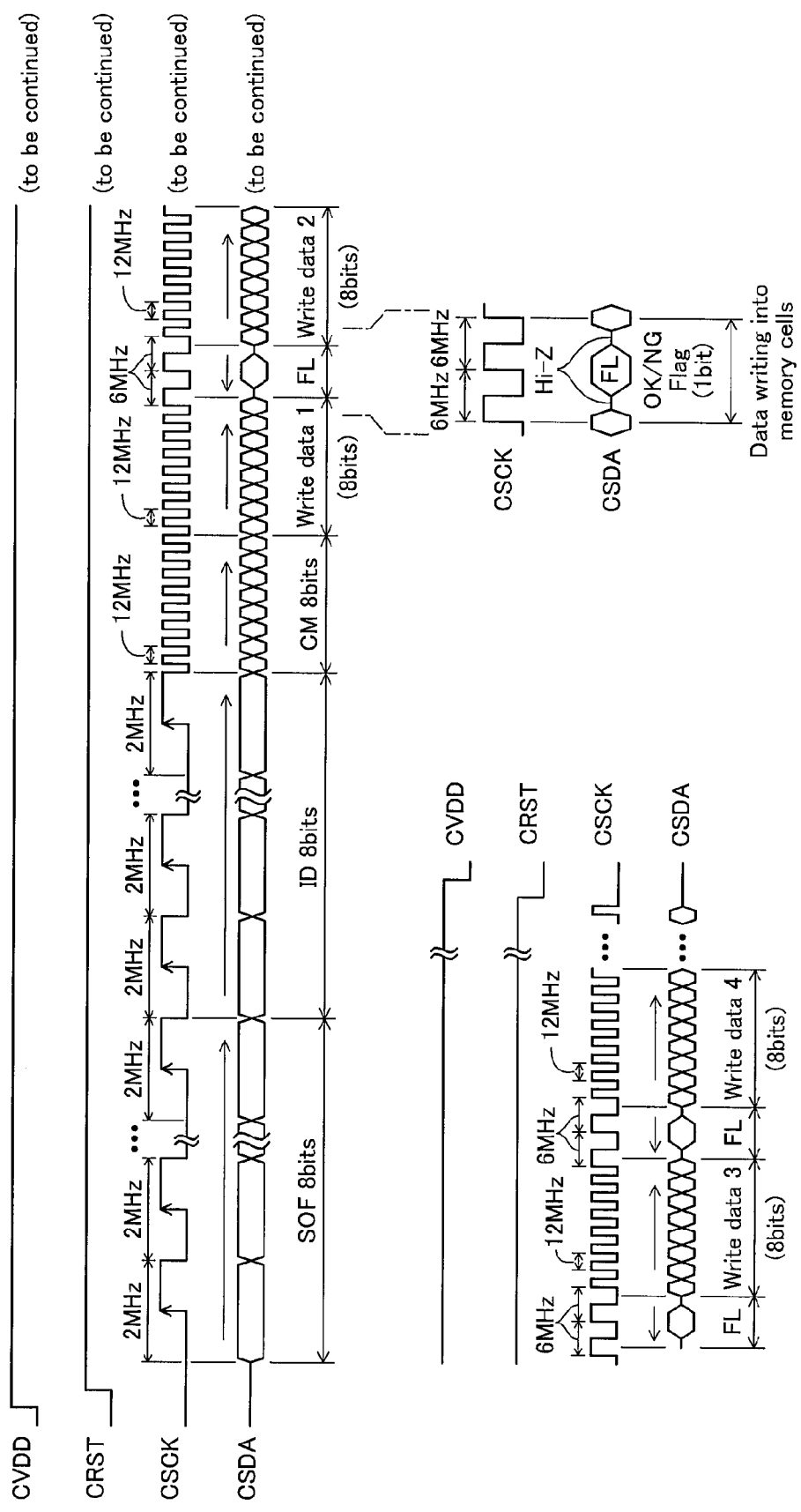
FIG. 11 is a timing chart schematically depicting sent and received signals during a write operation to a memory device in Embodiment 1.

FIG. 11 is a timing chart schematically depicting signals sent and received between the communication process module 55 of the printer 20 and the memory control circuit 136 of a memory device 130 in Embodiment 1 during a single write operation cycle from the memory device 130. The process for sending SOF data, identification data, and command data CM from the communication process module 55 to the memory device 130 is the same as in the read operation discussed above (FIGS. 9, 10). However, a Write command is sent as the command data CM to the memory device 130.

The communication process module 55 sends write data to the memory device 130 starting at the next pulse after transmission of the command data CM is completed. At this time, the communication process module 55 transmits 1 bit of data in sync with the falling edge of the clock signal CSCK, and the memory device 130 receives one bit of data in sync with the rising edge of the clock signal CSCK. During the write data transmission period, the clock signal CSCK has the same high frequency (12 MHz) as during the read data transmission period (FIG. 9). One set of write data is composed of 8 bits, and the values of these 8 bits are transmitted sequentially one bit at a time to the memory device 130 in sync with the clock signal CSCK. The number of bits in a set of write data may be set to any number of 2 or greater. In preferred practice, each set of write data includes an error detection code (e.g. a parity bit).

Once the communication process module 55 finished transmitting a set of write data, it receives a 1-bit response signal FL from the memory control circuit 136. This response signal FL is a signal indicating whether the set of write data is correctly received by the memory device 130. The response signal FL is generated by a response signal generator (not shown) in the memory device 130. It may be determined the write data is correctly received by performing a parity check for example. A high level response signal FL (hereinafter termed an "OK response signal" or "OK flag") indicates that a set of write data is correctly received at the memory device 130, while a low level response signal FL (hereinafter termed an "NG response signal" or "NG flag") indicates that a set of write data is not correctly received at the memory device 130. If the received response signal FL is an NG response signal, the communication process module 55 executes a prescribed error process (e.g. resending of the data). If on the other hand the received response signal FL is an OK response signal, the communication process module 55 sends the next set of write data. A correctly received set of write data is written into the memory cell array 132 during the response signal FL transmission period. Transmission of a set of write data and reception of a response signal in this way repeats until writing of all of the write data targeted for sending is finished.

During the response signal FL transmission period, the clock frequency is set to a lower value (6 MHz) than the clock frequency during the write data transmission period (12 MHz). The reason for doing so is as follows. During the write data transmission period, the higher clock frequency (12 MHz) is employed in order to boost the data transfer speed. Meanwhile, because the response signal FL is a 1-bit signal, reduced clock frequency poses no risk of excessively slow transfer speed. As will be appreciated from the directions of the arrows indicating data transmission direction in FIG. 11, the data transmission direction switches at the start time and at the end time, respectively, of transmission of the response signal FL. If high clock frequency (12 MHz) equal to that during the write data transmission period is maintained when the data transmission direction is switched, there is a possibility that a so-called bus collision occurs, and that the leading bit of the next set of write data may not be correctly received. If on the other hand the clock frequency during the response signal FL reception period is set to a smaller value than the clock frequency of the write data transmission period as depicted in FIG. 11, the likelihood of a bus collision is reduced, making it possible for data to be transferred correctly.

It is preferable for the switching circuit 564 (FIG. 7) in the communication process module 55 to be set to the high impedance state for periods before and after sending/receiving of the 1-bit response signal FL as depicted in the enlarged view at the right edge of FIG. 11. It is also preferable for the switching circuit 154 of the data send/receive module M15 of the memory device 130 to be set to the high impedance state. By so doing it is possible to avoid bus collisions with a greater degree of reliability.

In preferred practice the clock frequency during the response signal FL reception period is set to a frequency such that writing of one set of write data to the memory cell array 132 is completed during the period in which the memory device 130 transmits the 1-bit response signal FL. By so doing, both sending/receiving of the response signal FL and the write operation to the memory cell array 132 are completed during the same period, which has the advantage of simplifying control of the overall process. The clock frequency during the response signal FL reception period is preferably a value lower than the clock frequency during the write data transmission period (12 MHz) but higher than the clock frequency during the ID confirmation period (2 MHz). The reason is that if the clock frequency during the response signal FL reception period is too low, the total time required for data transfer is prolonged. However, if desired the clock frequency during the response signal FL reception period may be set to the same value as the ID confirmation period clock frequency.

The clock frequency during the response signal FL reception period may also be maintained at the same value as the clock frequency during the write data transmission period. In this case, it is preferable to select a clock frequency such that bus collisions are avoided when the data transmission direction is switched.

As described above, the present embodiment concomitantly employs the following three technical features.

(1) The clock frequency during the ID confirmation period (identification information transmission period) is set to a value lower than the clock frequency during the read data or write data transmission period.

(2) Identification data is checked one bit at a time in the order of receipt, and if a non-match of identification data is discovered the connection between the memory device and the data signal line is severed immediately.

(3) The clock frequency during the response signal reception period is set to a lower value than the clock frequency during the write data transmission period.

However, it is not essential that all three of these technical features be employed concomitantly, and only one or two of them may be employed instead.

C. Embodiment 2

Figure 12:
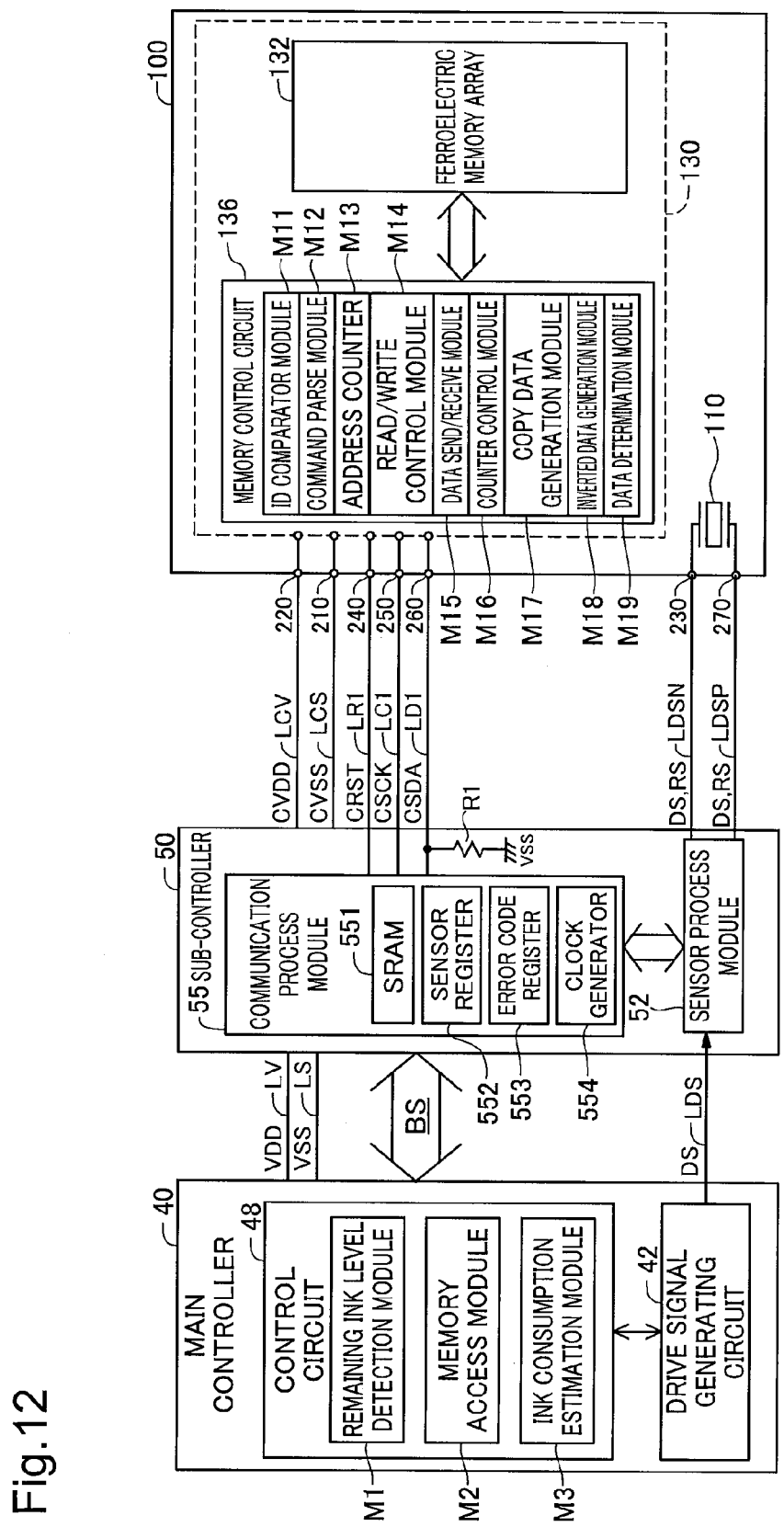
FIG. 12 illustrates an electrical configuration of a printer in Embodiment 2.

FIG. 12 is a block diagram depicting functional configuration of the main control circuit 40 and functional configuration of the sub-controller 50 and an ink cartridge 100 in Embodiment 2, and corresponds to FIG. 6 of Embodiment 1. The only difference from the circuit configuration depicted in FIG. 6 is that the memory control circuit 136 of the memory device 130 is additionally furnished with a copy data generation module M17, an inverted data generation module M18, and a data determination module M19; the configuration is otherwise the same as in FIG. 6. As will be discussed later, in Embodiment 2 inverted data and mirror data are sent in addition to the data proper (termed "original data") as read data or write data. The copy data generation module M17 has the function of copying the original data to generate mirror data equal in size to the original data. The inverted data generation module M18 is adapted to invert the value of each bit of the original data to generate inverted data equal in size to the original data. The data determination module M19 is designed to perform a parity check or exclusive OR operation on the original data and the mirror data to determine the consistency of the data. The data determination module M19 corresponds to the response signal generator in the present invention.

Figure 13:
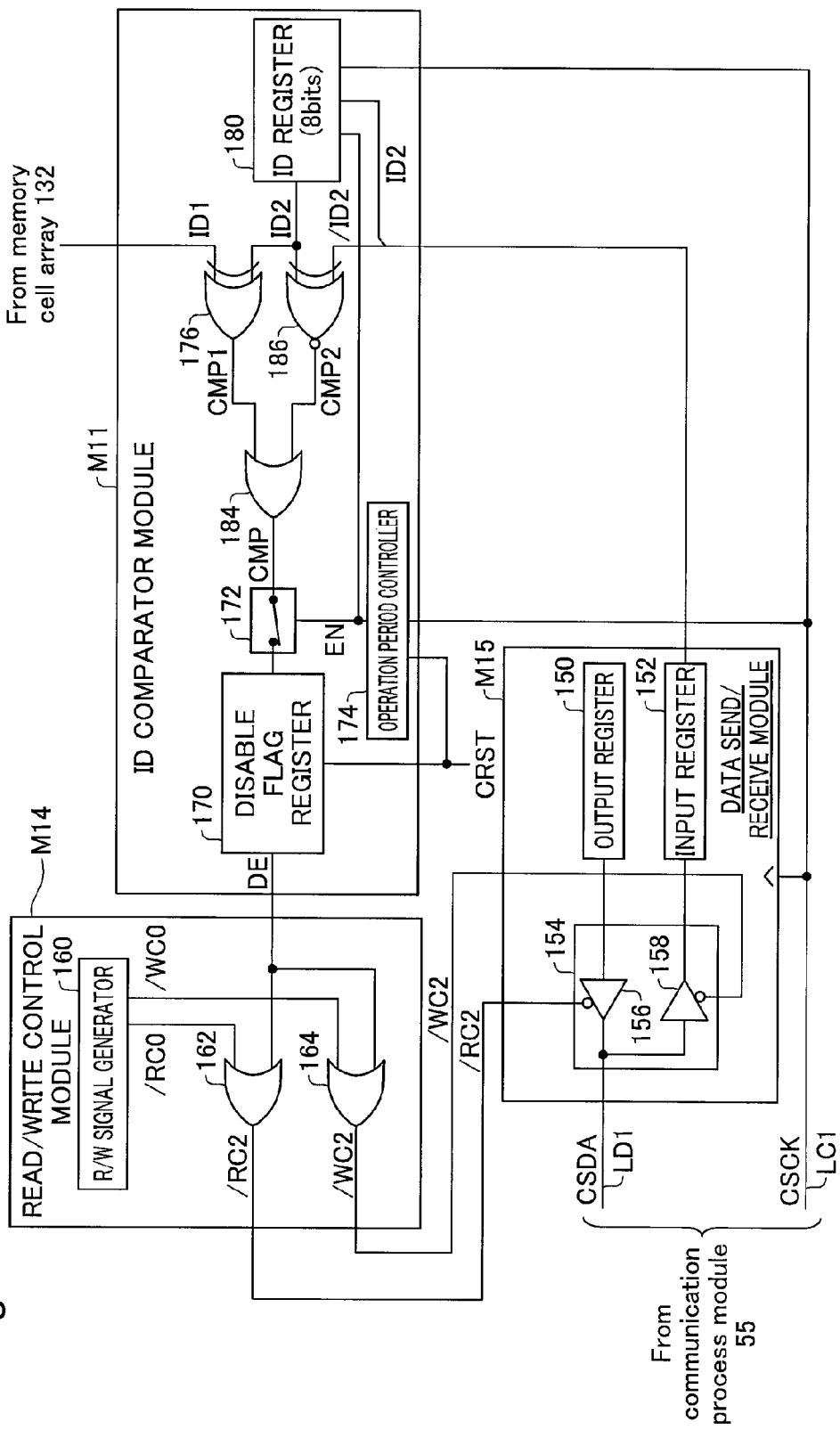
FIG. 13 is a block diagram depicting internal configuration of an ID comparator module, a read/write control module, and a data send/receive module in a memory device of Embodiment 2.

FIG. 13 is an illustration depicting the internal configuration of the ID comparator module M11, the read/write control module 14, and the data send/receive module M15 in Embodiment 2. The configuration of the data send/receive module M15 and the read/write control module 14 is the same as in Embodiment 1 depicted in FIG. 8, while the configuration of the ID comparator module M11 is different from that in Embodiment 1.

The ID comparator module M11 of Embodiment 2 includes, in addition to the configuration of the ID comparator module M11 of Embodiment 1 (FIG. 8), an OR circuit 184, an EX-NOR circuit 186, and an ID register 180. The communication process module 55 provides as identification data an ID number (also called "identification data ID2"), and inverted identification data /ID2 which is inverted data thereof, sending this data one bit at a time. The identification data ID2, /ID2 are each 8-bit data for example. The received original identification data ID2 is temporarily stored in the ID register 180.

After the identification data ID2 is received, once the inverted identification data /ID2 is sent from the communication process module 55 to the memory device 130, the following determination processes takes place in the ID comparator module M11.

<First ID Determination Process>

The EX-OR circuit 176 carries out a first determination as to whether the identification data ID2 matches the identification data ID1 read out from the memory cell array 132. A first comparison signal CMP1 indicating the result of the exclusive OR operation takes a value "0" when the two data values ID1, ID2 match, and takes a value "1" when they do not.

<Second ID Determination Process>

The EX-NOR circuit 186 carries out a second determination process as to whether the inverted identification data /ID2 matches the identification data ID2. A second comparison signal CMP2 indicating the result of the exclusive NOR operation takes a value "1" when the two data values /ID2, ID2 match, and takes a value "0" when they do not. Consequently, the second comparison signal CMP2 takes a value "0" when the inversion of the inverted identification data /ID2 matches the identification data ID2, and a value "1" when they do not.

In this way, the first determination process is a process to determine whether the identification data ID2 sent from the communication process module 55 to the memory device 130 matches the identification data ID1 previously stored in the memory device 130. The second determination process is a process to determine whether the identification data ID2 sent from the communication process module 55 to the memory device 130 and the inverted data /ID2 thereof have the correct inverted relationship. The second determination process is a kind of process for determining whether there is a communication error between the communication process module 55 and the memory device 130. In the first determination process, the inverted identification data /ID2 in place of the identification data ID2 may be compared with the identification data ID1 previously stored in the memory device 130. In this case, the EX-OR circuit 176 will be replaced with an EX-NOR circuit.

The first and second comparison signals CMP1, CMP2 obtained in this manner are input to the OR circuit 184. The output of the OR circuit 184 (the comparison signal CMP) is supplied to the disable flag register 170 via the switch 172. As in Embodiment 1, when the value of the comparison signal CMP goes to 1, the disable flag register 170 brings up the disable flag DE from 0 to 1, and maintains the disable flag DE at a value of 1 thereafter.

In Embodiment 2, the first and second determination processes for identification data take place during the period in which the inverted identification data /ID2 is transmitted. Consequently, the operation period controller 174 generates an operation period signal EN that takes a value "1" only for the duration of the interval in which the inverted identification data /ID2 is being transmitted, and presents it to the switch 172 and to the ID register 180. The switch 172 is in the ON state only for the duration of the ID comparison period in which the operation period signal EN is 1; and during the ID comparison period the ID register 180 sequentially outputs the identification data ID2 in sync with the clock signal CSCK. However, the first determination process may be carried out during the interval in which the identification data ID2 is transmitted.

The functions of the read/write control module M14 and the data send/receive module M15 of FIG. 13 are the same as the functions of the circuits described previously in FIG. 8. Specifically, when the disable flag DE goes to 1, the connection between the data send/receive module M15 and the data signal line LD1 is in the high impedance state.

Figure 14:
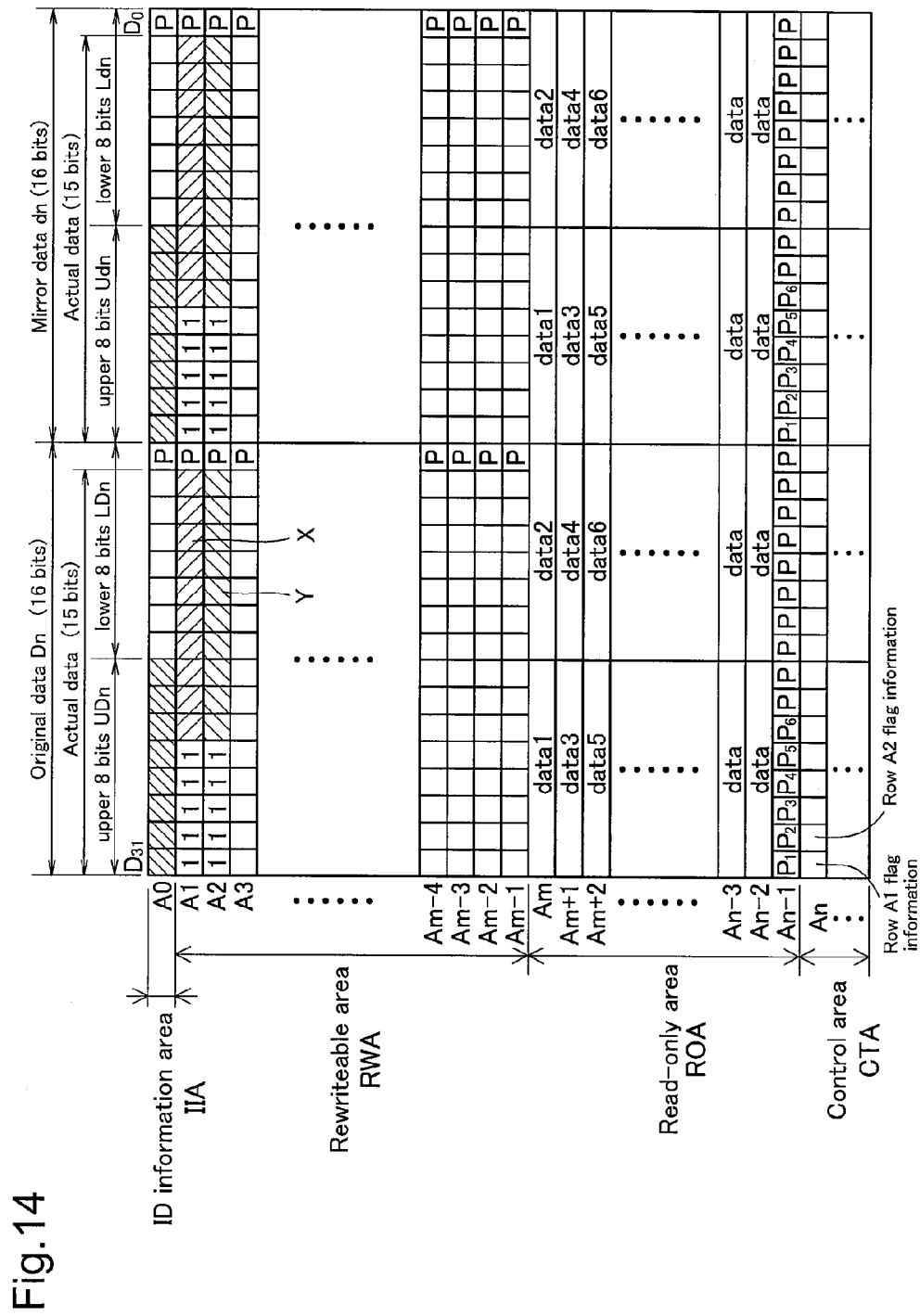
FIG. 14 is a drawing schematically depicting a memory map of a memory area in Embodiment 2.

FIG. 14 is a drawing schematically depicting a memory map of the ferroelectric memory cell array 132 memory areas in Embodiment 2. The ferroelectric memory cell array 132 includes a plurality of rows, each row being composed of 32 cells from D31 to D0. A single row (i.e. a word line) is selected by the address counter M13. That is, the memory cell array 132 is accessed sequentially in order of rows selected by the value indicated by the address counter. In this memory map, the order of sequential access is the direction going from top to bottom, in row units. For convenience, within a given row, memory cells situated further leftward (towards the highest order bit D31 side) will be termed higher order cells. A "higher order row" of a particular row refers to a row situated above the particular row (i.e. a row having a smaller row number), while a "lower order row" of a particular row refers to a row situated below the particular row (i.e. a row having a larger row number).

Data equivalent to one row of the memory cell array 132 corresponds to the units of data written to or read from the memory cell array 132 (also termed "access units") by the memory control circuit 136. An access unit is typically composed of N bits where N is an integer equal to 2 or greater.

The memory cell array 132 is divided into an identification information area HA, a rewriteable area RWA, a read-only area ROA, and a control area CTA. The identification information area HA has the 32-bit memory area of Row A0, and is used to store the ID number mentioned earlier. The rewriteable area RWA has a memory area equivalent to (m−1) rows where m an integer equal to 2 or greater from Row A1 to Row Am−1, and is an area used for writing of data by the sub-controller 50 of the printer 20. The read-only area ROA has a memory area equivalent to n-m rows where n is an integer greater than m from Rows Am to Row An−1, and is an area used for the exclusive purpose of reading data performed by the sub-controller 50 of the printer 20. The control area CTA is provided as a lower order row of the read-only area ROA, and is a memory area used for storing increment flag information and write lock flag information, discussed later.

Within any single row of the memory cell array 132, the upper 16 bits constitute an original data area for storing original data Dn. Here, original data Dn refers to data that is the source for inverted data and mirror data, discussed later. Herein, the data area used to store the original data will be termed the original data area. Within any single row of the memory cell array 132, the lower 16 bits represent a mirror data area for storing mirror data dn. This mirror data is a copy of the original data Dn that is stored on the upper 16 bits. Under normal circumstances, i.e. in the absence of any write errors or faulty cells in a row, the original data Dn and the mirror data dn in each row have identical content.

In the identification information area IIA and the rewriteable area RWA, the upper 15 bits of the original data area of each row store actual data; while the last bit (the 16th bit) stores a parity bit P that is associated with the actual data. Here, "actual data" is data that is used by the main controller 40 of the printer 20 for the purpose of controlling various aspects of printer 20 operation (e.g. printing operations, control of the user interface); the actual data may include fixed value data stored into the empty space in the upper 15 bits of the original data area. In the present embodiment, actual data includes, for example, data representing remaining ink level, data indicating when the ink cartridge is first placed in service, and so on. The upper 15 bits of the mirror data area stores mirror data of the actual data of the original data, while the last bit (the 16th bit) stores mirror data of the parity bit P that is associated with the actual data of the original data. The parity bit P is a redundant bit that is set to a value of either "1" or "0" in such a way that the number of bits of "1" value in 16-bit data consisting of the parity bit P and the upper 15 bits is always an odd number. Alternatively, the parity bit P may be set to either "1" or "0" in such a way that the number of bits of "1" value in 16-bit data consisting of the parity bit and the upper 15 bits is always an even number. Instead of a parity bit P, some other type of redundant data that provides redundancy of actual data, or an error detection code, may be used instead.

Of the m–n pieces of rows in the read-only area ROA, rows except for the last row An–1 constitute an actual data area used for storage of actual data; while the last row constitutes a parity bit area used for storage of the parity bit. The parity bits P in the read-only area ROA are assigned to each of prescribed units of information (e.g. 8 bits of actual data) stored in the rows of actual data except for the last row. A set of actual data that is assigned a parity bit P in the read-only area ROA is referred to as a "data set" or "information set". An actual data and its parity bit P is easily associated with each other by setting the bit count of each data set at a constant value (e.g. 8 bits or an integral multiple thereof). If there is a large number of data sets, two or more rows of the read-only area ROA may be allocated as the parity bit area.

The reason for storing the parity bits P together at the end of the read-only area ROA is as follows. In some instances, at least some of the actual data stored in the read-only area ROA is represented by 8-bit character encoding. In such instances, if the parity bit P is appended immediately following the 8-bit code, the bit count of one data set including the actual data and its parity bit increases to 9 bits. This necessitates bit shift control in 1-bit units in order that the main controller 40 may identify the location of the division in the data set. If on the other hand, the parity bits P for each of the data sets of the read-only area ROA are stored together at the end of the read-only area ROA as depicted in FIG. 14, a resultant advantage is that there is no need for bit shift control in order for the main controller 40 to obtain the actual data. Moreover, as will be discussed later, in the present embodiment, it is sufficient for the data of the read-only area ROA to be read out only once by the main controller 40 of the printer 20 subsequent to confirming installation of the ink cartridge 100 (i.e. the memory device 130). Thus, there are substantially no disadvantages to storing the actual data at a separate location from their associated parity bits P.

In the rewritable area RWA on the other hand, of each 16 bits of data, actual data is stored on the upper 15 bits, and a parity bit P is stored on the final 1 bit. The reason for doing so is that, because it is possible for data in the rewritable area RWA to be written in row units, if actual data and its parity bits P are stored at separate locations, it may be difficult to carry out a parity check when writing the data.

From the preceding description it is appreciated that, in the identification information area IIA and the rewriteable area RWA, the original data is composed of actual data and associated parity bits P. In the read-only area ROA, original data stored in areas except for the final parity bit area is actual data per se. The original data stored at the very end of the read-only area ROA is composed of the parity bits P. The advantages of this arrangement of actual data and parity bits P in the memory devices 130 will be revisited in detail later, following a discussion of the read operation.

The leading first row of the memory device 130, i.e. Row A0 of the identification information area IIA, stores an ID number (identification information), assigned to each type (each color) of ink cartridge 100, on 8 bits starting from the leading cell. In FIG. 14, the area storing the ID number is indicated by hatching. The remaining cells, except for the original data parity bit P cell and the cells that store the ID number in Row A0, constitute an empty area storing fixed data of 1's or 0's. For example, where M is the number of different types of ink cartridge 100 installed in the printer 20, the ID number takes M different values that differ according to the type of ink cartridge 100.

The rewriteable area RWA stores various kinds of information, for example, ink consumption information or usage history information for the ink cartridge 100. The first row A1 of the rewriteable area RWA stores a first ink consumption count value X, and the second row A2 stores a second ink consumption count value Y. In FIG. 14, the areas storing these consumption count values X, Y are indicated by hatching. The first ink consumption count value X is 10-bit information for example, and is stored in the cells of the lower 10 bits of the 15 bits excluding the parity bit P in Row A1. Data is sent from the printer 20 in such a way that "1"s are always set on the upper 5 bits of Row A1. The second ink consumption count value Y is likewise 10-bit information for example, and is stored in the cells of the lower 10 bits of the 15 bits excluding the parity bit P in Row A2. Data is sent from the printer 20 in such a way that "1"s are always set on the upper 5 bits of Row A2. The first and second ink consumption count values X, Y are values that represent cumulative total ink consumption for each ink cartridge 100, derived on the basis of the ink consumption that is estimated by the ink consumption estimation module M3 (FIG. 6). The difference between the first and second ink consumption count values X, Y will be discussed later.

Ink end information is stored in another prescribed row of the rewritable area RWA. The ink end information is 2-bit data for example, and may take one of the three values "01", "11" or "01" for example. A value of "01" represents a state in which the sensor 110 of the ink cartridge 100 does not detect that the remaining ink level is equal to or less than a first threshold value Vref1 (hereinafter also referred to as the full state), that is, that the remaining ink level is greater than the first threshold value Vref1. A value of "10" indicates that the remaining ink level is equal to or less than the first threshold value Vref1, but the remaining ink level is still greater than the ink end level (hereinafter also referred to as the low state); that is, the first threshold value Vref1>the ink end level. The fact that the remaining ink level is equal to or less than the first threshold value Vref1 is detected by the sensor 110 of the ink cartridge 100 in question. A value of "11" indicates a state in which the remaining ink level is at or below the ink end level (hereinafter also referred to as the end state). The ink end level represents a remaining ink level low enough, if the printer 20 is to continue to print uninterruptedly, to pose the risk of air being drawn into the print head unit 60 due to ink depletion, thus making it imperative to replace the ink cartridge 100. For example, the first threshold value Vref1 may be set to about 1.5 grams, and the ink end level may be set to a remaining ink level of about 0.8 grams. Processes relating to the ink end information will be discussed later.

The read-only area ROA stores, for example, manufacture information indicating the manufacturer of the ink cartridge 100, the date of manufacture of the ink cartridge, the ink cartridge 100 capacity, the type of ink cartridge, and so on. In preferred practice, at least some of the information in the read-only area ROA (e.g. the type of ink cartridge) is described by 8-bit character encoding.

The control area CTA stores various kinds of flag information including increment flag information and write lock flag information. Each row of the memory cell array 132 is provisioned with 1 bit of increment flag information. Rows whose corresponding increment flag information is set to "1" represent areas in which overwriting of the row with only a larger numerical value than the numerical value already stored in the row (incremental overwrite) is allowed, but overwriting of the row with a numerical value less than the numerical value already stored in the row (decremental overwrite) is not allowed. Rows whose corresponding increment flag information is set to "0" can be overwritten with any data. The decision as to whether to allow only incremental overwriting or to allow overwriting is made by the read/write control module M14 of the memory control circuit 136, with reference to the increment flag information. For example, for Row A1 and Row A2 which record the aforementioned first and second ink consumption count values X and Y, the corresponding increment flag information is set to "1". The reason is that it is difficult to imagine that updating of ink consumption count values X and Y by the printer 20 takes place in anything other than the increasing direction. This can reduce the likelihood of errors in writing to Row A1 and Row A2. Herein, memory areas for which, like Row A1 and Row A2, the corresponding increment flag information is set to "1" will also be referred to as "increment-only areas". Where remaining ink level, rather than ink consumption, is saved in a row of the memory, this row may be controlled by a flag value that indicates whether to allow only decremental overwriting or to allow free overwriting.

Each row in the identification information area HA, the rewriteable area RWA, and the read-only area ROA is provisioned with 1 bit of write lock flag information recorded in the control area CTA. Rows whose write lock flag information is set to "1" represent areas not allowed to be overwritten through external access. Rows whose write lock flag information is set to "0" represent areas allowed to be overwritten through external access. The decision as to whether overwriting is allowed is made by the read/write control module M14 of the memory control circuit 136, with reference to the write lock flag information. For the rewriteable area RWA, i.e. Rows A1 to Am−1, write lock flag information is set to "0" at the factory prior to shipping so as to allow erasing and/or rewriting of data by the communication process module 55 of the printer 20. On the other hand, for the identification information area IIA, i.e. Row A0, and for the read-only area ROA, i.e. Rows Am to An−1, the write lock flag information sets to "1" at the factory prior to shipping so as to prohibit erasing and/or rewriting of data by the communication process module 55 of the printer 20. Such memory areas for which the write lock flag information is set to "1" are also referred to as write-locked areas.

Figure 15:
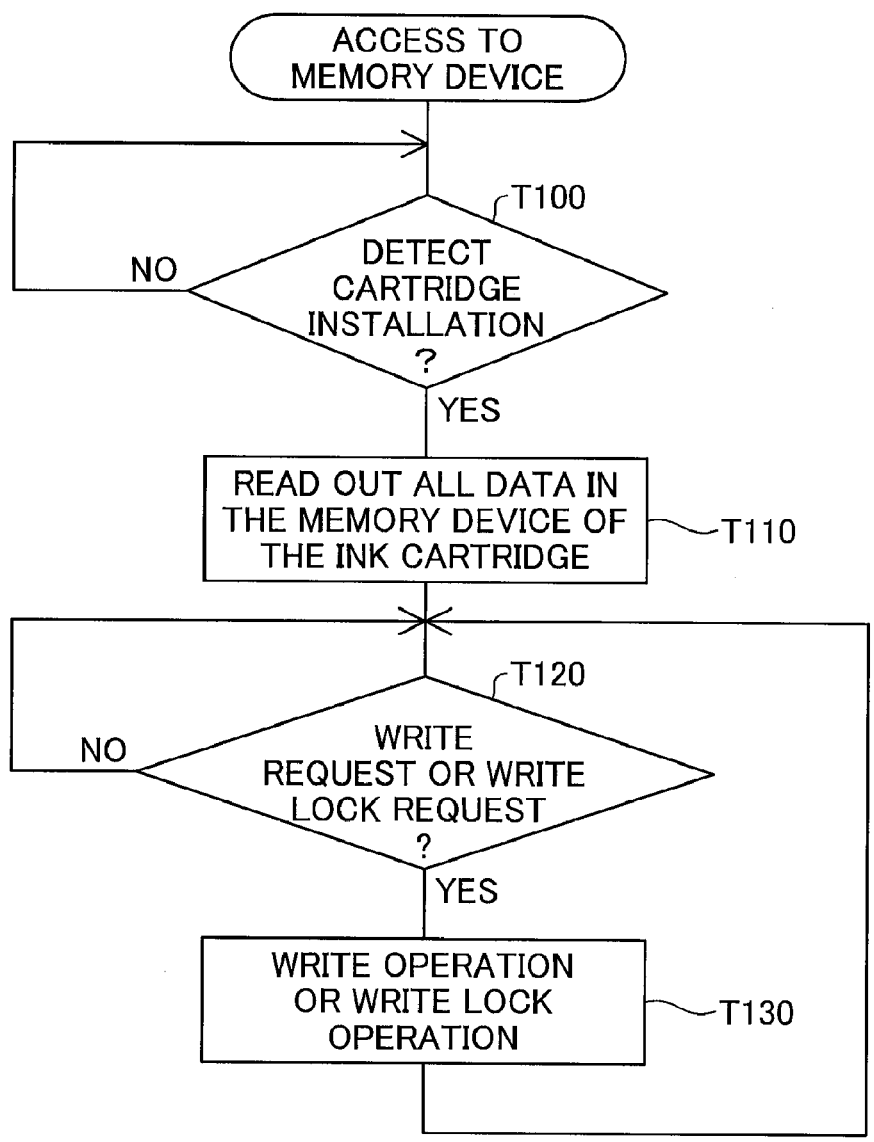
FIG. 15 is a flowchart depicting the overall sequence of access to a memory device in Embodiment 2.

FIG. 15 is a flowchart depicting the overall sequence of access to a memory device 130. The sequence is described primarily from the standpoint of the sub-controller 50. In Step T100, once the sub-controller 50 detects that an ink cartridge 100 is installed in the printer 20, it initiates the process starting with Step T110. In Step T110, all of the data that is stored in the memory device 130 of the installed ink cartridge 100 is read out by the sub-controller 50. Installation of ink cartridges 100 is detected: (1) immediately after the printer is powered on; and (2) when an ink cartridge 100 is replaced. In the former instance, in Step T110 data is read out from all of the ink cartridges 100 installed in the printer 20, whereas in the latter instance data is read out from the newly installed ink cartridge 100 only. The data that is read out is stored in memory in the main controller 40. During operation of the printer 20, processes are executed using the data held in memory in the main controller 40, so there is no need for data to be reread from the ink cartridges 100.

In Step T120, the sub-controller 50 stands by until there is write request or write lock request from the main controller 40. In Step T130, the respective process is carried out in accordance with the write request or write lock request. A write operation is an operation for writing data to the memory device 130 in any ink cartridge 100. In this write operation, typically, all of the data in the rewritable area RWA (FIG. 14) of the memory device 130 targeted for access is written. The write lock operation is an operation for writing write lock flag information (a flag indicating overwrite enabled/disabled status) to the control area CTA. The processes taking place in Steps T110 and T130 respectively will be discussed in detail later.

The overall sequence illustrated in FIG. 15 is merely exemplary, and the various processes may take place in a different sequence. For example, data may be read out from memory devices 130 irrespective of whether detection of ink cartridge installation takes place. The scope of reading or writing of data may be modified as needed. For example, in order to check the results of writing data that is written to the memory device 130, read operations of data in the rewritable area RWA exclusively may be carried out at a desired timing.

Figure 16:
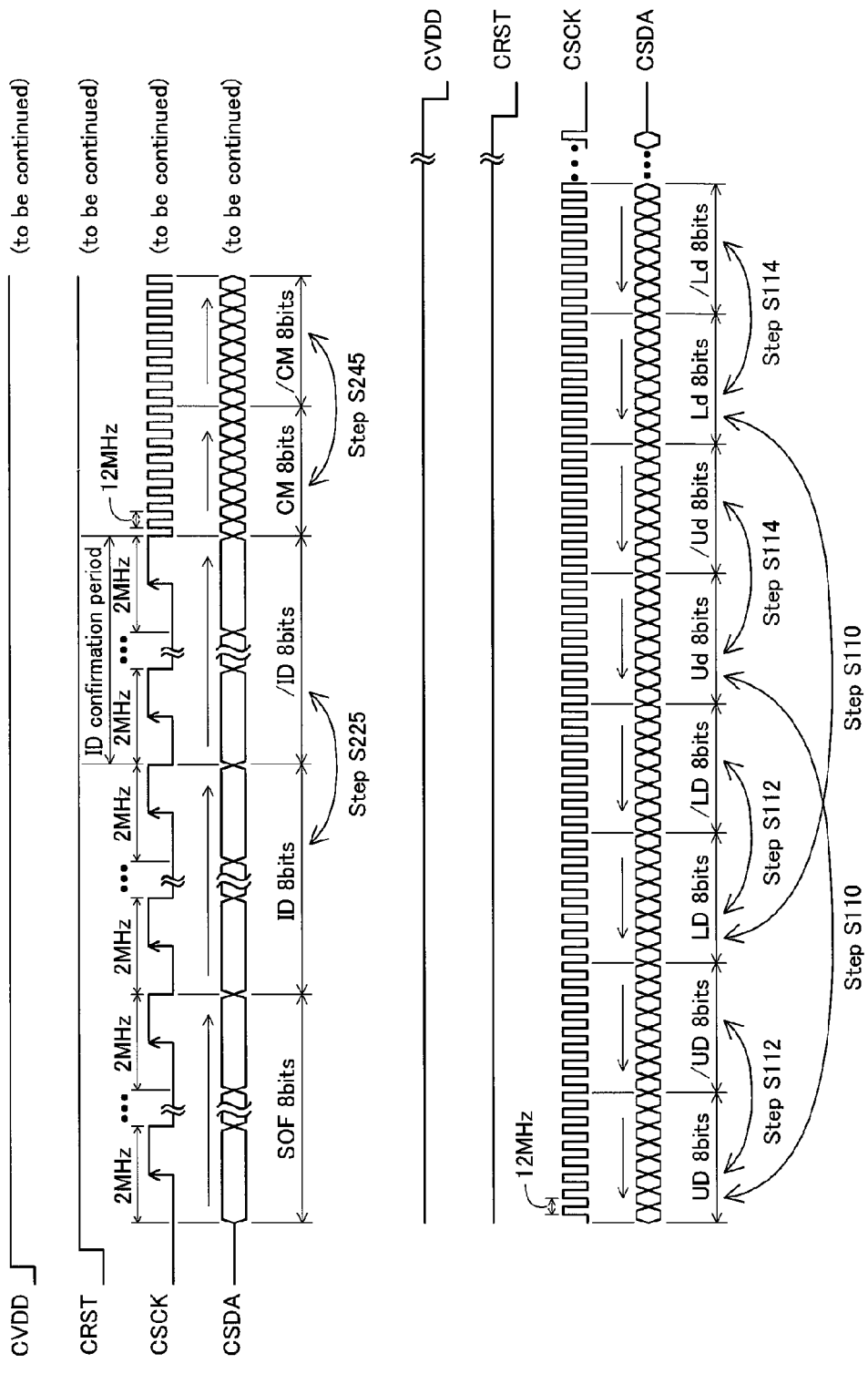
FIG. 16 is a timing chart schematically depicting sent and received signals during the read cycle from a memory device in Embodiment 2.

FIG. 16 is a timing chart schematically depicting signals sent and received between the communication process module 55 of the printer 20 and the memory control circuit 136 of a memory device 130 during read operations from the memory device 130 in Embodiment 2. As in Embodiment 1 (FIG. 9), in FIG. 16, the frequency of the clock signal CSCK is set to low frequency (2 MHz) during the SOF data and identification data transmission interval, and is set to high frequency (12 MHz) during the command data CM and read data transmission intervals. As a result, consumption current on the data signal line LD1 during the identification data transmission interval is reduced, while making it possible to ensure fast data transfer speeds. As in the case illustrated in FIG. 10, in Embodiment 2, identification data ID1, ID2 is compared sequentially one bit at a time, and if a non-match of any bits is encountered, the data send/receive module M15 immediately goes into the high impedance state. It is possible thereby to keep consumption current on the data signal line LD1 to a minimum.

The main controller 40 of the printer 20, via the bus BS, sends the sub-controller 50 a Read command instructing a read from the memory device 130 of the ink cartridge 100. In response to this command, the communication process module 55 supplies power supply voltage CVDD to each of the ink cartridges 100. Specifically, the memory device 130 of each of the ink cartridges 100 is supplied with operating voltage, thereby placing the memory device 130 in the operational state. After supplying the power supply voltage CVDD, a low level reset signal CRST is supplied to initialize the memory devices 130. Usually, because the reset signal CRST remains at low level since the time that the previous access ended, it is at low level prior to the time that the power supply voltage CVDD is supplied to the memory device 130.

When the communication process module 55 of the sub-controller 50 receives the Read command from the main controller 40, it initiates a read operation. When the read operation starts, the communication process module 55 transitions the reset signal CRST from low level to high level, and transmits a clock signal CSCK of prescribed frequency. When the reset signal CRST rises from low level to high level, the memory device 130 goes into a standby state to receive data signals CSDA from the communication process module 55.

Figure 17:
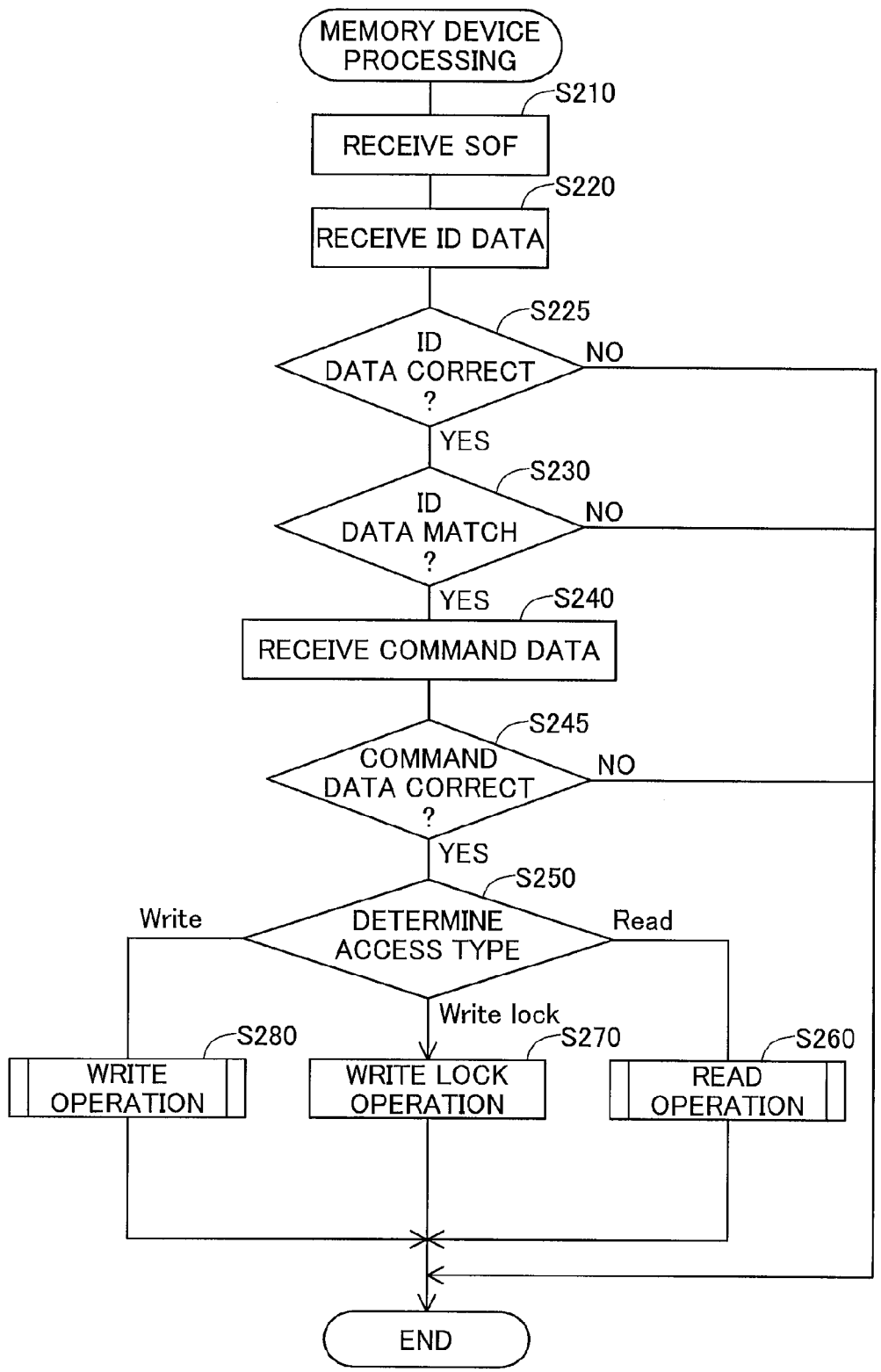
FIG. 17 is a flowchart depicting a processing routine of a process in the memory device of an ink cartridge (memory device-end process).

FIG. 17 is a flowchart depicting the processing routine of a process in the memory device of an ink cartridge (memory device-end process). This process flow is one that is executed by the memory control circuit 136 (FIG. 6), and is not limited to read operations, but rather constitutes the overall process flow on the memory device, including the other processes (the write operation and write lock operation).

Prior to the memory device-end process, the memory device 130 is activated by receiving input of power supply voltage CVDD from the sub-controller 50, then initializes itself in response to a low level reset signal CRST. This initialization involves setting the address counter M13 to its initial value (selecting Row A0) and resetting the various registers to their initial values. Also, the data send/receive module M15 (FIG. 13) of the memory device 130 sets the data send/receive direction to the direction in which the memory device 130 receives data from the sub-controller 50.

Once the memory device-end process is initiated, in Step S210 the memory control circuit 136 receives SOF (Start Of Frame) data. This SOF data is a signal by which the sub-controller 50 alerts the memory device 130 of start of communication. In Step S220, the memory control circuit 136 receives identification data (ID number). As shown in FIG. 16, the identification data includes identification data ID and inverted identification data /ID. The inverted identification data /ID is data obtained by inverting the identification data ID. Herein, inverted data is data equal in size to (having the same number of bits as) the original data, but the data inverts the value of each bit of the original data. Hereafter, inverted data of original data will be denoted by a/(slash symbol) preceding the symbol of the original data. For example, for original data ID=(01001001), the inverted data /ID= (10110110).

In Step S225, the ID comparator module M11 determines whether the received identification data is correct. Specifically, the EX-NOR circuit 186 of the ID comparator module M11 takes the exclusive OR of the identification data ID2 and the inverted identification data /ID2 one bit at a time, and determine whether all values of the exclusive OR operation are 1's (see FIG. 16). By this process it can determine whether there are any communication errors in the received identification data. If there are no communication errors, the received identification data is deemed to be correct, whereas if communication errors are occurred, the received identification data is deemed to be not correct. In the event that the ID comparator module M11 decides that the received identification data is not correct, it terminates without carrying out any operations.

Meanwhile, in Step S230 the EX-OR circuit 176 (FIG. 13) of the ID comparator module M11 decides whether the first identification data ID1 (first ID number) that is assigned to the memory device 130 itself matches the received identification data ID2 (second ID number). At this time, the read/write control module M14 reads out the ID number (identification information) that is stored in Row A0 of FIG. 14. The ID comparator module M11 then performs a comparison one bit at a time between the first ID number ID1 that is read by the read/write control module M14 and the second ID number ID2 that is sent from the communication process module 55. If it decides that the two ID numbers do not match, the memory control circuit 136 terminates the write operation without carrying out any further operation. The data send/receive module M15 (FIG. 13) of the memory device 130 then goes into the high impedance state. In the circuits depicted in FIG. 13, the processes of Step S225 and Step S230 are carried out simultaneously. However, as will be understood from this example, the processes of Step S225 and Step S230 may be carried out simultaneously, or one may be carried out before the other.

If it is decided that the two ID numbers ID1, ID2 do match, in Step S240 the memory control circuit 136 receives command data supplied by a data signal CSDA. As shown in FIG. 16, the command data includes original command data CM and inverted command data /CM. The inverted command data /CM is data that inverts the original command data CM. Of the 8 bits of the original command data CM, the upper 4 bits and the lower 4 bits are inverted relative to each other. In Step S245, the command parse module M12 determines whether the received command data is correct. Specifically, the command parse module M12 decides whether the upper 4 bits and the lower 4 bits of the original command data CM are data that are inverted to one another. The command parse module M12 also determines whether the upper 4 bits and the lower 4 bits of the inverted command data /CM are inverted to one another. Additionally, the command parse module M12 takes the exclusive OR for the original command data CM and the inverted command data /CM one bit at a time, and decide whether or not all output values of the exclusive OR are 1's. If the results are that: (i) the upper 4 bits and the lower 4 bits of the original command data CM are inverted data to one another; (ii) the upper 4 bits and the lower 4 bits of the inverted command data /CM are inverted data to one another; and (iii) the exclusive OR of the original command data CM and the inverted command data /CM is 1 for all bits, the command parse module M12 determines that the received command data is correct (i.e. there are no communication errors). If on the other hand any one of these three conditions (i) to (iii) is not met, the command parse module M12 determines that the received command data is not correct (i.e. there are communication errors).

In the event of a determination that the command data is not correct, the memory control circuit 136 terminates the process. If on the other hand the command data is determined to be correct, in Step S250, the command parse module M12 parses the command data and determine the type of access. In preferred practice, the types of command data includes at least a Write command, a Read command, and a Write Lock command. A Write command is a command instructing writing of data to the ferroelectric memory cell array 132. A Read command is a command instructing reading of data from the ferroelectric memory cell array 132. The Write Lock command is a command instructing writing of a write lock flag to the control area CTA (FIG. 14)). The memory control circuit 136 then carries out the respective process according to the command indicated by the command data (Step S260, S270, or S280). If the command directed to the memory device 130 does not correspond to any of the above types of command, the command parse module M12 decides that the command data is not parsable. If the command parse module M12 decides that command data is not parsable, the memory control circuit 136 proceeds to terminate, and do nothing (not shown).

The steps of the flowchart depicted in FIG. 17 may be executed in a different order or in parallel, so long as no conflicts occurs in the process. For example, the memory control circuit 136 may decide if the identification data is correct after having first verified matching of the ID number (identification data). Or, the memory control circuit 136 may decide if the identification data is correct while receiving the command data in a parallel process.

Figure 18:
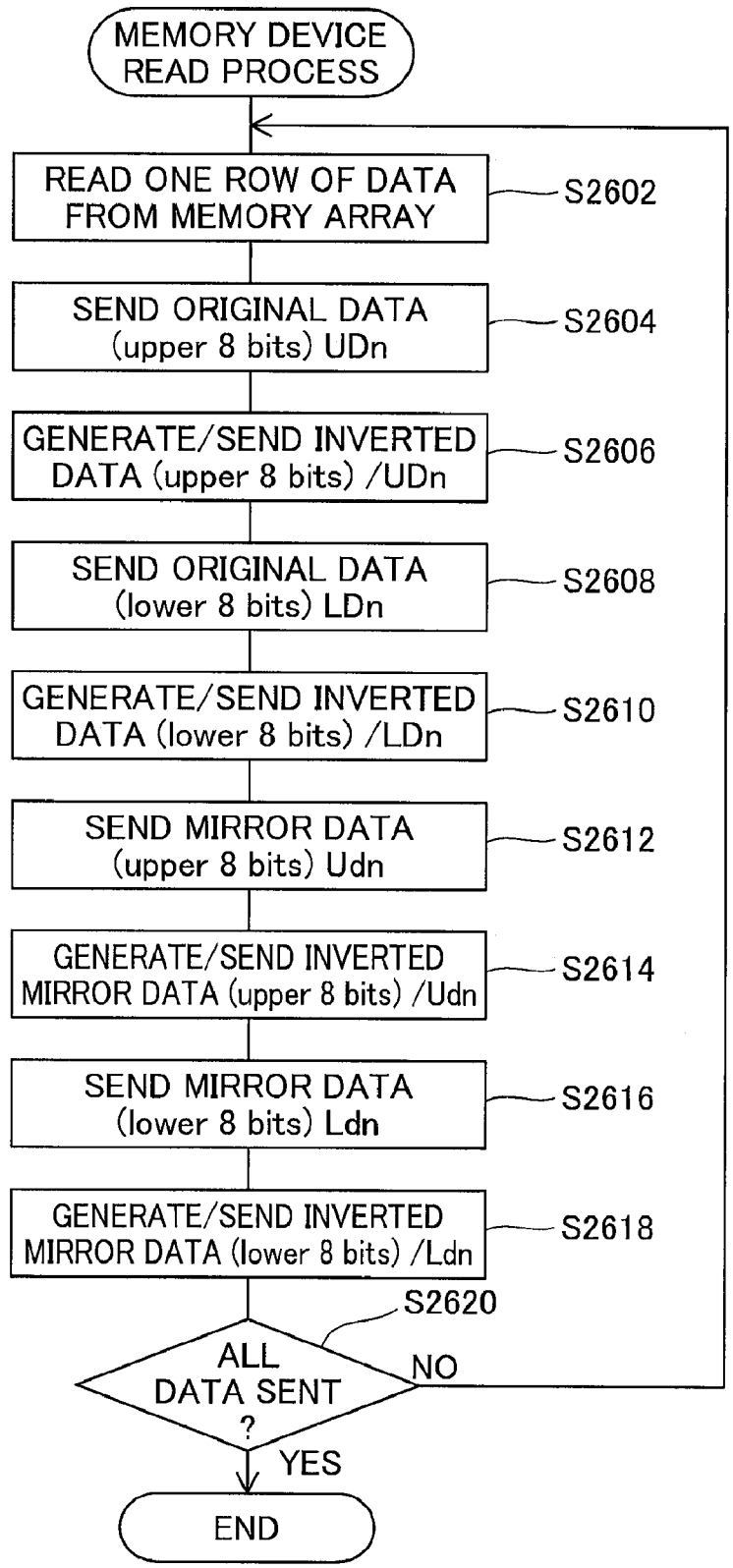
FIG. 18 is a flowchart depicting a processing routine at the memory device during the read cycle.

FIG. 18 is a flowchart depicting the processing routine of a read operation (Step S260 of FIG. 17) on the memory device. The read/write control module M14 of the memory control circuit 136 reads data one row at a time from the ferroelectric memory cell array 132 according to an address that is selected by the output of the address counter M13, and send data including the read-out data sequentially one bit at a time as a data signal CSDA to the communication process module 55. For a read operation, the data send/receive module M15 (FIG. 13) sets the data send/receive direction to the send direction. Moreover, the counter control module M16 supplies a control signal to the address counter M13 so that it specifies Row A1 (FIG. 14) as the initial row to be read out. Then, based on the address specified by the count value of the address counter M13, in Step S2602 the read/write control module M14 reads out data from one row (32-bits) of the ferroelectric memory cell array 132 into a register, not shown. The following data is sent to the communication process module 55 after being initially stored in the output register 150 (FIG. 13).

The 32 bits of data equivalent to one row of the memory cell array is composed of the following four sets of data (FIG. 14).
(1) Original data upper 8 bits UDn where n indicates the row address
(2) Original data lower 8 bits LDn
(3) Mirror data upper 8 bits Udn (mirror data of the original data upper 8 bits UDn)
(4) Mirror data lower 8 bits Ldn (mirror data of the original data lower 8 bits LDn)

From the 32 bits of data of one row, the data send/receive module M15 sends the uppermost 8 bits thereof as the original data upper 8 bits UDn to the sub-controller 50 (Step S2604). Next, the inverted data generation module M18 inverts each bit of the original data upper 8 bits UDn to generate the inverted original data upper 8 bits /UDn. The data send/receive module M15 then sends the inverted original data upper 8 bits /UDn to the sub-controller 50 (Step S2606). Next, the data send/receive module M15 sends the 8 bits from the 9th to 16th bits as the original data lower 8 bits LDn to the sub-controller 50 (Step S2608). Then, the inverted data generation module M18 inverts each bit of the original data lower 8 bits LDn to generate inverted original data lower 8 bits /LDn. The data send/receive module M15 then sends the generated inverted original data lower 8 bits /LDn to the sub-controller 50 (Step S2610). Next, the data send/receive module M15 sends the 8 bits from the 17th to 24th bits as the mirror data upper 8 bits Udn to the sub-controller 50 (Step S2612). Then, the inverted data generation module M18 inverts each bit of the mirror data upper 8 bits Udn to generate inverted mirror data upper 8 bits /Udn. The data send/receive module M15 then sends the generated inverted mirror data upper 8 bits /Udn to the sub-controller 50 (Step S2614). Next, the data send/receive module M15 sends the 8 bits from the 25th to 32nd bits as the mirror data lower 8 bits Ldn to the sub-controller 50 (Step S2616). Then, the inverted data generation module M18 inverts each bit of the mirror data lower 8 bits Ldn to generate inverted mirror data lower 8 bits /Ldn.

The data send/receive module M15 then sends the generated inverted mirror data lower 8 bits /Ldn to the sub-controller 50 (Step S2618).

When transmission of the one row of data and the inverted data thereof, for a total of 64 bits, is finished, the memory control circuit 136 decides whether transmission of all of the data that is requested to be read by the sub-controller 50 is completed (Step S2620). If not completed, the routine returns to Step S2602 and repeat the process of Steps S2602 to S2618 for the data of the next row of the ferroelectric memory cell array 132. Once transmission of all of the data is complete, the memory control circuit 136 terminates the read operation.

In the process of FIG. 18, data equivalent to one row is read from the memory cell array 132 in Step S2602; however, data need not be read from the memory cell array 132 in 1-row units as long as data is transmitted in order from Step S2604 to Step S2618 in sync with the clock signal provided to the memory device 130 after reception of the command data.

Figure 19:
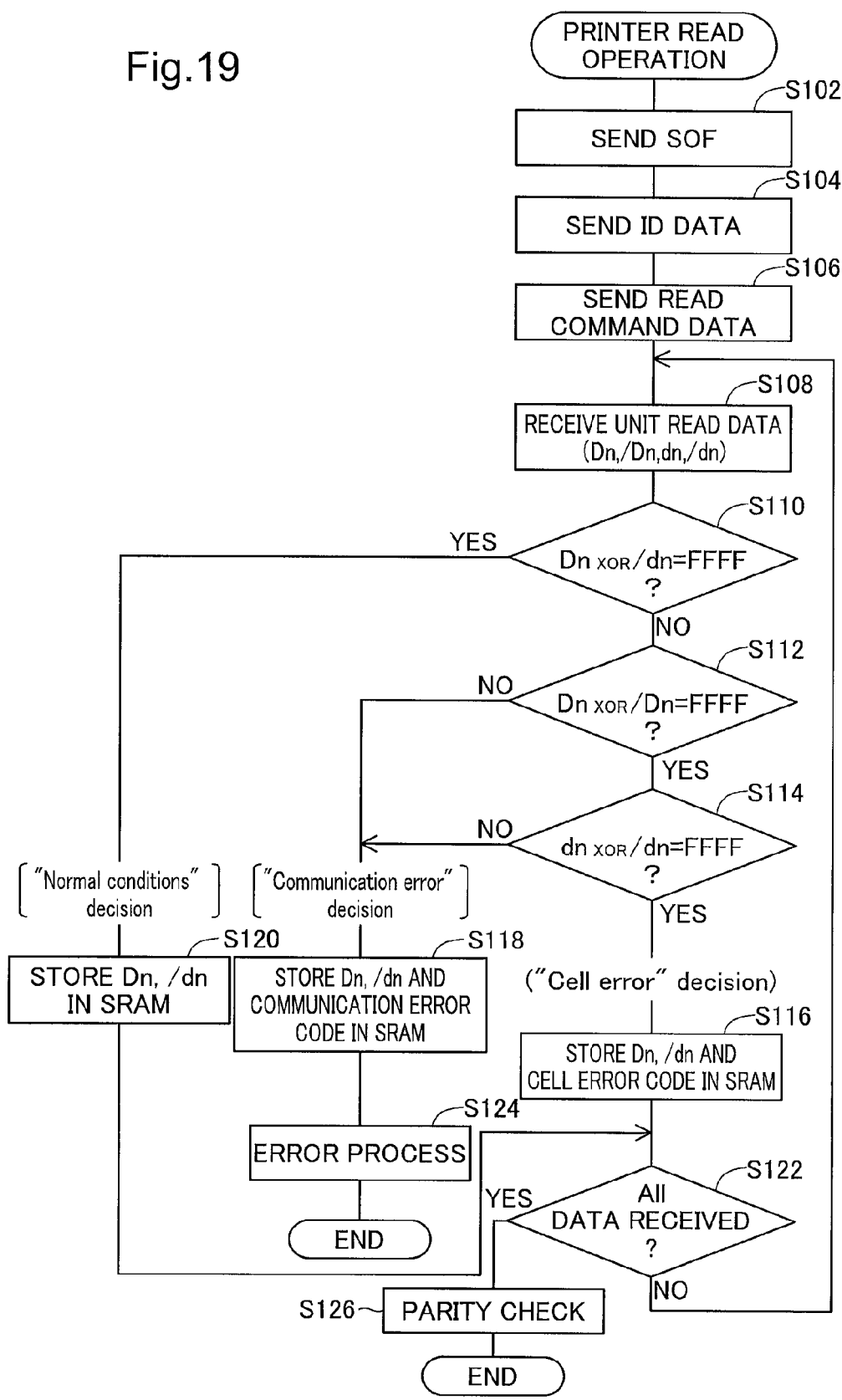
FIG. 19 is a flowchart depicting a processing routine at the printer during the read cycle from a memory device.

FIG. 19 is a flowchart depicting the processing routine of a read operation from a memory device 130, carried out by the sub-controller 50 of the printer 20. In Step S102, the communication process module 55 transmits SOF data (FIG. 16). In Steps S104 and S106, following transmission of SOF data the communication process module 55 transmits an operation code (FIG. 16). The operation code is a data sequence of identification data and command data. The identification data is identification information that specifies the memory device 130 of an ink cartridge 100 targeted for a read operation, and includes 8-bit identification data ID and inverted identification data /ID thereof. The inverted identification data /ID is generated by the main controller 40 or the sub-controller 50 on the basis of the identification data ID. By duplicating the identification data in this way, the likelihood of unintended operation of the memory device 130 of an ink cartridge 100 not targeted for operation can be reduced.

In Step S106, the communication process module 55 transmits command data. Command data indicates a type of access (i.e. a write, read, etc.) to the memory device 130. The command data includes 8-bit original command data CM and inverted command data /CM (FIG. 16). The command data sent during a read operation is a Read command. Of the 8 bits the original command data CM, the upper 4 bits and the lower 4 bits have an inverted relationship to each other. The inverted command data /CM is generated by the main controller 40 or the communication process module 55 on the basis of the original command data CM. By providing such redundancy of command data, the likelihood of erroneous operation of the memory device 130 can be reduced.

In Step S108, starting from the next pulse of the clock signal CSCK following the end of transmission of the command data, the communication process module 55 begins to receive the read data supplied from the memory device 130. The communication process module 55 receives data including read-out data that is read out from one row of the memory device 130. Specifically, the communication process module 55 receives one unit of data equivalent to 8 bits×8=64 bits, doing so sequentially one bit at a time in sync with rise of the clock signal CSCK. The 64-bit unit of data is composed of the following eight sets of data (FIG. 16).
(1) Original data upper 8 bits UDn where n indicates the row address.
(2) Inverted original data upper 8 bits /UDn
(3) Original data lower 8 bits LDn
(4) Inverted original data lower 8 bits /LDn
(5) Mirror data upper 8 bits Udn (mirror data of the original data upper 8 bits UDn)
(6) Inverted mirror data upper 8 bits /Udn (7) Mirror data lower 8 bits Ldn (mirror data of the original data lower 8 bits LDn)
(8) Inverted mirror data lower 8 bits /Ldn The inverted data /UDn, /LDn, /Udn, /Ldn is generated by the inverted data generation module M18 in the memory device 130.

The following designations for data are also employed herein.
(a) Original data Dn: Original data upper 8 bits UDn+Original data lower 8 bits LDn
(b) Inverted data /Dn: Inverted original data upper 8 bits /UDn+Inverted original data lower 8 bits /LDn
(c) Mirror data dn: Mirror data upper 8 bits Udn+Mirror data lower 8 bits Ldn
(d) Inverted mirror data /dn: Inverted mirror data upper 8 bits /Udn+Inverted mirror data lower 8 bits /Ldn As describe above, one unit of data received by the communication process module 55 includes original data Dn, inverted data /Dn, mirror data dn, and inverted mirror data /dn. By repeatedly receiving these units of data, the communication process module 55 can ultimately read outs all of the data from the memory device 130.

When one unit of data is received, the communication process module 55 temporarily stores the unit of data in a register (not shown) and executes the process beginning with Step S110 in FIG. 17. First, in Step S110, the communication process module 55 decides whether or not, in the unit of data, the exclusive OR of an m-th value of the original data Dn and an m-th value of the inverted mirror data /dn is true "1" for all values of m ($1 \leq m \leq 16$) (FIG. 16). If the results of exclusive OR operations are true for all 16 bits, i.e. FFFFh (the terminal "h" indicates hexadecimal notation), the communication process module 55 decides that both the communication status and the read source memory cells are normal. That is, if the exclusive OR operation of the original data Dn and the inverted mirror data /dn is FFFFh, it may be inferred that the original data Dn and the mirror data dn stored in the memory device 130 are equivalent to one another, and that both the original data Dn and the inverted mirror data /dn are correctly sent. Thus, in this instance it is determined that the status of the memory cells of the memory device 130, as well as the communication status between the communication process module 55 and the memory device 130, are normal. If the communication process module 55 decides that the memory cells and communication status are both normal, in Step S120, it stores the original data Dn and the inverted mirror data /dn in the SRAM 551.

If on the other hand the exclusive OR operation is false "0" for any of the 16 bits, i.e. not FFFFh, in Step S112 the communication process module 55 determines whether or not the exclusive OR of the original data Dn and the inverted data /Dn is FFFFh. If the exclusive OR results are FFFFh, in Step S114, the communication process module 55 determines whether or not the exclusive OR of the mirror data dn and the inverted mirror data /dn is FFFFh. If the exclusive OR results of the original data Dn and the inverted data /Dn are not FFFFh, or if the exclusive OR results of the mirror data dn and the inverted mirror data /dn are not FFFFh, the communication process module 55 decides that there is a communication error. The reason it can be determined that a communication error is occurred is that mutually inverted data are not received correctly. In this case, in Step S118 the communication process module 55 saves the original data Dn and the inverted mirror data /dn to the SRAM 551, as well as saving a prescribed communication error code indicating a communication error to the error code register 553 in the communication process module 55; then in Step S124 carries out a prescribed error process, and terminate the read operation. The error code register 553 may also store included information indicating whether the communication error occurred in communication of the original data from the memory device (corresponds to NO in S112) or whether the communication error occurred in communication of the mirror data from the memory device (corresponds to NO in S114). The error process of Step S124 may involve notifying the main controller 40 of the communication error or that the read operation terminated, for example. Step S124 may also be omitted. Under conditions in which a communication error occurred, because data cannot be received correctly, the communication process module 55 terminates the read operation after Step S124.

By referring to the communication error code that is saved to the SRAM 551, the main controller 40 can verify that a communication error occurred, making it possible to carry out an appropriate process in response. For example, if it is verified that a communication error occurred in either the original data Dn or the mirror data dn, the main controller 40 may then carry out various operations (e.g. checking remaining ink level, notifying the user of the remaining ink level, etc.) using the set of data that does not encounter a communication error. Alternatively, the main controller 40 may use the carriage motor 32 (FIG. 1) to start and stop the carriage 30 in an attempt to improve communication status (terminal contact status), and to then resend a Read command to the sub-controller 50 to carry out a read operation.

If in Step S112 the exclusive OR of the original data Dn and the inverted data /Dn is FFFFh, and also in Step S114 the exclusive OR of the mirror data dn and the inverted mirror data /dn is FFFFh, the communication process module 55 decides that there is a memory cell error in the memory device 130. The reason it can be determined that a memory cell error is present that, because mutually inverted data were received correctly, it is highly likely that the problem is not a communication error, but rather that the data that is stored in the original data area and the data that is stored in the mirror data area of the memory device 130 are not consistent. In this case, in Step S116, the communication process module 55 saves the original data Dn and the inverted mirror data /dn into the SRAM 551, as well as saving a prescribed memory cell error code indicating a cell error into the error code register 553 of the communication process module 55. A memory cell error is a problem whereby, in either a memory cell storing original data Dn targeted for an operation or a memory cell storing mirror data do targeted for an operation, the memory cell per se becomes damaged to the point that stored information can no longer be saved correctly.

After Step S120 or Step S116 is executed, in Step S122 the communication process module 55 decides whether all of the data that is to be read is received. If all of the data is received, the communication process module 55 terminates the read operation. Specifically, as depicted in FIG. 16, when the read operation terminates, the communication process module 55 transits the reset signal CRST from high level to low level, and ceases to supply the clock signal CSCK. After ceasing to supply the clock signal CSCK, the communication process module 55 ceases to supply the power supply voltage CVDD. If reading of all of the data is not completed, the module returns to Step S108 and repeats the process discussed above for the next unit of read data. For example, once the process of Steps S108 to S122 is carried out for the unit of read data D1, /D1, d1, /d1 of the first row, the above process is then carried out for the unit of read data D2, /D2, d2, /d2 of the second row. The "first row" corresponds to Row A1 in FIG. 14, while the "second row" corresponds to Row A2. The read operation repeats until all of the data in the memory device 130 is read out. Alternatively, the main controller 40 may specify a final target row for the read operation, in which case the sub-controller 50 would repeat the read operation until reaching the specified final target row.

Through the read operation described above, all of the data in the memory device 130 is stored temporarily in the SRAM 551. If a communication error or memory cell error is occurred in data in the rewriteable area RWA, the corresponding error code is stored in the error code register of the communication process module 55. The original data Dn and the inverted mirror data /dn and any communication error and cell error codes that are stored in the communication process module 55 is acquired by the main controller 40 and stored in memory in the main controller 40.

In Step S126, for original data Dn and inverted mirror data /dn that are determined to contain a memory cell error, the main controller 40 performs a parity check of each. As illustrated in FIG. 14, the original data Dn and inverted mirror data /dn stored in the rewritable area RWA each contain 15-bit actual data and a parity bit P. From the original data Dn and inverted mirror data /dn determined to contain a memory cell error, it is possible for the main controller 40 to select the data for which the actual data and the parity bit are consistent, and use this data to carry out various processes relating to remaining ink level (e.g. checking remaining ink level, notifying the user of the remaining ink level, etc.). If as a result of the parity check both the original data Dn and the inverted mirror data /dn are found to have a parity error, or both sets of data Dn, /dn are found to be consistent with their parity bit, it is highly likely that a memory cell error occurred. In this case, a message alerting the user of a memory error in the ink cartridge 100 may be displayed on the display panel of the console portion 70. Also, where reading of the data of the rewritable area RWA is carried out for the purpose of verifying the write result of data written to the rewritable area RWA, the write data which is kept by the main controller 40 may be compared with the original data Dn and inverted mirror data /dn that is determined to have a memory cell error, to determine whether the data is correct.

For data in the read-only area ROA as well, it is preferable to perform a parity check in Step S126. In this way, parity checks are carried out after the read operation is completed, rather than being carried out during the read operation. Consequently, despite the parity bits P of the read-only area ROA being stored at the end of the read-only area ROA as depicted in FIG. 14, the read operations and parity checks operation does not experience any delay as a result. Also, the data in the read-only area ROA includes 8-bit character encoding, and thus placing the parity bits P together at the end has the advantage of eliminating the need to carry out bit shift control in order for the main controller 40 to acquire the actual data. On the other hand, the data in the rewritable area RWA does not include 8-bit character encoding and actual data can be sufficiently expressed in 15 bits or less, so placing the parity bit P at the end of the 16 bits has the advantage of making the data easy to handle during write operations and read operations.

In the read process of the present embodiment, if through the determinations made in Steps S110 to S114 read data is determined to be normal, or is determined to contain a communication error, no parity check is performed; a parity check is performed only if the data is determined to contain a memory cell error. Consequently, it is possible to simplify the process, as compared to the case where a parity check is performed on all data. However, a parity check may be performed also in instances in which read data is determined to contain a communication error. In this case, the parity check may be carried out if the original data Dn and inverted mirror data /dn are not consistent.

In Step S110, a consistency determination is made for the original data Dn and inverted mirror data /dn; but alternatively a consistency determination may be made for the original data Dn and mirror data dn, or a consistency determination may be made for inverted data of the original data Dn and the mirror data dn. These three types of determination may be understood to all share the concept of determining consistency of the original data Dn and the mirror data dn (i.e. two sets of data contained in a single row of the memory cell array). In preferred practice the parity check in the read operation is performed if there is no consistency between two sets of data that is read from the memory cell array. The reliability of data sent and received through such communication can be improved thereby.

After the read operation, for original data Dn and inverted mirror data /dn not having an appended error code, the main controller 40, using the original data Dn, carries out prescribed control processes (e.g. checking remaining ink level, notifying the user of the remaining ink level, etc.). If there is original data Dn or inverted mirror data /dn having an appended error code, the main controller 40 may carry out a communication error response process, such as displaying on the display panel of the console portion 70 a message prompting the user to recheck installation of the ink cartridge 100, for example.

In the read operation described above, because original data Dn and inverted data /Dn thereof are sent to the sub-controller 50 by the memory device 130, the original data Dn and inverted data /Dn can be checked for consistency at the sub-controller 50 to determine if there are communication errors. As a result, the reliability of communications between the sub-controller 50 and the memory device 130 can be improved. Consequently, the likelihood that problems such as erroneous operation of the printer 20 occurs can be reduced. Moreover, because during the read operation from the memory device 130 the original data Dn and the inverted data /Dn have an inverted bit relationship to one another, if for example there is encountered a communication error such that only low level or high level appears on the data signal line LD1 owing to a contact fault between the data terminal 260 of an ink cartridge 100 and the corresponding terminal on the printer 20, the communication error can be ascertained in a reliable manner. Furthermore, because during the read operation the memory device 130 sends the sub-controller 50 mirror data dn which is data substantially identical to the original data Dn, and inverted mirror data /dn which is data substantially identical to the inverted original data /Dn, even if the original data Dn and the inverted original data /Dn lack consistency owing to a communication error for example, as long as the mirror data dn and the inverted mirror data /dn are consistent, the printer 20 can continue processes using either the mirror data dn or the inverted mirror data /dn, thus enhancing the robustness of the system with respect to communication errors. Further, in the memory device 130, mirror data dn is stored together with original data Dn in the ferroelectric memory cell array 132, and both are sent to the printer 20. As a result, even if a memory cell error occurred in either the original data area or the mirror data area of the ferroelectric memory cell array 132, the process may continue normally on the printer 20, using the data stored in the area in which the memory cell error did not occur. Robustness of the system with respect to cell errors can be enhanced thereby, thus dramatically reducing the failure rate of the memory devices 130.

Further, in the present embodiment, when the printer 20 receives the original data Dn, the inverted data /Dn, the mirror data dn, and the inverted mirror data /dn, it first checks if the original data Dn and the inverted mirror data /dn are consistent; and if they are not consistent, it checks if the original data Dn and the inverted data /Dn are consistent, and check if the mirror data dn and the inverted mirror data /dn are consistent. Then, if the original data Dn and the inverted mirror data /dn are not consistent, but the original data Dn and the inverted data /Dn are consistent and the mirror data dn and the inverted mirror data /dn are also consistent, it determines that a memory cell error occurred. If the original data Dn and the inverted mirror data /dn are not consistent, and moreover the original data Dn and the inverted data /Dn are not consistent or the mirror data dn and the inverted mirror data /dn are not consistent, it determines that a communication error occurred. By so doing the printer 20 can correctly ascertain the type of error, and perform appropriate processing according to the type of error.

Further, in the present embodiment, in the ferroelectric memory array 132 (FIG. 14), actual data and parity bits P are stored in the original data area, and actual data and parity bits P are stored in the mirror data area as well. During a read operation from the rewriteable area RWA, the actual data (upper 15 bits) and the parity bit P (lower 1 bit) that are stored in the original data area is sent from the memory device 130 to the sub-controller 50, and the actual data (upper 15 bits) and the parity bit P (lower 1 bit) that are stored in the mirror data area is sent from the memory device 130 to the sub-controller 50 as well. Consequently the printer 20 having received these data then performs a parity check of the actual data that was stored in the original data area, and perform a parity check of the actual data that was stored in the mirror data area. Even if a parity error occurred either in the actual data that was stored in the original data area or in the actual data that was stored in the mirror data area, the main controller 40 is able to continue normal operation using the set of actual data in which no parity error occurred. As a result, robustness of the system against communication errors and cell errors may be enhanced.

Figure 20:
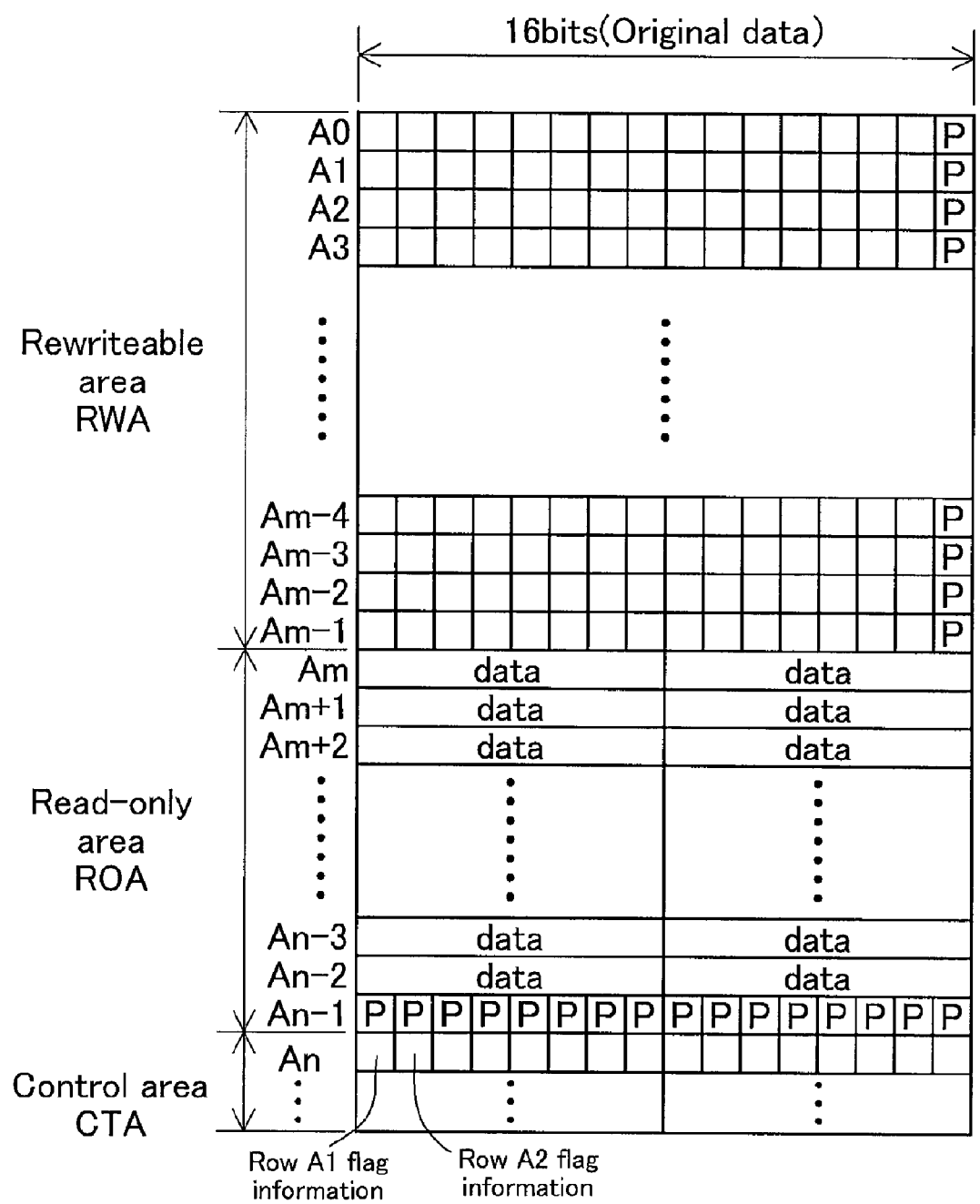
FIG. 20 is a drawing schematically depicting a memory map recognized at the printer during the write cycle to a memory device.

FIG. 20 is a drawing schematically depicting the memory map of a memory device 130 recognized by the main controller 40 on the printer 20 during a write operation to the memory device 130. During a write operation, the main controller 40 and the sub-controller 50 recognizes this memory map as the memory map of the write-targeted area in the memory device 130. Specifically, during a write operation, of the actual ferroelectric memory cell array 132 (FIG. 14), only the existence of the original data area (the left half in FIG. 14) is recognized; the existence of the mirror data area is not recognized. A single row of the original data area is recognized as having 16 bits. The memory area indicated by this memory map is allocated as the write data area in the SRAM 551 of the sub-controller 50. It is sufficient for this write data area to be provided with rows equal in number to the number of rows of the rewritable area RWA, so the read-only area ROA and the control area CTA may be omitted.

Via the bus BS, the main controller 40 of the printer 20 writes to the SRAM 551 in the sub-controller 50 the data that is to be written to the memory device 130 of a particular ink cartridge 100. As mentioned above, during the write operation, the main controller 40 recognizes the memory device 130 as memory containing 16 bits per row. Therefore, the data that is to be written to the memory device 130 consists of the upper 15 bits of actual data, and the lower 1 bit which is the parity bit P. The parity bit P may also be generated by the main controller 40 and appended to the upper 15 bits of actual data, and the resulting data totaling 16 bits then written to the SRAM 551. Alternatively, the parity bit P may be generated by the sub-controller 50, and appended each time that 15-bit data is written to the SRAM 551 by the main controller 40. Via the bus BS the main controller 40 then notifies the sub-controller 50 of the one memory device 130 targeted for writing, and sends a Write command instructing writing to the write-targeted memory device 130. Upon receiving the Write command, the sub-controller 50 initiates the write operation.

Figure 21:
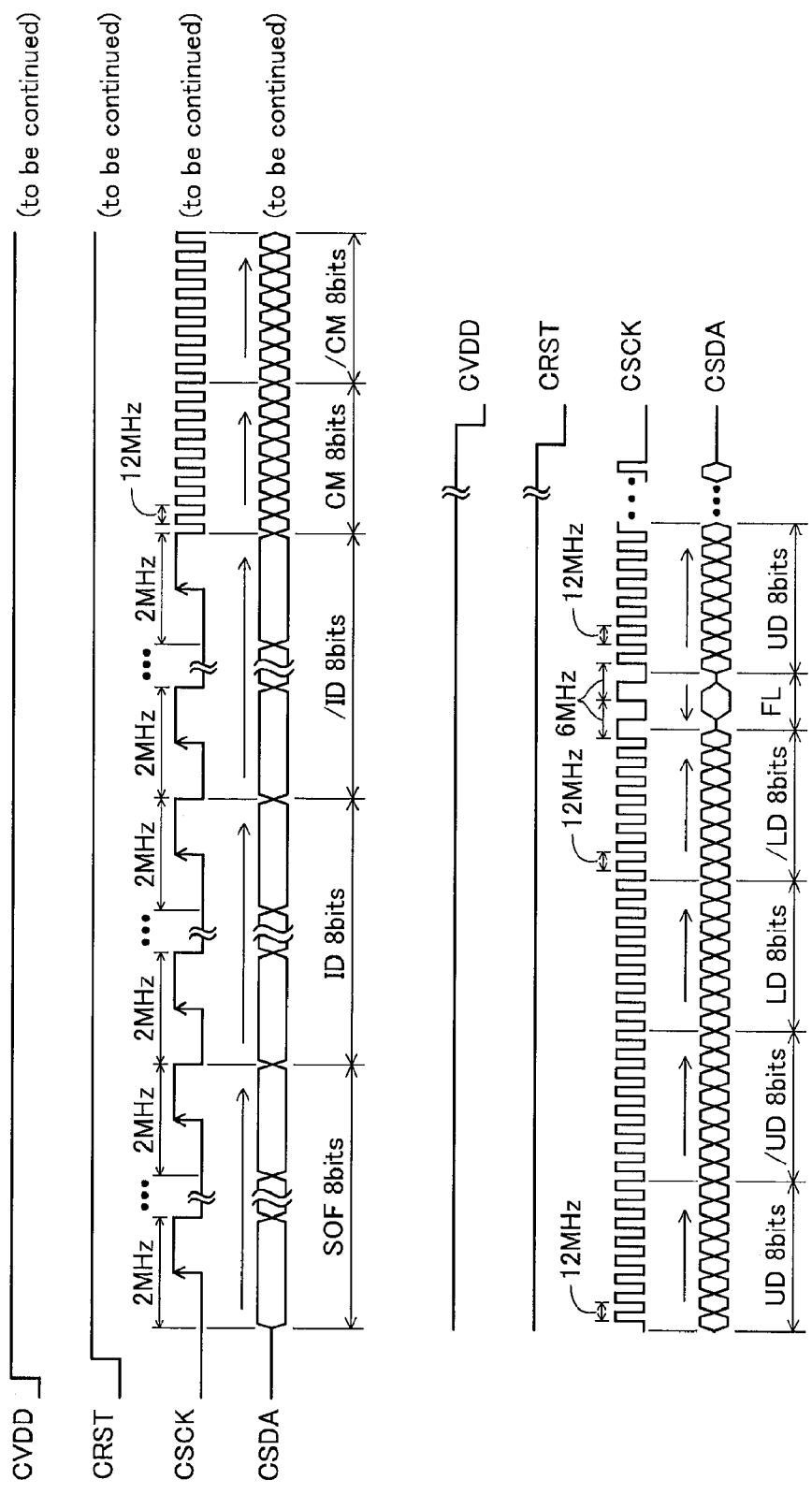
FIG. 21 is a timing chart schematically depicting sent and received signals during the write cycle to a memory device in Embodiment 2.

FIG. 21 is a timing chart schematically depicting signals sent and received between the communication process module 55 of the printer 20 and the memory control circuit 136 of a memory device 130 during a write operation to the memory device 130 in Embodiment 2. In FIG. 21, as in Embodiment 1 (FIG. 11), the frequency of the clock signal CSCK is set to low frequency (2 MHz) during the SOF data and identification data transmission intervals, and is set to high frequency (12 MHz) during the command data CM and read data transmission intervals. As a result, consumption current on the data signal line LD1 during the identification data transmission interval is reduced, while also making it possible to ensure high data transfer speed. Additionally, during the response signal FL reception interval, the clock frequency is set to a lower value (6 MHz) than the clock frequency during the write data reception interval (12 MHz), thereby reducing the likelihood of a bus collision and making it possible for data to be transferred correctly.

Upon receiving the Write command from the main controller 40, the sub-controller 50 first supplies power supply voltage CVDD to each ink cartridge 100 to place the memory device 130 of each ink cartridge 100 in the operable state. After the power supply voltage CVDD is supplied by the sub-controller 50, a low level reset signal CRST is supplied by the sub-controller 50 to initialize the memory devices 130. Because the reset signal remains at low level since the time that the previous access ended, it is maintained at low level prior to the memory devices 130 being supplied with the power supply voltage CVDD. The communication process module 55 of the sub-controller 50 then initiates the following write operation.

When the write operation starts, the communication process module 55 first transitions the reset signal CRST from low level to high level, and transmits a clock signal CSCK of prescribed frequency. When the reset signal CRST rises from low level to high level, the memory control circuit 136 of the memory device 130 goes into a standby state to accept data signals CSDA from the communication process module 55.

Figure 22:
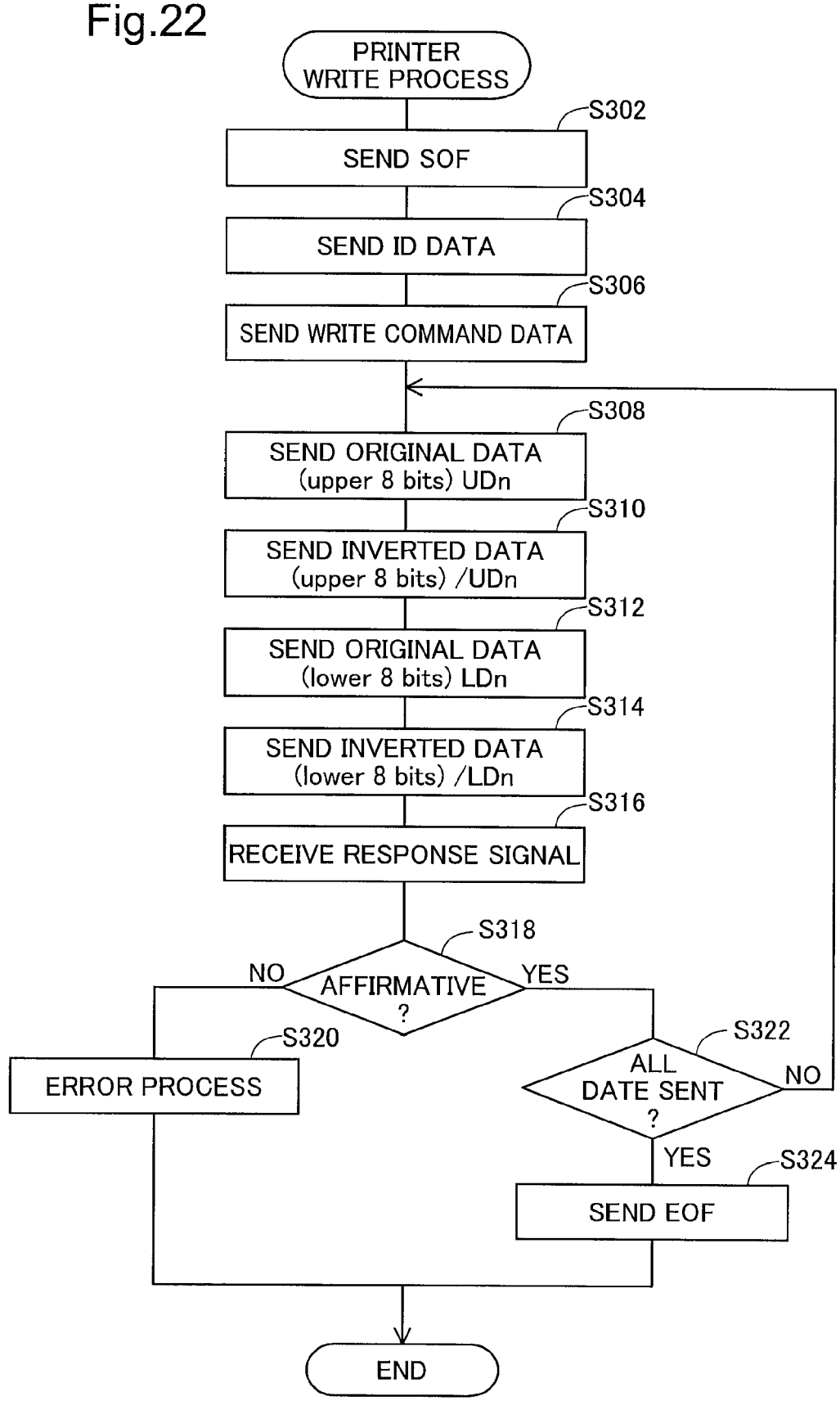
FIG. 22 is a flowchart depicting a processing routine at the printer during the write cycle to a memory device.

FIG. 22 is a flowchart depicting the processing routine of the write operation to the memory device 130, carried out by the sub-controller 50 on the printer 20. As in the read operation described earlier, the communication process module 55 first transmits SOF data as a data signal CSDA (Step S302). As in the read operation described earlier, following the SOF data, the communication process module 55 sends identification data as a data signal CSDA (Step S304). Following the identification data, the communication process module 55 sends command data as a data signal CSDA (Step S306). In a write operation, the command data sent is a Write command.

Starting at the next pulse of the clock signal CSCK following completion of sending of the command data, the communication process module 55 sends the write data to the memory device 130. At this time, the data is sent in sync with the falling edge of the clock signal CSCK, and the data is received by the memory device 130 in sync with the rising edge of the clock signal CSCK. The write data is sent in order of rows starting from the data that, of the data corresponding to the original data, is written to Row A1. Specifically, the communication process module 55 sequentially sends units of write data equivalent to 8 bits×4=32 bits one bit at a time (FIG. 21). A 32-bit unit of write data includes original data upper 8 bits UDn, inverted original data upper 8 bits /UDn, original data lower 8 bits LDn, and inverted original data lower 8 bits /LDn. The communication process module 55 sends the total of 32 bits in the order of UDn, /UDn, LDn, and /LDn (Steps S308 to S314).

In sync with the next rise of the clock signal CSCK following the end of transmission of a unit of write data, the communication process module 55 receives a 1-bit response signal from memory control circuit 136 (Step S316). A high level response signal (herein also called an "OK response signal" or "OK flag") is a signal indicating that the unit of write data was received correctly at the memory device 130, while a low level response signal (herein also called an "NG response signal" or "NG flag") is a signal indicating that a unit of write data was not received correctly at the memory device 130. The reason for adopting a response signal in which high level indicates the OK response signal is that, as shown in FIG. 6, the data signal line LD1 is connected to low level potential via the pull-down resistor R1. This prevents that a high level OK response signal is erroneously input to the communication process module 55 due to an communication error caused, for example, by faulty contact between the data terminal 260 and the terminal 460 of the connection mechanism 400.

If the received response signal is an NG response signal, the communication process module 55 carries out a prescribed error process (Step S320) and terminate the write operation. The error process may involve, for example, retrying to send of the same unit of write data, and if as a result of a certain number of retries only NG response signals are obtained, notifying the main controller 40 of the error. In this case, the main controller 40 may carry out a communication error response process, for example, displaying on the display panel of the console portion 70 a message that prompts the user to recheck installation of the ink cartridge 100 for example.

If on the other hand the received response signal is an OK response signal, the communication process module 55 decides whether all of the data to be written to the memory device 130 is sent (Step S322). If all of the data to be written is sent, the communication process module 55 sends EOF (End of Frame) data to the memory device 130 (Step S324) and terminate the write operation. As depicted in FIG. 21, once the write process terminates, the communication process module 55 transits the reset signal CRST from high level to low level, and ceases to supply the clock signal CSCK. The EOF data may be 8-bit data for example, and may be either significant data, or simply dummy data. If not all of the data to be written is sent, the communication process module 55 returns from Step S322 to Step S308 and repeat the process discussed above for the next unit of write data. For example, once the above process is carried out for the first unit of write data UD1, /UD1, LD1, /LD1 of Row A1, the communication process module 55 carries out the above process for the second unit of write data UD2, /UD2, LD2, /LD2 of Row A2 for example.

Figure 23:
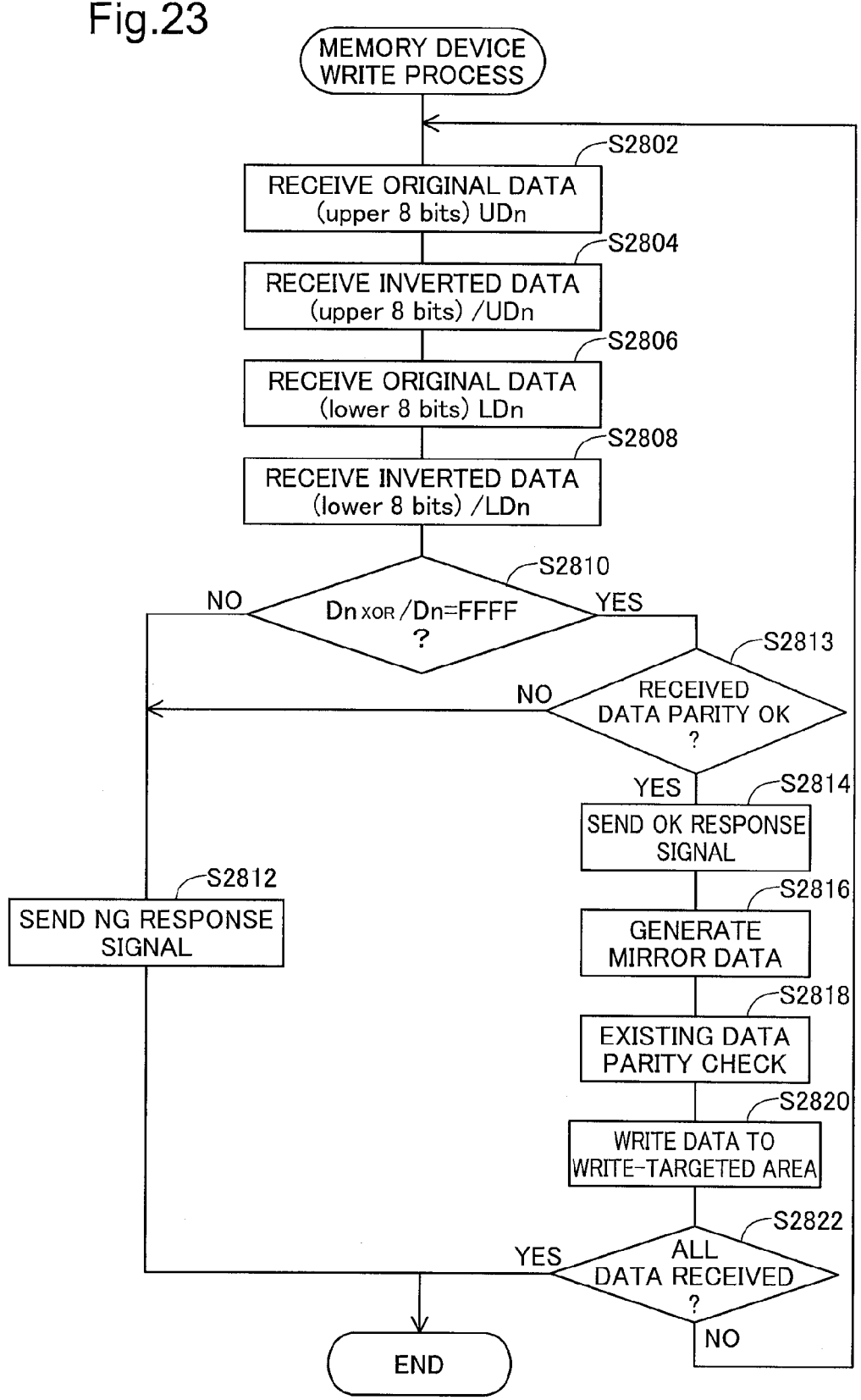
FIG. 23 is a flowchart depicting a processing routine of a write operation in a memory device.

FIG. 23 is a flowchart depicting the processing steps of the write operation on the memory device. The process of S210 to S250 in FIG. 17 discussed previously is carried out also in the write operation. In the case of a write operation, the memory control circuit 136 of the memory device 130 receives a Write command in Step S240. In Step S280, the memory control circuit 136 having received the Write command executes the write operation on the memory device. FIG. 23 depicts in detail the procedure of Step S280 of FIG. 17.

In a write operation, in the same manner as during a read operation, the counter control module M16 initializes the count value of the address counter M13 in order to specify Row A1 as the initial row targeted for writing. The data send/receive module M15 of the memory control circuit 136 then receives the signal that appears on the data signal line LD1 following the command data, doing so one bit at a time in sync with the rise of the clock signal CSCK and sequentially storing the data in the input register 152 (FIG. 13). As a result, the data send/receive module M15 sequentially receives a 32-bit unit of write data UD/m /UDn, LDn, /LDn (Steps S2802 to 2808 of FIG. 23). After completing Step S2808, the data send/receive module M15 changes the send/receive direction to the direction of sending from the memory device 130 to the sub-controller 50, and sends the sub-controller 50 a response signal (either an NG response signal or OK response signal, discussed later) from the memory device 130.

When one unit of the 32-bit write data is received, the data determination module M19 decides whether or not the results of exclusive OR operations for the original data Dn and the inverted data /Dn are true for all 16 bits, i.e. whether FFFFh (Step S2810). The original data Dn referred to here is 16-bit data that includes the original data upper 8 bits UDn received in Step S2802 and the original data lower 8 bits LDn received in Step S2806. The inverted data /Dn referred to here is 16-bit data that includes the inverted original data upper 8 bits /UDn received in Step S2804 and the inverted original data lower 8 bits /LDn received in Step S2808.

If the results of the exclusive OR operations (determination result of the data determination module M19) are not FFFFh, the data send/receive module M15 sends an NG response signal to the communication process module 55 of the sub-controller 50 (Step S2812). Once the NG response signal is sent, the write operation on the memory device terminates (abnormal termination).

If on the other hand the results of the exclusive OR operations (determination result of the data determination module M19) are FFFFh, the data determination module M19 performs a parity check of the received 16-bit original data Dn and determine the consistency of the data (S2813). If the result of the parity check is that the data is not consistent, the data send/receive module M15 sends an NG response signal to the communication process module 55 of the sub-controller 50. (Step S2812). Once the NG response signal is sent, the write operation on the memory device terminates (abnormal termination). If on the other hand the result of the parity check is that the data is consistent, the data send/receive module M15 sends an OK response signal to the communication process module 55 of the sub-controller 50 via the data terminal (Step S2814).

The response signal (either an NG response signal or an OK response signal) is sent in sync with the next fall of the clock signal CSCK following reception of a unit of 32-bit write data (see FIG. 21). Specifically, after the memory device 130 received a unit of 32-bit write data in sync with the clock signal CSCK sent from the sub-controller 50, the memory device 130 sends a response signal to the sub-controller 50 in sync with the next pulse of the clock signal CSCK sent from the sub-controller 50. In the event that the ID comparator module M11 or the command parse module M12 determines that the ID data or the command data CM includes a communication error, and the memory control circuit 136 terminates operation without any meaningful process accordingly, the memory device 130 does not transmit any data during the response signal transmission period. As described previously, the data signal line LD1 is maintained at a low level by the resistor R1 of the sub-controller 50 when there is no data transmission between the sub-controller 50 and the memory device 130. When the communication process module 55 detects a low level on the data signal line LD1 during the response signal transmission period, the communication process module 55 decides that an NG signal is transmitted and a communication error is occurred. In other words, the transmission of NG signal in Step S2812 is performed when some inconsistency is detected in the identification data or in the command data.

If an OK response signal is sent, the copy data generation module M17 of the memory control circuit 136 generates mirror data dn which is a copy of the received 16-bit original data (Step S2816). Specifically, in addition to the input register 152 for receiving original data Dn, the memory control circuit 136 is provided with a 16-bit register for storing the mirror data dn, and the mirror data dn is saved to the latter.

Next, the read/write control module M14 reads out the previously stored data from the memory area targeted for writing of the original data Dn and the mirror data dn (i.e. the write-targeted memory area RWA), whereupon the data determination module M19 performs a parity check of the read out previously stored data (Step S2818). The write-targeted area targeted in a single batch write cycle is equivalent to a single row on the memory map in FIG. 14. As shown in FIG. 14, the upper 16 bits of the write-targeted memory area (an area equivalent to one row) constitute an original data area for storing the original data Dn, with the parity bit P being stored on the last bit of the original data area. The lower 16 bits of the write-targeted memory area (an area equivalent to one row) constitute a mirror data area for storing the mirror data dn; and as in the original data area, the parity bit P is stored on the last bit of the mirror data area. In Step S2818, a parity check is performed respectively for the previously stored data that has been stored in the original data area of the write-targeted memory area, and the previously stored data that has been stored in the mirror data area.

Once the parity check is completed, the read/write control module M14 carries out writing of the data to the write-targeted memory area (Step S2820). Here, if no parity error is detected in either the previously stored data of the original data area or the previously stored data of the mirror data area in the write-targeted memory area, the read/write control module M14 writes the original data Dn received in Steps S2802, S2806 to the original data area, and writes the mirror data dn generated in Step S2816 to the mirror data area. If on the other hand a parity error is detected in the previously stored data of the original data area of the write-targeted memory area but no parity error is detected in the previously stored data of the mirror data area of the write-targeted memory area, the read/write control module M14 writes back the previously stored data containing the parity error to the original data area in place of the received original data Dn; and writes the mirror data dn that is generated in Step S2816 to the mirror data area. If the no parity error is detected in the previously stored data of the original data area of the write-targeted memory area, but a parity error is detected in the previously stored data of the mirror data area of the write-targeted memory area, the read/write control module M14 writes the received original data Dn to the original data area, and writes back the previously stored data to the mirror data area, respectively. If the parity errors are detected in both the previously stored data of the original data area and the previously stored data of the mirror data area in the write-targeted memory area, the read/write control module M14 rewrites back the respective previously stored data to the original data area and to the mirror data area. That is, for memory areas in which a parity error is detected, the read/write control module M14 performs a rewrite of the previously stored data; and for memory areas in which no parity error is detected, it updates the data supplied from the sub-controller 50. The reason for carrying out updating of data in this way is that if a memory area includes a parity error, it is highly likely that one of the cells making up the memory area is undependable (i.e. a defective cell); it is therefore desirable to maintain a state of continued existence of the parity error. By so doing, subsequent parity checks of data read from that memory area by the main controller 40 on the printer (Step S126 of FIG. 19) likewise reveals the parity error, and the main controller 40 is prevented from using the erroneous data. However, writing of data into the areas in which a parity error is detected may be omitted, rather than performing the rewriting of the previously stored data.

After writing of data into a write-targeted memory area is performed, the command parse module M12 of the memory control circuit 136 decides whether all of the data to be written is received (Step S2822). The command parse module M12 may decide that all of the data to be written is received, upon receiving the EOF data. Alternatively, it may decide that all of the data to be written is received when it detects that the reset signal CRST is transitioned from high level to low level. If all of the data to be written is received, the memory control circuit 136 terminates the write operation. If not all of the data to be written is received, the memory control circuit 136 returns to Step S2802 and repeat the process described above for the next unit of write data. For example, once the first unit of write data D1 and /D1 is received and the above process is carried out, the second unit of write data D2 and /D2 is received and the above process is carried out. The "first row" corresponds to Row A1 of FIG. 14, and the "second row" corresponds to Row A2. In the present embodiment, because the address counter M13 specifies word addresses sequentially, write operations following Row A1 is carried out in the order Row A2, Row A3 .... Also, after transmission of an OK response signal (Step S2814), in order to receive the next unit of write data, the data send/receive module M15 sets the data send/receive direction to the direction in which the memory device 130 receives data from the sub-controller 50.

The steps of the flowchart depicted in FIG. 23 may be executed in a different order or in parallel, so long as no conflicts occur in the process. For example, the memory control circuit 136 may generate the mirror data prior to sending an OK signal; or while generating the mirror data, may carry out the parity check of previously stored data in a parallel operation.

In the write operation to a memory device 130 as described above, the memory device 130 checks the original data Dn and the inverted data /Dn for consistency and sends a response signal indicating whether they are consistent for each 16 bits of the original data Dn. The reliability of communication between the sub-controller 50 and the memory device 130 is improved as a result. Moreover, if the original data Dn and the inverted data /Dn are not consistent, the memory device 130 does not write the original data Dn to the ferroelectric memory cell array 132, thereby reducing the likelihood that the ferroelectric memory cell array 132 is updated in error. Additionally, in the write operation to a memory device 130 as described above, because the original data Dn and the inverted data /Dn have a mutually inverted bit relationship, if a communication error such that only low level or high level appears on the data signal line LD1 arises owing to a contact fault between the data terminal 260 of the ink cartridge 100 and the corresponding terminal on the printer 20, the communication error can be detected in a reliable manner. Moreover, because consistency (presence or lack of communication errors) of the original data Dn and the inverted data /Dn is determined through an exclusive OR operation carried out on each bit of the original data Dn and the inverted data /Dn, highly reliable detection of communication errors can be accomplished easily.

In write operations in the present embodiment, for the previously stored data in a write-targeted area, the memory device 130 carries out a parity check of the 16 bits stored in the original data area and the 16 bits stored in the mirror data area, respectively. As a result, in areas in which a parity error is detected, the previously stored data is rewritten; whereas in areas in which no parity error is detected, new data is written. Because an area in which a parity error is detected may be assumed to be experiencing a fault with a memory cell or cells, the parity check may also be considered as a fault detection means. As a result, updating of data does not take place in areas in which some faults occur, thus reducing the likelihood of unanticipated difficulties that may result from updating data in areas that encountered a problem. Moreover, by rewriting the previously stored data to areas in which parity errors are detected, the likelihood that data in an areas in which a parity error occurred changes due to data retention fault may be avoided. A data retention fault refers to a fault whereby the value of saved data in a memory cell changes due to gradual dissipation of charge. If in an area in which a cell error is suspected to occur the data would change owing to a data retention fault, parity consistency may happen by chance, posing a risk that the memory cell error is not correctly detected.

Figure 24:
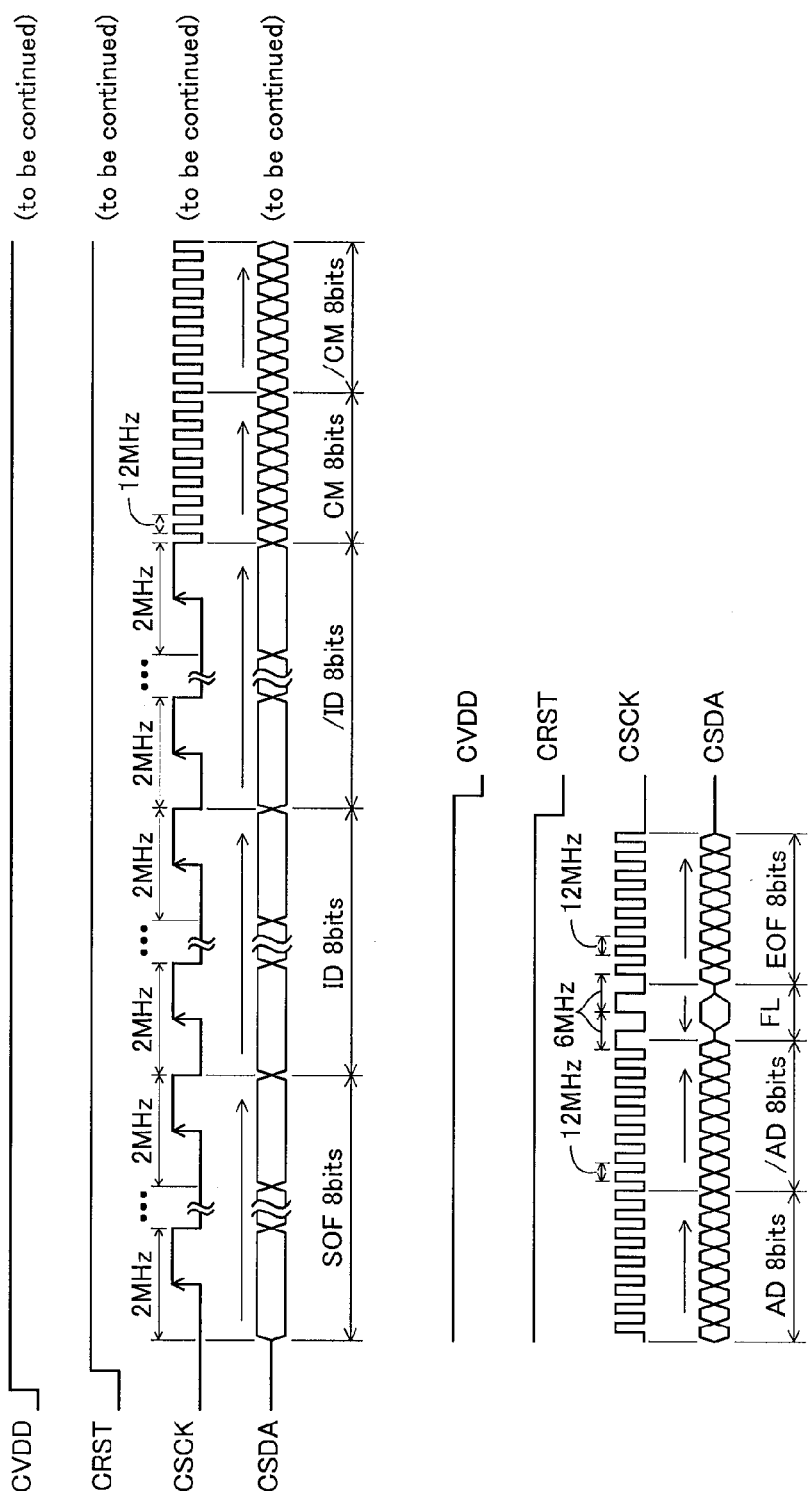
FIG. 24 is a timing chart schematically depicting sent and received signals during a write lock operation for a memory device.

FIG. 24 is a timing chart schematically depicting signals sent and received between the communication process module 55 of the printer 20 and the memory control circuit 136 of a memory device 130 during a write lock operation for the memory device. The write lock operation is a process whereby a memory area of the rewriteable memory area RWA of the memory map (FIG. 14) of the ferroelectric memory array 132 is changed to a write lock area, in row units. A row changed to a write lock area can no longer be overwritten through access from an external device (e.g. the communication process module 55 of the sub-controller 50).

As in the read operation and the write operation discussed above, the communication process module 55 first sends a sequence of SOF data, identification data, and command data as data signals CSDA. The command data sent in the present process is a command representing a write lock process (Write Lock command). After sending the command data, the communication process module 55 sends write lock-targeted address data AD and inverted write lock-targeted address data /AD. The write lock-targeted address data AD consists of 8-bit data for example, and is used to identify a row to be changed to a write locked area, from among the rows in the rewriteable area RWA. The inverted write lock-targeted address data /AD is 8-bit data that inverts the value of each bit of the write lock-targeted address data AD.

After sending the write lock-targeted address data AD and the inverted write lock-targeted address data /AD, the communication process module 55 receives a 1-bit response signal from the memory control circuit 136. A high level response signal (OK response signal) indicates that the write lock-targeted address data AD and inverted write lock-targeted address data /AD are received correctly at the memory device 130. A low level response signal (NG response signal) indicates that the write lock-targeted address data AD and inverted write lock-targeted address data /AD are not received correctly at the memory device 130.

If the communication process module 55 receives an NG response signal, it carries out a prescribed error process, then terminate the write lock operation. The error process can be a process identical to the error process that takes place when the NG response signal is received in the write operation described previously, for example. On the other hand, if the received response signal is an OK response signal, the communication process module 55 sends EOF (End of Frame) data to the memory device 130, then terminate the operation (FIG. 22). In preferred practice, the change in clock frequency occurring during the write lock operation depicted in FIG. 24 is identical to the change in clock frequency during the write operation depicted in FIG. 21.

During a write lock operation, the process on the memory device takes place in accordance with the procedure of FIG. 17 discussed previously. In the case of a write lock operation, the memory control circuit 136 of the memory device 130 receives a Write Lock command in Step S240 of FIG. 17. Consequently, in Step S270, the memory control circuit 136 which receives the Write Lock command executes the write lock operation described below.

When the write lock operation starts, the data send/receive module M15 of the memory control circuit 136 sequentially receives one bit at a time in sync with rise of the clock signal CSCK, the signal that appears on the data signal line LD1 following the command data, and sequentially saves the data to the input register 152. As a result, the memory control circuit 136 sequentially receives the write lock-targeted address data AD and the inverted write lock-targeted address data /AD.

The data determination module M19 determines whether or not the exclusive OR operations for the received write lock-targeted address data AD and inverted write lock-targeted address data /AD are true for all 8 bits of these data, i.e. whether or not the result is FFh. If the exclusive OR operations are not FFh, the data send/receive module M15 sends an NG response signal (low level response signal) to the communication process module 55 of the sub-controller 50. Once the NG response signal is sent, the write lock operation on the memory device terminates (abnormal termination).

If on the other hand the results of exclusive OR operations are FFh, the read/write control module M14 selects the one row that is identified in the rewriteable area RWA by the write lock-targeted address data AD (herein termed the "write lock-targeted row"), and change it to a write locked area. Specifically, the counter control module M16 sets the counter value of the address counter M13 so as to select the lead row An (FIG. 14) of the control area CTA. The count then advances so that the row including the cell that stores a write lock-targeted row flag is selected in the control area CTA. After the row including the cell that stores the write lock-targeted row flag is selected by the address counter M13 as the row targeted for the write operation, the read/write control module M14 updates this entire one row of the control area CTA so that the flag information of the cell corresponding to the write lock-targeted row changes from "0" to "1".

Through the above write lock operation, it is possible for the main controller 40 to change any row in the rewriteable area RWA in such a way that the row cannot be externally written to thereafter. As a result, at any desired timing the data values in the row can be maintained, thus preventing the data values from being overwritten improperly.

Figure 25:
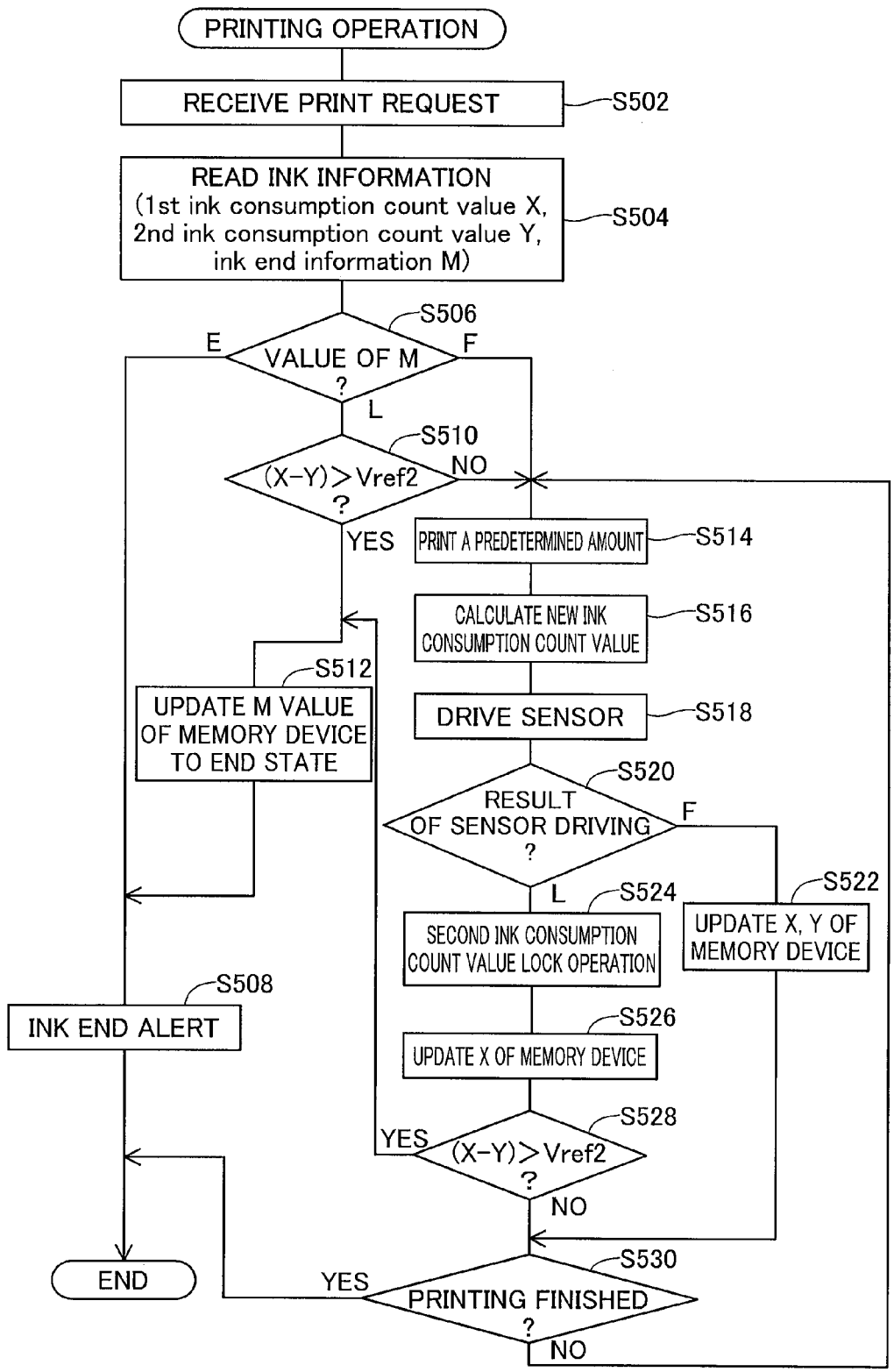
FIG. 25 is a flowchart depicting the process steps in a printing operation.

FIG. 25 is a flowchart depicting the process steps in a printing operation carried out primarily by the main controller 40. For convenience in description, the following discussion of the printing operation focuses upon a single ink cartridge 100, but in actual practice the same processes are carried out for each ink cartridge 100 installed in the printer 20.

The printing operation is initiated when the main controller 40 receives a print request from the user via the computer 90 or the console portion 70 (Step S502). When a print request is received, the main controller 40 executes the read operation from the memory device 130 discussed earlier, and reads out ink information from the memory device 130 of the ink cartridge 100 (Step S504). Alternatively, in Step T110 of FIG. 15, the data stored in the memory of the main controller 40 may be read out, rather than performing a read operation from the memory device 130.

In preferred practice, the ink information read out in Step S504 includes the first ink consumption count value X, the second ink consumption count value Y, and ink end information M from the rewriteable area RWA. The first and second ink consumption count values X, Y are values that represent cumulative total ink consumption for each ink cartridge 100 and are derived on the basis of ink consumption as estimated by the ink consumption estimation module M3 in the printer 20. The ink end information M may consist for example of 2-bit data, of which M="01" indicates a state in which the remaining ink level detected by the sensor 110 is greater than a first threshold value Vref1 (the full state). M="10" indicates a state in which the remaining ink level is equal to or less than the first threshold value Vref1, but the remaining ink level is greater than the ink end level (low state). M="11" indicates a state in which the remaining ink level is equal to or less than the ink end level (end state).

The main controller 40 then decides whether the value of the ink end information M indicates the full state, the low state, or the end state (Step S506). If the main controller 40 decides that the ink end information M indicates the end state, it issues an ink end alert to the user (Step S508). The ink end alert may involve displaying on the display panel of the console unit 70 a message prompting the user to replace the ink cartridge 100, for example. If the main controller 40 decides that the ink end information M indicates the low state, it then decides whether the difference (X−Y) of the first ink consumption count value X and the second ink consumption count value Y is equal to or greater than a second threshold value Vref2 (Step S510). As will be discussed later, because the row storing the second ink consumption count value Y in the memory device 130 is write locked at the point that ink end is detected, the second ink consumption count value Y is not updated. If the difference (X−Y) is equal to or greater than the second threshold value Vref2, the main controller 40 updates the value of the ink end information M in the memory device 130 to reflect the end state (Step S512). Specifically, the main controller 40 executes the write operation to the memory device 130 discussed previously, and updates the value of the ink end information M to "11". After updating the value of the ink end information M, the main controller 40 issues the ink end alert described above (Step S508).

On the other hand, if the main controller 40 decides that the ink end information M indicates the full state or that the difference (X−Y) is less than the second threshold value Vref2, it carries out a predetermined amount of printing from the print job requested by the print request (Step S514). Here, a "predetermined amount of printing" refers for example to carrying out printing on the printer paper, for a predetermined distance (e.g. 2 cm) along the sub-scanning direction.

Once the predetermined amount of printing is carried out, the main controller 40 calculates a new ink consumption count value (Step S516). Specifically, on the basis of the particulars of execution of the predetermined amount of printing, the main controller 40 estimates the amount of ink consumed in the course of printing. The main controller 40 then adds a count value, equivalent to the estimated amount of ink consumed, to the first ink consumption count value X that was read out from the memory device 130 in Step S504, to arrive at a new ink consumption count value.

Once the new ink consumption count value is calculated, the main controller 40 drives the sensor of the sensor 110 in Step S518. On the basis of the result of driving the sensor, the main controller 40 decides whether the remaining ink level in the ink cartridge 100 is equal to or greater than the first threshold value Vref1 (the full state) or less than the first threshold value Vref1 (the low state) in Step S520.

If the remaining ink level in the ink cartridge 100 is determined to be equal to or greater than the first threshold value Vref1, the main controller 40 updates in Step S522 the first ink consumption count value X and the second ink consumption count value Y that are stored in the memory device 130 into the new ink consumption count value that is calculated in Step S516. As a result, the first ink consumption count value X and the second ink consumption count value Y have identical values.

On the other hand, if the remaining ink level in the ink cartridge 100 is determined to be less than the first threshold value Vref1, the main controller 40 verifies whether the memory area storing the second ink consumption count value Y (Row A2 of FIG. 14) is a write locked area. This verification is carried out by referring to the write lock flag stored in a memory area of the SRAM 551 which corresponds to the control area CTA of the memory device 130. If the area is not found to be a write locked area, an operation for write locking Row A2 which stores the second ink consumption count value Y is carried out in Step S524. Once the write lock operation is carried out, the value of the second ink consumption count value Y in the memory device 130 is no longer modifiable. Consequently, the value of the second ink consumption count value Y in the memory device 130 is held at the ink consumption count value that obtained immediately prior to the time that, through driving of the sensor 110, the remaining ink level is first detected to fall below the first threshold value Vref1.

When the write lock operation of the second ink consumption count value is completed, the main controller 40 updates in Step S526 the first ink consumption count value X that is stored in the memory device 130 into the new ink consumption count value that is calculated in Step S516. At this time, the second ink consumption count value Y is not updated, as it is in the write locked state.

When the value of the first ink consumption count value X is updated, the main controller 40 decides whether the difference (X−Y) of the first ink consumption count value X and the second ink consumption count value Y is equal to or greater than the second threshold value Vref2 in Step S528. The first ink consumption count value X employed here is the value that is updated in Step S526. Meanwhile, the second ink consumption count value Y employed here is either the value that is read out in Step S504, or the newer of the values that is updated in Step S522. If the difference (X−Y) is equal to or greater than the second threshold value Vref2, the main controller 40 updates the value of the ink end information M of the memory device 130 to the end state in Step S512, and issues the ink end alert discussed above in Step S508.

After the first ink consumption count value X and the second ink consumption count value Y are updated in Step S522, or if in Step S528 the difference (X−Y) is found to be less than the second threshold value Vref2, the main controller 40 decides whether the printing requested by the print request is completed in Step S530. If printing is completed, the printing operation terminates. If printing is not completed, the system returns to Step S514, and a predetermined amount of printing is again carried out.

As described above, in the printer 20 according to the present embodiment, if through driving of the sensor 110 it is determined that the remaining ink level of the ink cartridge 100 is less than the first threshold value Vref1, a prohibit request (write lock operation) is carried out on the memory area that stores the second ink consumption count value Y in the memory device 130, so that the second ink consumption count value Y is no longer updated. As a result, after the prohibit request is issued, the memory device 130 no longer accepts requests to update the second ink consumption count value Y. The second ink consumption count value Y is maintained at the ink consumption count value that obtained immediately prior to the time the sensor detected that the remaining ink level is below the first threshold value Vref1; and the second ink consumption count value Y can be prevented from being updated in error. Further, because the first ink consumption count value X continues to be updated even after updating of the second ink consumption count value Y is suspended, the ink consumption level can be accurately recognized with reference to the difference (X−Y) after the sensor detects that the remaining ink level is lower than the first threshold value Vref1. As a result, ink end point can be determined with good accuracy, making it possible for the ink contained in the ink cartridge 100 to be used up completely without any waste.

D. Modified Embodiments

While the present invention is shown herein in terms of certain preferred embodiments, the invention is not limited to these particular embodiments and may be embodied in various other modes without departing from the spirit of the invention.

Modified Embodiment 1

In Embodiment 2 above, inverted data /Dn of the original data Dn is used as the related data for checking consistency with the original data Dn; however, other data having a prescribed logical relationship to the original data Dn may be used instead. As specific examples, related data such as the following may be used.
(1) A copy of the original data Dn
(2) Data resulting from addition of a prescribed value to the original data Dn
(3) Data resulting from subtraction of a prescribed value from the original data Dn
(4) Data resulting from multiplication of the original data Dn by a prescribed value
(5) Data resulting from a prescribed bit shift operation performed on the original data Dn
(6) Data resulting from a prescribed bit rotation operation performed on the original data Dn Generally, it suffices for the original data Dn and the related data which is related to the original data Dn to have a prescribed logical relationship to one another, such that that the presence or lack of this prescribed logical relationship between the original data Dn and the related data (i.e. consistency of data with each other) can be determined. From the standpoint of convenience, it is preferable for the original data Dn and the related data to have identical data size.

Some of the prescribed logical relationships, such as "inversion", "copy (mirror)", and "bit rotation", are bidirectional logical relationships such that either the original data or related data (first and second data) can be generated from the other by a logical operation. Others, such as "bit shift", are unidirectional logical relationships such that while specific first data selected from the original data and the related data can be used to generate the other data by a logical operation, the first data cannot be generated from the other data by a logical operation. In preferred practice, the logical relationship between the original data and the related data is a bidirectional logical relationship.

Modified Embodiment 2

In Embodiment 2 described before, the memory cell array 132 is provided with both an original data area and a mirror data area; however, it is possible for the arrangement of data areas in the memory cell array 132 to be modified in various ways. For example, the memory cell array 132 may be provided with an original data area only. In this case, it is preferable for the memory control circuit 136 to be provided with a read copy data generation module adapted to copy data stored in the original data area and generate mirror data do (copy data); and with an inverted data generation module adapted to invert each bit of the data stored in the original data area to generate inverted data /Dn and inverted mirror data /dn. Then, at the memory device 130, during the read operation the data send/receive module M15 of the memory control circuit 136 can send as the original data Dn the data that is stored in the original data area the sub-controller 50; and can send the mirror data dn, the inverted data /Dn, and the inverted mirror data /dn that are generated from the original data Dn to the sub-controller 50. In another embodiment, after the data that is read out from the original data area is held in the output register, the data send/receive module M15 may then send it as the original data, while sending as the mirror data the data that is being held in the output register.

Alternatively, an original data area and an inverted data area may be provided in the memory cell array 132. In this case, the read/write control module M14 stores the original data Dn in the original data area, and stores the inverted data /Dn in the inverted data area. Then, during the read operation, the data send/receive module M15 of the memory control circuit 136 sends to the sub-controller 50 as the original data Dn the data which is read from the original data area and send as the inverted data /Dn the data which is read from the inverted data area; and also sends to the sub-controller 50 as the mirror data dn the data that is read from this same original data area, and send as the inverted mirror data /dn the data which is read from this same inverted data area. In this case as well, the host circuit is able to detect communication errors and memory cell errors in accordance with Steps S110 to S114 of FIG. 19. Moreover, original data and inverted data that are determined to contain memory cell errors respectively undergo a parity check (Step S126), so that one of these sets of data can be used if found to have consistency.

Alternatively, the memory cell array 132 may instead be provided with an original data area for storing original data Dn, an inverted data area for storing inverted data /Dn of the original data Dn, a mirror data area for storing mirror data dn of the original data Dn, and an inverted mirror data area for storing inverted mirror data /dn which is inverted data of the mirror data dn. In this case, the read/write control module M14 and the data send/receive module M15 of the memory control circuit 136 reads out the stored data as-is and transmit it.

From the above description it is appreciated that a unit of data equivalent to one row of the memory cell array 132 (unit of access by the memory control circuit 136) preferably includes original data (first data), together with other data having a prescribed logical relationship to the original data Dn (second data).

Modified Embodiment 3

In the read operation in Embodiment 2 above, original data Dn, inverted data /Dn, mirror data dn, and inverted mirror data /dn are sent from the memory device 130 to the sub-controller 50; however, there are various possible modifications with regard to the data that is sent during the read operation. For example, only the original data Dn and the inverted data /Dn may be sent, omitting sending of the mirror data dn and the inverted mirror data /dn. Alternatively, only the original data Dn and the mirror data dn may be sent, omitting sending of the inverted data /Dn and the inverted mirror data /dn.

Modified Embodiment 4

In the write operation in Embodiment 2 above, 32 bits of data composed of original data upper 8 bits UDn, inverted mirror data upper 8 bits /Udn, original data lower 8 bits LDn, and inverted original data lower 8 bits /LDn are sent in that order from the sub-controller 50 to the memory device 130; however, the order of transmission may be modified as desired, and it is acceptable to first transmit the 16-bit original data Dn, followed by transmission of the 16-bit inverted data /Dn. Also, the inverted data may be sent first, and the original data sent afterwards.

Moreover, in the write operation in Embodiment 2 above, 32-bit data is sent as a single set of unit data from the sub-controller 50 to the memory device 130, and each time that sending of a unit of data is finished, a response signal is returned from the memory device 130 to the sub-controller 50; however, the data length of the units of data is modifiable. For example, a unit of data may contain 64-bit original data and inverted data thereof, for a total of 128 bits.

In the write operation in Embodiment 2 above, both actual data and parity data that are to be stored in the memory cell array 132 are generated on the printer 20 and sent to the memory device 130. As an alternative, only the actual data may be generated on the printer 20 and sent to the memory device 130, while the parity data is generated on the memory device 130. In this case, the memory control circuit 136 may be provided with a parity acquisition module for generating 1-bit parity data consistent with the 15 bits of actual data sent from the printer 20.

Modified Embodiment 5

In the preceding Embodiment 2, the memory cell array 132 stores a first ink consumption count value X and a second ink consumption count value Y that represent levels of ink consumption; however, remaining level information representing the remaining ink level may also be stored. In this case, the initial value of the remaining level information represents the amount of ink filling the ink cartridge 100. During printing operations, the printer 20 updates the remaining level information stored in the memory cell array 132 in the decreasing direction, according to the amount of ink consumed in printing. In this case, it is preferable for the memory area that stores the remaining level information to be established in a decrement area. A decrement area refers to an area that only allows numerical values to be updated in the decreasing direction, and does not allow numerical values to be overwritten in the increasing direction. Like the increment area in Embodiment 2, such a decrement area is preferably established by writing decrement flag information to the read-only area.

Modified Embodiment 6

In the preceding Embodiment 2, the second ink consumption count value Y and the first ink consumption count value X are respectively stored in the memory cell array 132, and ink end is determined on the basis of the difference (X−Y) between them (Step S510 of FIG. 25). Alternatively, only the second ink consumption count value Y may be stored in the memory cell array 132. In this case, processing would take place in the same manner as in Embodiment 2, but with the first ink consumption count value X stored in nonvolatile memory provided on the printer 20.

Modified Embodiment 7

There are also various possible modifications with regard to the several signals that are exchanged between the memory devices 130 and the sub-controller 50 in the preceding embodiments. For example, in the examples depicted in FIG. 9 to FIG. 11, FIG. 16, and FIG. 21, the memory device 130 is supplied with a reset signal CRST by the sub-controller 50; however, the element of supplying a reset signal CRST may be omitted. In this case, the reset terminal 240 of the memory device 130, the terminal 440 on the printer 20 corresponding to the reset terminal 240, and the reset signal line LR1 may be dispensed with. In this case, initialization of the memory device 130 may take place autonomously by the memory device 130 when the memory device 130 is supplied with power supply voltage CVDD and starts up, for example. Having initialized itself at startup, the memory device 130 may subsequently operate in response to the clock signal CSCK and data signals CSDA received from the sub-controller 50, in the same way as in Embodiments 1 and 2.

Modified Embodiment 8

In the preceding Embodiment 2, the memory devices 130 are described as being semiconductor memory devices furnished with a ferroelectric memory cell array 132, but are not limited thereto and may instead be semiconductor memory devices that do not utilize ferroelectric memory cells (e.g. EEPROM or flash memory). Memory devices other than semiconductor memory devices may also be used.

Modified Embodiment 9

In the preceding embodiments, the sub-controller 50 of the printer 20 is used as the host circuit; however, any circuit, such as a computer, may be used as the host circuit. In the preceding embodiment, the memory device 130 of an ink cartridge 100 is used as a memory device, but it is possible for any nonvolatile memory device to be used. In this case, the invention may be implemented effectively in an arrangement whereby the host circuit and the memory device are electrically connected via circuit-side terminals that are electrically connected to the host circuit, and memory-device-side terminals that are electrically connected to the memory device and that are detachably connectable to the circuit terminals. By so doing, communication errors arising from faulty contact between the memory-device-side terminals and the circuit-side terminals may be detected, and the reliability of communication between the host circuit and the memory device may be enhanced.

Modified Embodiment 10

In the preceding embodiments, sensors 110 that use a piezoelectric element are employed, but it is possible for example to instead employ an oscillator device such as an oscillator circuit designed to constantly return a response signal whose frequency indicates that ink is present; or to employ a processor such as a CPU or ASIC, or a simpler IC, to carry out exchanges with the sub-controller 50. The present invention may also be implemented in ink cartridges 100 of a type lacking a sensor, and having only a memory device.

Modified Embodiment 11

While the preceding embodiments employed a printer and ink cartridges of ink-jet format, it is also acceptable to employ a liquid jetting apparatus adapted to jet or eject a liquid other than ink, and liquid receptacles for supplying the liquid to the liquid jetting apparatus. Herein, the term liquid is used to include a liquid state body containing particles of a functional material dispersed in a medium; or fluid state body like a gel. For example, there may be employed a liquid jetting apparatus adapted to jet a liquid containing an electrode material, coloring matter, or other matter in dispersed or dissolved form, that is used in the manufacture of liquid crystal displays, EL (electroluminescence) displays, field emission displays, or color filters; a liquid jetting apparatus adapted to jet a bioorganic substance used in biochip manufacture; or a liquid jetting apparatus adapted to jet a liquid as a specimen used as a precision pipette. Additional examples are a liquid jetting apparatus for pinpoint jetting of a lubricant into a precision instrument such as a clock or camera; a liquid jetting apparatus adapted to jet a solution of an ultraviolet-curing resin or other transparent resin onto a substrate for the purpose of forming a micro semi-spherical lens (optical lens) for use in an optical communication component etc.; or a liquid jetting apparatus adapted to jet an acid or alkali etchant solution for etching a circuit board, etc.; as well as liquid receptacles adapted to supply liquid to these kinds of liquid jetting apparatuses. The present invention can be implemented in any one of the above types of jetting apparatuses and liquid receptacles. No limitation to printers of ink-jet format is imposed, and a laser printer and toner cartridge for printing with recording material such as toner may also be employed.

Modified Embodiment 12

In the preceding embodiments, the liquid supply unit is an ink cartridge to the liquid receptacle body of which a board is secured, and the board thusly unified with the liquid receptacle body is installed in the holder provided to the print head unit; however, the liquid supply unit embodying the present invention may instead be a unit having a design in which a cover or adaptor to which the board is secured, and a receptacle body containing the liquid, are installed separately in the holder. In one exemplary arrangement, after the cover or adaptor having the board secured thereto is inserted and installed in the holder in a prescribed insertion direction, the receptacle body is then installed in the holder. In this case, there may be employed in arrangement whereby only the liquid receptacle body is replaced when the liquid inside the receptacle body is depleted; and the liquid consumption information (the liquid consumption count values X, Y) saved in the memory device is reset in association with replacement.

Also, while in the preceding embodiments the liquid containing unit is installed in the holder of the print head unit and supplies ink directly to the print head from the ink supply portion, in another possible arrangement, the liquid containing unit is installed at a location situated away from the head inside the liquid jetting apparatus, and liquid is supplied to the head through a tube connected to the liquid supply portion of the liquid containing unit.

Modified Embodiment 13

Any of various processes such as the following may be adopted as the process for determining communication errors on the memory device.

(a) A process in which an error detection code (e.g. a parity bit) is provided to data received by the memory device, and this error detection code is used to determine whether received data contains errors.

(b) A process in which the memory device receives original data and related data having a logical relationship to the original data, and a determination is made as to the correctness of this logical relationship.

Modified Embodiment 14

In the preceding embodiments, each of several memory devices is connected by a reset signal line LR1, a clock signal line LC1, a data signal line LD1, a first ground line LCS, a first power supply line LCV, a first sensor drive signal line LDSN, and a second sensor drive signal line LDSP; however, some or all of these lines, except for the data signal line LD1, may be omitted.

Modified Embodiment 15

Some of the arrangements that are implemented through hardware in the preceding embodiments may instead be implemented through software, and conversely some of the arrangements that are implemented through software may instead be implemented through hardware.

What is claimed is:

1. A system comprising:

a control section; and a plurality of memory devices that are bus connected to the control section with a clock signal line and a data signal line, each of the plurality of memory devices prestoring identification information for distinguishing the memory device from the other memory devices, wherein the control section performs a write operation, in synchronism with a clock signal, for transferring write data to one of the plurality of memory devices, utilizing:

(i) an identification information transmission period during which the control section sends the identification information of a single memory device to all of the plurality of memory devices through the data line to select the single memory device;

(ii) a write data transmission period during which the control section sends a single set of write data having a prescribed size to the selected single memory device; and (iii) a response period during which the selected single memory device responds to the control section with a response signal indicating presence or absence of communication error in relation to the received set of write data, wherein communications between the control section and the selected memory device during the write data transmission period and the response period are repeatedly performed for each transmission of one of plural sets of write data having the prescribed size, and the control section sets a frequency of the clock signal during the response period to a lower value than that of the clock signal during the write data transmission period.

2. The system in accordance with claim 1, wherein the control section includes a clock generator that generates the clock signal, and an input/output section that performs sending of the write data and receiving of the response signal, and the plurality of memory devices each includes a data receive/send section that performs receiving of the write data and sending of the response signal, and a response signal generator that generates the response signal.

3. The system in accordance with claim 1, wherein during the response period, the selected single memory device completes a process of storing in the selected single memory device the single set of write data that is received immediately prior to the response period.

4. A data transfer method between a control section and a plurality of memory devices that are bus connected to the control section with a clock signal line and a data signal line, each of the plurality of memory devices prestoring identification information for distinguishing the memory device from the other memory devices, the method comprises:

a write operation, performed by the control section in synchronism with a clock signal for transferring write data to one of the plurality of memory devices, the write operation including the steps of:

(i) sending, performed by the control section, the identification information of a single memory device to all of the plurality of memory devices through the data line to select the single memory device;

(ii) sending, performed by the control section, a single set of write data having a prescribed size to the selected single memory device; and (iii) responding, performed by the selected single memory device, to the control section with a response signal indicating presence or absence of communication error in relation to the received set of write data, wherein the step of sending a single set of write data and the step of responding to the control section are repeatedly performed for each transmission of one of plural sets of write data having the prescribed size, and a frequency of the clock signal during the response period is set by the control section to a lower value than that of the clock signal during the write data transmission period.

5. The data transfer method in accordance with claim 4, wherein a process of storing in the selected single memory device the single set of write data that is received immediately prior to the step of responding to the control section is completed in parallel with the step of responding to the control section.

* * * * *